United States Patent
Hakonarson et al.

(10) Patent No.: US 12,545,948 B2
(45) Date of Patent: Feb. 10, 2026

(54) IDENTIFICATION OF NOVEL LOCI IN ASTHMA AND METHODS OF USE THEREOF FOR THE DIAGNOSIS AND TREATMENT OF ASTHMA

(71) Applicant: THE CHILDREN'S HOSPITAL OF PHILADELPHIA, Philadelphia, PA (US)

(72) Inventors: Hakon Hakonarson, Malvern, PA (US); Berta Almoguera, Philadelphia, PA (US); Lyam M. Vazquez, Philadelphia, PA (US); Patrick M.A. Sleiman, Philadelphia, PA (US)

(73) Assignee: The Children'S Hospital of Philadelphia, Philadelphia, PA (US)

( * ) Notice: Subject to any disclaimer, the term of this patent is extended or adjusted under 35 U.S.C. 154(b) by 512 days.

(21) Appl. No.: 16/318,720

(22) PCT Filed: Jul. 21, 2017

(86) PCT No.: PCT/US2017/043375
§ 371 (c)(1),
(2) Date: Jan. 18, 2019

(87) PCT Pub. No.: WO2018/018004
PCT Pub. Date: Jan. 25, 2018

(65) Prior Publication Data
US 2019/0153523 A1    May 23, 2019

Related U.S. Application Data

(60) Provisional application No. 62/365,367, filed on Jul. 21, 2016.

(51) Int. Cl.
| | |
|---|---|
| *C12Q 1/68* | (2018.01) |
| *A61K 45/06* | (2006.01) |
| *A61P 11/06* | (2006.01) |
| *C12Q 1/6827* | (2018.01) |
| *C12Q 1/6883* | (2018.01) |
| *A61K 31/343* | (2006.01) |
| *A61K 31/353* | (2006.01) |
| *A61K 31/46* | (2006.01) |
| *A61K 31/4704* | (2006.01) |
| *A61K 31/522* | (2006.01) |
| *A61K 31/56* | (2006.01) |
| *A61K 39/395* | (2006.01) |

(52) U.S. Cl.
CPC ........... *C12Q 1/6827* (2013.01); *A61K 45/06* (2013.01); *A61P 11/06* (2018.01); *C12Q 1/6883* (2013.01); *A61K 31/343* (2013.01); *A61K 31/353* (2013.01); *A61K 31/46* (2013.01); *A61K 31/4704* (2013.01); *A61K 31/522* (2013.01); *A61K 31/56* (2013.01); *A61K 39/395* (2013.01); *C12Q 2600/106* (2013.01); *C12Q 2600/156* (2013.01); *G01N 2800/122* (2013.01)

(58) Field of Classification Search
None
See application file for complete search history.

(56) References Cited

PUBLICATIONS

Andiappan (BMC Genetics. 2010. 11: 36).*
Park et al; PNAS, 2011, vol. 108, pp. 18026-18031.*
Bonnelykke, K. et al., "A genome-wide association study identifies CHR3 as a susceptibility locus for early childhood asthma with severe exacerbations", Nature Genetics, 46(1): 51-55 (2014).
Leung, T.F. et al., "Asthma and atopy are associated with chromosome 17q21 markers in Chinese children", Allergy, 64: 621-628 (2009).
Madore, A. et al., "replication of an association between 17q21 SNPs and asthma in a French-Canadian familial collection", Hum. Genet., 123: 93-95 (2008).
Marchini, J. et al., "Genotype imputation for genome-wide association studies", Nature Reviews, 11: 499-511 (2010).
Price, A. et al., "Principal components analysis corrects for stratification in genome-wide association studies", 18(8): 904-909 (2006).
Safholm, J. et al., "Prostaglandin E2 inhibits mast cell-dependent bronchoconstriction in human small airways through the E prostanoid subtype 2 receptor", J. Allergy Clin. Immunol., 136: 1232-9 (2015).
March, M. et al., "The Genetics of Asthma and Allergic Disorders", Discovery Medicine, 11(56): 35-45 (2011).
Akinbami, L.J. et al., "Status of childhood asthma in the United States", Pediatrics, 123 Suppl 3:S131-145 (2009).
Bhan, N. et al., "Time Trends in Racial and Ethnic Disparities in Asthma Prevalence in the United States from the Behavorial Risk Factor Surveillance System (brfss) Study (1999-2011)", American Journal of Public Health, 105: 1269-1275 (2015).
Bisgaard, H. et al., "Chromosome 17q21 Gene Variants are Associated with Asthma and Exacerbations but not Atopy in Early Childhood", American Journal of Respiratory and Critical Care Medicine, 179: 179-185 (2009).
Bonnelykke, K. et al., "Meta-Analysis of Genome-Wide Association Studies Identifies Ten Loci Influencing Allergic Sensitization", Nature Genetics, 45: 902-906 (2013).
Deleneau, O. et al., "Integrating sequence and array data to create an improved 1000 Genomes Project haplotype reference panel", Nature Communications, 5: 3934 (2014).
Ferreira, M.A. et al., "Genome-wide association analysis identifies 11 risk variants associated with the asthma with hay fever phenotype", The Journal of Allergy and clinical Immunology, 133: 1564-1571 (2014).
Galanter, J.M. et al., "Genome-wide association study and admixture mapping identify different asthma-associated loci in latinos: The genes-environments & admixture in Latino Americans study", The Journal of Allergy and Clinical Immunology, 134: 295-305 (2014).

(Continued)

*Primary Examiner* — Jehanne S Sitton
(74) *Attorney, Agent, or Firm* — Howson & Howson, LLP; Kathleen D. Rigaut; Richard F. Kane

(57) ABSTRACT

Compositions for the diagnosis and treatment of asthma are disclosed.

10 Claims, 9 Drawing Sheets
Specification includes a Sequence Listing.

(56) References Cited

PUBLICATIONS

Galanter, J. et al., "Ormdl3 gene is associated with asthma in three ethnically diverse populations", American Journal of Respiratory and Critical Care Medicine, 177: 1194-1200 (2008).

Gauvreau, G.M. et al., "Protective effects of inhaled pge2 on allergen-induced airway responses and airway inflammation", American Journal of Respiratory and Critical Care Medicine, 159: 31-36 (1999).

Gottesman, O. et al., "The Electronic Medical Records and Genomics (emerge) Network: Past, Present, and Future", Genetics in Medicine: Official Journal of the American College of Medical Genetics, 15: 761-771 (2013).

Hirota, T. et al., "Genome-wide association study identifies three new susceptibility loci for adult asthma in the Japanese population", Nature Genetics, 43: 893-896 (2011).

Howie, B.N., "A Flexible and Accurate Genotype Imputation Method for the Next Generation of Genome-Wide Association Studies", PLoS Genetics, 5: e1000529 (2009).

Jostins, L. et al., "Host-microbe interactions have shaped the genetic architecture of inflammatory bowel disease", Nature, 491-119-124 (2012).

Kim, D.K. et al., "Genome-wide association analysis of blood biomarkers in chronic obstructive pulmonary disease", American Journal of Respiratory and Critical Care Medicine, 186; 1238-1247 (2012).

Li, X. et al., "Genome-wide association study of asthma identifies rad50-il13 and hla-dr/dq regions", The Journal of Allergy and Clinical Immunology, 125: 328-335 e311 (2010).

Liu, T., "Prostalandin e2 deficiency uncover a dominant role for thromboxane a2 in house dust mite-induced allergic pulmonary inflammation", Proceedings of the National Academy of Sciences of the United States of America, 109: 12692-12697 (2012).

Makinde, T.O. et al., "Increased expression of angiopoietins and tie2 in the lungs of chronic asthmatic mice", American Journal of Respiratory Cell and Molecular Biology, 44: 384-393 (2011).

March, M.E et al., "Genetic and polymorphisms and associated susceptibility to asthma", International Journal of General Medicine, 6: 253-265 (2013).

Moffat, M.F. et al., "A large-scale, consortium-based genome-wide association study of asthma", The New England Journal of Medicine, 363: 1211-1221 (2010).

Newton, K.M. et al., "Validtion of electronic medical record-based phenotyping algorithms: Results and lessons earned from the emerge network", Journal of the American Medical Informatics Association: JAMIA, 20: e147-154 (2013).

Pacheco, J.A. et al., "A highly specific algorithm for identifying asthma cases and controls for genome-wide association studies", AMIA Annual Symposium Proceedings: American Medical Informatics Association, p. 497 (2009).

Purcell, S., "Plink: A tool set for whole-genome association and population-based linkage analyses", American Journal of Human Genetics, 81:559-575 (2007).

Reeves, S.R. et al., "Asthmatic airway epithelial cells differentially regulate fibroblast expression of extracellular matrix components", The Journal of Allergy and Clinical Immunology, 134: 663-670 (2014).

Sleiman, P.M. et al., "Ormdl3 variants associated with asthma susceptibility in North Americans of European Ancestry", The Journal of Allergy and Clinical Immunology, 122: 1225-1227 (2008).

Sleiman, "Variants of dennd1b associated with asthma in children", The New England Journal of Medicine, 362: 36-44 (2010).

Stumm, C.L., "Airway remodeling in murine asthma correlates with a defect in pge2 synthesis by lung fibroblasts", American Journal of Physiology Lung Cellular and Molecular Physiology, 301: L636-644 (2011).

Thompson, S.D. et al., "Genome-wide association analysis of juvenile idiopathic arthritis identifies a new susceptibility locus at chromosomal region 3q13", Arthritis and Rheumatism, 64: 2781-2791 (2012).

Torgersen, D.G. et al., "Meta-analysis of genome-wide association studies of asthma in ethnically diverse North American populations", Nature Genetics, 43: 887-892 (2011).

Van Beijsterveldt, C.E. et al., "Genetics of parentally reported asthma, eczema and rhinitis in 5-yr-old twins", The European Respiratory Journal, 29: 516-521 (2007).

Verma, S.S. et al., "Imputation and quality control steps for combining multiple genome-wide datasets", Frontiers in Genetics, 5: 370 (2014).

Voorham, J. et al., "Computerized extraction of information on the quality of diabetes care from free text in electronic patient records of general practitioners", Journal of the American Medical Informatics Association: JAMIA, 14: 349-354 (2007).

Ward, L.D. et al., "Haploreg: A resource for exploring chromatin states, conservation, and regulatory motif alterations within sets of genetically linked variants", Nucleic Acids Research, 40: D930-934 (2012).

Weidinger, S. et al., "A genome-wide association study of atopic dermatitis identifies loci with overlapping effects on asthma and psoriasis", Human Molecular Genetics, 4841-4856 (2013).

Weiss, K.B. et al., "Trends in the cost of illness for asthma in the United States, 1985-1994", The Journal of Allergy and Clinical Immunology, 106: 493-499 (2000).

Wilke, R.A. et al., "The emerging role of electronic medical records in pharmacogenetics", Clinical Pharmacology and Therapeutics, 89: 379-386 (2011).

Zielger, S.F. et al., "Sensing the outside world: Tslp regulates barrier immunity", Nature Immunology, 11: 289-293 (2010).

Submitted SNP(ss) Details: ss234780344 (Jul. 20, 2011), 1 page printed from https://www.ncbi.nlm.nih.gov/ (Year: 2011).

* cited by examiner

Manhattan plot of the results in European Americans

Manhattan plot of the results in African Americans

Manhattan plot of the results in the combined sample

IDENTIFICATION OF NOVEL LOCI IN ASTHMA AND METHODS OF USE THEREOF FOR THE DIAGNOSIS AND TREATMENT OF ASTHMA

This application is a § 371 of International Application No. PCT/US2017/043375, filed Jul. 21, 2017, which claims priority to U.S. Provisional Application No. 62/365,367 filed Jul. 21, 2016. The entire disclosure of each of the aforesaid applications is incorporated by reference in the present application.

This invention was made with government support under Grant No. U01HG006830 awarded by National Institutes of Health. The US Government has certain rights in the invention.

INCORPORATION BY REFERENCE OF MATERIAL SUBMITTED IN ELECTRONIC FORM

Incorporated herein by reference in its entirety is the Sequence Listing submitted via EFS-Web as a text file named SEQLIST.txt, created Dec. 27, 2023 and having a size of 24,588 bytes.

FIELD OF THE INVENTION

This invention relates to the fields of airway disease and genetic testing. More specifically, the invention provides compositions and methods for the diagnosis and treatment of asthma and other allergic conditions.

BACKGROUND OF THE INVENTION

Several publications and patent documents are cited throughout the specification in order to describe the state of the art to which this invention pertains. Each of these citations is incorporated by reference herein as though set forth in full.

Asthma is a common chronic disease of the airways characterized by recurrent episodes of wheezing, coughing and shortness of breath. In the USA, it is estimated that at least 22.9 million people suffer from the condition, with significant ancestral disparities regarding prevalence, severity and treatment outcomes across populations. (1) (2) The African American (AA) population has higher lifetime prevalence of asthma (14.09% versus 12.41%) (3), and higher morbidity, with twice the hospitalization rates and 1.5 times the intensive care unit admission or intubation (4), and 7.6 times the death rates (5) compared with European Americans (EA).

Asthma is a chronic disease that is highly heritable (6), (7). It is well established that genetic risk factors vary within and between diverse populations (reviewed in (8), (9)). Over the past decade, several population-specific and shared genetic risk factors have been identified through genome-wide association studies (GWAS). These loci include the ORMDL3/GSMBD locus at 17q21-12 (10), (11), (12), the HLA region at 6p21.32-33 (13), (14), the DENND1B locus at 1q31 (15), the CDHR3 locus at 7q22.3 (16), the cytokine cluster at 5q31.1 (13), (14), and the innate immune mediator TSLP residing at 5q22.1 (17),(18),(19). However, despite the significant advances in our knowledge of the genetic architecture of asthma, specific contributors to the observed variability in the burden of asthma between populations remain uncovered.

SUMMARY OF THE INVENTION

In accordance with the present invention, a method for detecting, diagnosing and/or treating asthma in a human subject is provided. An exemplary method comprises detecting at least one single nucleotide polymorphism (SNP) listed in any of Tables 2, 3, 9 and 10-17 (the SNPs in the Tables having the sequences provided in Table 18), or a SNP in linkage disequilibrium with one or more of the SNPs of Tables 2, 3, 9, 10-18, in a nucleic acid sample from the subject, wherein detection is correlated with an increased risk, susceptibility, or predisposition to asthma. The SNPs of Tables 2, 3, 9 and 10-18 may be referred to herein as "asthma-associated single nucleotide polymorphisms (SNPs)". The method can also entail diagnosing a subject with asthma if at least one asthma-associated SNP, or a SNP in linkage disequilibrium with one or more of the asthma-associated SNPs is detected, and optionally, administering an effective amount of one or more agents useful for the treatment of asthma. In certain embodiments, 1, 2, 3, 4, 5, 6, 7, 10, 12, 15, 20, 30, 40 or all of the SNPs in Table 18 are detected. Exemplary agents useful in the treatment of asthma are listed in Table 4.

In another embodiment, a method for diagnosing asthma in a human subject is disclosed. An exemplary method comprises obtaining a nucleic acid sample from said subject; detecting whether the sample contains at least one asthma-associated single nucleotide polymorphism (SNP) such as any one or more of those listed in Table 2, Table 3, Table 9, and Tables 10-18, or a SNP in linkage disequilibrium with one or more of the asthma-associated SNPs, by contacting the nucleic acid sample with a probe or primer of sufficient length and composition to detect said SNP and diagnosing the subject as having asthma when the presence of at least one asthma-associated SNP, or a SNP in linkage disequilibrium with one or more of the asthma-associated SNP, in the nucleic acid sample is detected. In certain embodiments, the subject is of European ancestry and the SNP is listed in Table 2 and Table 3. In yet another aspect, the subject is of African American ancestry and the SNP is listed in Table 16.

In some embodiments, a method of detecting rs11788591 (SEQ ID NO: 16) in the intronic region of the prostaglandin E synthase gene (PTGES) on chromosome 9, or a SNP in linkage disequilibrium with rs11788591 (SEQ ID NO: 16), is encompassed. In some aspects, a method of detecting an increased risk, susceptibility, or predisposition to asthma in African American humans is provided comprising detecting rs11788591 (SEQ ID NO: 16) or a SNP in linkage disequilibrium with rs11788591 (SEQ ID NO: 16). In some aspects, a method of diagnosing asthma in African American humans is provided comprising detecting rs11788591 (SEQ ID NO: 16) or a SNP in linkage disequilibrium with rs11788591 (SEQ ID NO: 16).

Kits for practicing the methods described above are also provided.

DETAILED DESCRIPTION OF THE INVENTION

Figure 1A:
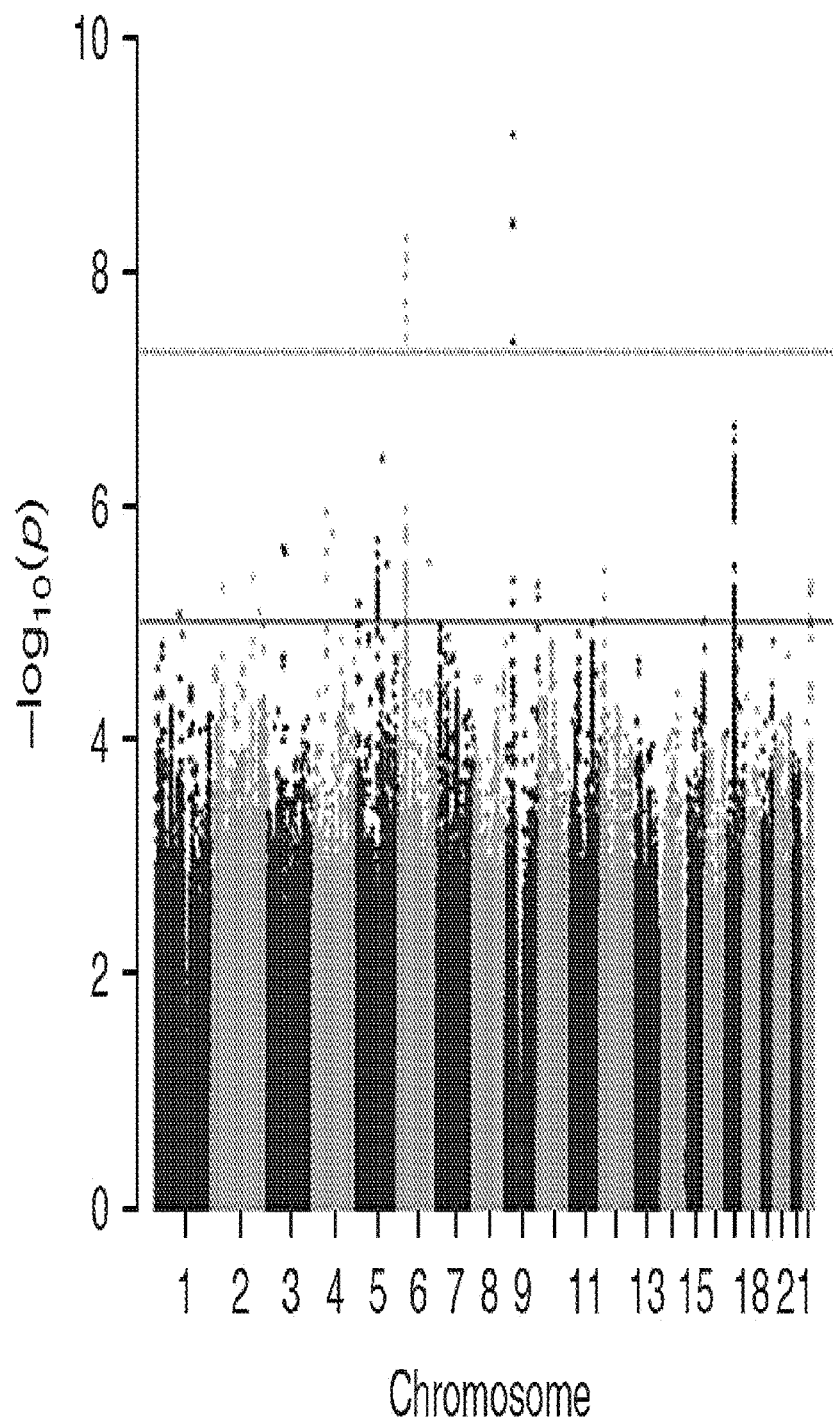
FIGS. 1A-1C. Manhattan plots of the GWAS conducted in Europeans (FIG. 1A), African Americans (FIG. 1B) and the combined sample (FIG. 1C), showing the four loci significantly associated with asthma: 6p21.31 and 9p21.2 in Europeans, PTGES in locus 9q34.11 in African Americans and 5q22.1 in the combined analysis. The threshold for genome-wide significance, p-value $\leq 5.0 \times 10^{-8}$ is shown as a solid red line. A suggestive threshold of $1.0 \times 10^{-5}$ is shown as a solid blue line.

In the present invention, additional genetic susceptibility factors of asthma in European American and African American populations have been identified.

A phenotyping algorithm mining Electronic Medical Records was developed and validated to recruit cases with asthma and controls from the eMERGE (electronic Medical Records and Genomics) network. An ancestry-stratified genome-wide association analysis was performed using SNPTEST followed by meta-analysis with METAL. Nominally significant results were re-analyzed conditioning on atopy status.

The validation of the algorithm yielded positive predictive values of ~90% in all cases. The algorithm accrued 21,644 subjects (65.83% European American and 34.17% African American). We identified four novel population-specific associations with asthma after meta-analyses: loci 6p21.31, 9p21.2 and 10q21.3 in the European American population and the PTGES gene in African Americans. TEK in 9p21.2, which encodes TIE2, has been involved in remodeling the airway wall in asthma and the association remained significant after conditioning by atopy. PTGES, which encodes the prostaglandin E synthase, has also been linked to asthma, where deficient prostaglandin E2 synthesis has been associated with airway remodeling. This study adds to our understanding of the genetic architecture of asthma in European Americans and African Americans and reinforces the need to study populations of diverse ethnic backgrounds to identify both shared and unique genetic predictors of asthma. This information can also be used to identify patients having an altered risk for asthma and can also provide guidance for therapeutic intervention.

Definitions

For purposes of the present invention, "a" or "an" entity refers to one or more of that entity; for example, "a cDNA" refers to one or more cDNA or at least one cDNA. As such, the terms "a" or "an," "one or more" and "at least one" can be used interchangeably herein. It is also noted that the terms "comprising," "including," and "having" can be used interchangeably. Furthermore, a compound "selected from the group consisting of" refers to one or more of the compounds in the list that follows, including mixtures (i.e. combinations) of two or more of the compounds. According to the present invention, an isolated, or biologically pure molecule is a compound that has been removed from its natural milieu.

As such, "isolated" and "biologically pure" do not necessarily reflect the extent to which the compound has been purified. An isolated compound of the present invention can be obtained from its natural source, can be produced using laboratory synthetic techniques or can be produced by any such chemical synthetic route.

"Asthma-associated SNP or specific marker" is a SNP or marker which is associated with an increased or decreased risk of developing asthma and found in lesser frequency in normal subjects who do not have this disease. Such markers may include but are not limited to nucleic acids, proteins encoded thereby, or other small molecules.

A "single nucleotide polymorphism (SNP)" refers to a change in which a single base in the DNA differs from the usual base at that position. These single base changes are called SNPs or "snips." Millions of SNP's have been cataloged in the human genome. Some SNPs such as that which causes sickle cell are responsible for disease. Other SNPs are normal variations in the genome.

The term "genetic alteration" as used herein refers to a change from the wild-type or reference sequence of one or more nucleic acid molecules. Genetic alterations include without limitation, base pair substitutions, additions and deletions of at least one nucleotide from a nucleic acid molecule of known sequence.

"Linkage" describes the tendency of genes, alleles, loci or genetic markers to be inherited together as a result of their location on the same chromosome, and is measured by percent recombination (also called recombination fraction, or θ) between the two genes, alleles, loci or genetic markers. The closer two loci physically are on the chromosome, the lower the recombination fraction will be. Normally, when a polymorphic site from within a disease-causing gene is tested for linkage with the disease, the recombination fraction will be zero, indicating that the disease and the disease-causing gene are always co-inherited. In rare cases, when a gene spans a very large segment of the genome, it may be possible to observe recombination between polymorphic sites on one end of the gene and causative mutations on the other. However, if the causative mutation is the polymorphism being tested for linkage with the disease, no recombination will be observed.

"Centimorgan" is a unit of genetic distance signifying linkage between two genetic markers, alleles, genes or loci, corresponding to a probability of recombination between the two markers or loci of 1% for any meiotic event.

"Linkage disequilibrium" or "allelic association" means the preferential association of a particular allele, locus, gene or genetic marker with a specific allele, locus, gene or genetic marker at a nearby chromosomal location more frequently than expected by chance for any particular allele frequency in the population. Once a known SNP is identified, SNPs in linkage disequilibrium (also termed LD) may be identified via commercially available programs. For example, on the world wide web at analysistools.nci.nih.gov/LDlink/?tab=ldproxy. First, the LDproxy tab is selected. The reference rs number is entered, the r2 tab and the population of interest are selected and the SNPs in LD identified upon clicking on the "calculate" tab. A plot of surrounding area is revealed and a table with the SNPs in LD (with r2 values) is shown.

The term "solid matrix" as used herein refers to any format, such as beads, microparticles, a microarray, the surface of a microtitration well or a test tube, a dipstick or a filter. The material of the matrix may be polystyrene, cellulose, latex, nitrocellulose, nylon, polyacrylamide, dextran or agarose.

The phrase "consisting essentially of" when referring to a particular nucleotide or amino acid means a sequence having the properties of a given SEQ ID NO:. For example, when used in reference to an amino acid sequence, the phrase includes the sequence per se and molecular modifications that would not affect the functional and novel characteristics of the sequence.

"Target nucleic acid" as used herein refers to a previously defined region of a nucleic acid present in a complex nucleic acid mixture wherein the defined wild-type region contains at least one known nucleotide variation which may or may not be associated with asthma. The nucleic acid molecule may be isolated from a natural source by cDNA cloning or subtractive hybridization or synthesized manually. The nucleic acid molecule may be synthesized manually by the triester synthetic method or by using an automated DNA synthesizer.

With regard to nucleic acids used in the invention, the term "isolated nucleic acid" is sometimes employed. This term, when applied to DNA, refers to a DNA molecule that is separated from sequences with which it is immediately contiguous (in the 5' and 3' directions) in the naturally occurring genome of the organism from which it was derived. For example, the "isolated nucleic acid" may comprise a DNA molecule inserted into a vector, such as a plasmid or virus vector, or integrated into the genomic DNA of a prokaryote or eukaryote. An "isolated nucleic acid molecule" may also comprise a cDNA molecule. An isolated nucleic acid molecule inserted into a vector is also sometimes referred to herein as a recombinant nucleic acid molecule.

With respect to RNA molecules, the term "isolated nucleic acid" primarily refers to an RNA molecule encoded by an isolated DNA molecule as defined above. Alternatively, the term may refer to an RNA molecule that has been sufficiently separated from RNA molecules with which it would be associated in its natural state (i.e., in cells or tissues), such that it exists in a "substantially pure" form.

By the use of the term "enriched" in reference to nucleic acid it is meant that the specific DNA or RNA sequence constitutes a significantly higher fraction (2-5 fold) of the total DNA or RNA present in the cells or solution of interest than in normal cells or in the cells from which the sequence was taken. This could be caused by a person by preferential reduction in the amount of other DNA or RNA present, or by a preferential increase in the amount of the specific DNA or RNA sequence, or by a combination of the two. However, it should be noted that "enriched" does not imply that there are no other DNA or RNA sequences present, just that the relative amount of the sequence of interest has been significantly increased.

It is also advantageous for some purposes that a nucleotide sequence be in purified form. The term "purified" in reference to nucleic acid does not require absolute purity (such as a homogeneous preparation); instead, it represents an indication that the sequence is relatively purer than in the natural environment (compared to the natural level, this level should be at least 2-5 fold greater, e.g., in terms of mg/ml). Individual clones isolated from a cDNA library may be purified to electrophoretic homogeneity. The claimed DNA molecules obtained from these clones can be obtained directly from total DNA or from total RNA. The cDNA clones are not naturally occurring, but rather are preferably obtained via manipulation of a partially purified naturally occurring substance (messenger RNA). The construction of a cDNA library from mRNA involves the creation of a synthetic substance (cDNA) and pure individual cDNA clones can be isolated from the synthetic library by clonal selection of the cells carrying the cDNA library. Thus, the process which includes the construction of a cDNA library from mRNA and isolation of distinct cDNA clones yields an approximately $10^{-6}$-fold purification of the native message. Thus, purification of at least one order of magnitude, preferably two or three orders, and more preferably four or five orders of magnitude is expressly contemplated. Thus the term "substantially pure" refers to a preparation comprising at least 50-60% by weight the compound of interest (e.g., nucleic acid, oligonucleotide, etc.). More preferably, the preparation comprises at least 75% by weight, and most preferably 90-99% by weight, the compound of interest. Purity is measured by methods appropriate for the compound of interest.

The term "complementary" describes two nucleotides that can form multiple favorable interactions with one another. For example, adenine is complementary to thymine as they can form two hydrogen bonds. Similarly, guanine and cytosine are complementary since they can form three hydrogen bonds. Thus if a nucleic acid sequence contains the following sequence of bases, thymine, adenine, guanine and cytosine, a "complement" of this nucleic acid molecule would be a molecule containing adenine in the place of thymine, thymine in the place of adenine, cytosine in the place of guanine, and guanine in the place of cytosine. Because the complement can contain a nucleic acid sequence that forms optimal interactions with the parent nucleic acid molecule, such a complement can bind with high affinity to its parent molecule.

With respect to single stranded nucleic acids, particularly oligonucleotides, the term "specifically hybridizing" refers to the association between two single-stranded nucleotide molecules of sufficiently complementary sequence to permit such hybridization under pre-determined conditions generally used in the art (sometimes termed "substantially complementary"). In particular, the term refers to hybridization of an oligonucleotide with a substantially complementary sequence contained within a single-stranded DNA or RNA molecule of the invention, to the substantial exclusion of hybridization of the oligonucleotide with single-stranded nucleic acids of non-complementary sequence. For example, specific hybridization can refer to a sequence which hybridizes to any asthma specific marker nucleic acid, but does not hybridize to other nucleotides. Also polynucleotide which "specifically hybridizes" may hybridize only to an airway specific marker, such as an asthma-specific marker shown in the Tables contained herein. Appropriate conditions enabling specific hybridization of single stranded nucleic acid molecules of varying complementarity are well known in the art.

For instance, one common formula for calculating the stringency conditions required to achieve hybridization between nucleic acid molecules of a specified sequence homology is set forth below (Sambrook et al., Molecular Cloning, Cold Spring Harbor Laboratory (1989):

$$Tm=81.5° C.+16.6 \text{ Log}[Na+]+0.41(\% \text{ G+C})-0.63(\% \text{ formamide})-600/ \#bp \text{ in duplex.}$$

As an illustration of the above formula, using $[Na+]=[0.368]$ and 50% formamide, with GC content of 42% and an average probe size of 200 bases, the Tm is 57° C. The Tm of a DNA duplex decreases by 1-1.5° C. with every 1% decrease in homology. Thus, targets with greater than about 75% sequence identity would be observed using a hybridization temperature of 42° C.

The stringency of the hybridization and wash depend primarily on the salt concentration and temperature of the solutions. In general, to maximize the rate of annealing of the probe with its target, the hybridization is usually carried out at salt and temperature conditions that are 20-25° C. below the calculated Tm of the hybrid. Wash conditions should be as stringent as possible for the degree of identity of the probe for the target. In general, wash conditions are selected to be approximately 12-20° C. below the Tm of the hybrid. In regards to the nucleic acids of the current invention, a moderate stringency hybridization is defined as hybridization in 6×SSC, 5×Denhardt's solution, 0.5% SDS and 100 µg/ml denatured salmon sperm DNA at 42° C., and washed in 2×SSC and 0.5% SDS at 55° C. for 15 minutes. A high stringency hybridization is defined as hybridization in 6×SSC, 5×Denhardt's solution, 0.5% SDS and 100 µg/ml denatured salmon sperm DNA at 42° C., and washed in 1×SSC and 0.5% SDS at 65° C. for 15 minutes. A very high stringency hybridization is defined as hybridization in 6×SSC, 5×Denhardt's solution, 0.5% SDS and 100 µg/ml denatured salmon sperm DNA at 42° C., and washed in 0.1×SSC and 0.5% SDS at 65° C. for 15 minutes.

The term "oligonucleotide," as used herein is defined as a nucleic acid molecule comprised of two or more ribo or deoxyribonucleotides, preferably more than three. The exact size of the oligonucleotide will depend on various factors and on the particular application and use of the oligonucleotide. Oligonucleotides, which include probes and primers, can be any length from 3 nucleotides to the full length of the nucleic acid molecule, and explicitly include every possible number of contiguous nucleic acids from 3 through the full length of the polynucleotide. Preferably, oligonucleotides are at least about 10 nucleotides in length, more preferably at least 15 nucleotides in length, more preferably at least about 20, at least about 30, at least about 40 or about 50 nucleotides in length.

The term "probe" as used herein refers to an oligonucleotide, polynucleotide or nucleic acid, either RNA or DNA, whether occurring naturally as in a purified restriction enzyme digest or produced synthetically, which is capable of annealing with or specifically hybridizing to a nucleic acid with sequences complementary to the probe. A probe may be either single stranded or double stranded. The exact length of the probe will depend upon many factors, including temperature, source of probe and use of the method. For example, for diagnostic applications, depending on the complexity of the target sequence, the oligonucleotide probe typically contains 10, 15-25, 30, 50 or more nucleotides, although it may contain fewer nucleotides. The probes herein are selected to be complementary to different strands of a particular target nucleic acid sequence. This means that the probes must be sufficiently complementary so as to be able to "specifically hybridize" or anneal with their respective target strands under a set of pre-determined conditions. Therefore, the probe sequence need not reflect the exact complementary sequence of the target. For example, a non-complementary nucleotide fragment may be attached to the 5' or 3' end of the probe, with the remainder of the probe sequence being complementary to the target strand. Alternatively, non-complementary bases or longer sequences can be interspersed into the probe, provided that the probe sequence has sufficient complementarity with the sequence of the target nucleic acid to anneal therewith specifically.

The term "primer" as used herein refers to an oligonucleotide, either RNA or DNA, either single stranded or double stranded, either derived from a biological system, generated by restriction enzyme digestion, or produced synthetically which, when placed in the proper environment, is able to functionally act as an initiator of template-dependent nucleic acid synthesis. When presented with an appropriate nucleic acid template, suitable nucleoside triphosphate precursors of nucleic acids, a polymerase enzyme, suitable cofactors and conditions such as a suitable temperature and pH, the primer may be extended at its 3' terminus by the addition of nucleotides by the action of a polymerase or similar activity to yield a primer extension product. The primer may vary in length depending on the particular conditions and requirement of the application. For example, in diagnostic applications, the oligonucleotide primer is typically 10, 15-25, 30, 50 or more nucleotides in length. The primer must be of sufficient complementarity to the desired template to prime the synthesis of the desired extension product, that is, to be able anneal with the desired template strand in a manner sufficient to provide the 3' hydroxyl moiety of the primer in appropriate juxtaposition for use in the initiation of synthesis by a polymerase or similar enzyme. It is not required that the primer sequence represent an exact complement of the desired template. For example, a non-complementary nucleotide sequence may be attached to the 5' end of an otherwise complementary primer. Alternatively, non-complementary bases may be interspersed within the oligonucleotide primer sequence, provided that the primer sequence has sufficient complementarity with the sequence of the desired template strand to functionally provide a template primer complex for the synthesis of the extension product.

Polymerase chain reaction (PCR) has been described in U.S. Pat. Nos. 4,683,195, 4,800,195, and 4,965,188, the entire disclosures of which are incorporated by reference herein.

An "siRNA" refers to a molecule involved in the RNA interference process for a sequence-specific post-transcriptional gene silencing or gene knockdown by providing small interfering RNAs (siRNAs) that has homology with the sequence of the targeted gene. Small interfering RNAs (siRNAs) can be synthesized in vitro or generated by ribonuclease III cleavage from longer dsRNA and are the mediators of sequence-specific mRNA degradation. Preferably, the siRNA of the invention are chemically synthesized using appropriately protected ribonucleoside phosphoramidites and a conventional DNA/RNA synthesizer. The siRNA can be synthesized as two separate, complementary RNA molecules, or as a single RNA molecule with two complementary regions. Commercial suppliers of synthetic RNA molecules or synthesis reagents include Applied Biosystems (Foster City, Calif., USA), Proligo (Hamburg, Germany), Dharmacon Research (Lafayette, Colo., USA), Pierce Chemical (part of Perbio Science, Rockford, Ill., USA), Glen Research (Sterling, Va., USA), ChemGenes (Ashland, Mass., USA) and Cruachem (Glasgow, UK). Specific siRNA constructs for inhibiting DENN/D1B mRNA, for example, may be between 15-35 nucleotides in length, and more typically about 21 nucleotides in length. Exemplary siRNA sequences effective for down-modulating expression of the asthma associated genes can be readily obtained from the above identified commercial sources.

The term "vector" relates to a single or double stranded circular nucleic acid molecule that can be infected, transfected or transformed into cells and replicate independently or within the host cell genome. A circular double stranded nucleic acid molecule can be cut and thereby linearized upon treatment with restriction enzymes. An assortment of vectors, restriction enzymes, and the knowledge of the nucleotide sequences that are targeted by restriction enzymes are readily available to those skilled in the art, and include any replicon, such as a plasmid, cosmid, bacmid, phage or virus, to which another genetic sequence or element (either DNA or RNA) may be attached so as to bring about the replication of the attached sequence or element. A nucleic acid molecule of the invention can be inserted into a vector by cutting the vector with restriction enzymes and ligating the two pieces together.

Many techniques are available to those skilled in the art to facilitate transformation, transfection, or transduction of the expression construct into a prokaryotic or eukaryotic organism. The terms "transformation", "transfection", and "transduction" refer to methods of inserting a nucleic acid and/or expression construct into a cell or host organism. These methods involve a variety of techniques, such as treating the cells with high concentrations of salt, an electric field, or detergent, to render the host cell outer membrane or wall permeable to nucleic acid molecules of interest, microinjection, PEG-fusion, and the like.

The term "promoter element" describes a nucleotide sequence that is incorporated into a vector that, once inside an appropriate cell, can facilitate transcription factor and/or polymerase binding and subsequent transcription of portions of the vector DNA into mRNA. In one embodiment, the promoter element of the present invention precedes the 5' end of the asthma specific marker nucleic acid molecule such that the latter is transcribed into mRNA. Host cell machinery then translates mRNA into a polypeptide.

Those skilled in the art will recognize that a nucleic acid vector can contain nucleic acid elements other than the promoter element and the asthma specific marker encoding nucleic acid. These other nucleic acid elements include, but are not limited to, origins of replication, ribosomal binding sites, nucleic acid sequences encoding drug resistance enzymes or amino acid metabolic enzymes, and nucleic acid sequences encoding secretion signals, localization signals, or signals useful for polypeptide purification.

A "replicon" is any genetic element, for example, a plasmid, cosmid, bacmid, plastid, phage or virus, that is capable of replication largely under its own control. A replicon may be either RNA or DNA and may be single or double stranded.

An "expression operon" refers to a nucleic acid segment that may possess transcriptional and translational control sequences, such as promoters, enhancers, translational start signals (e.g., ATG or AUG codons), polyadenylation signals, terminators, and the like, and which facilitate the expression of a polypeptide coding sequence in a host cell or organism.

As used herein, the terms "reporter," "reporter system", "reporter gene," or "reporter gene product" shall mean an operative genetic system in which a nucleic acid comprises a gene that encodes a product that when expressed produces a reporter signal that is a readily measurable, e.g., by biological assay, immunoassay, radio immunoassay, or by colorimetric, fluorogenic, chemiluminescent or other methods. The nucleic acid may be either RNA or DNA, linear or circular, single or double stranded, antisense or sense polarity, and is operatively linked to the necessary control elements for the expression of the reporter gene product. The required control elements will vary according to the nature of the reporter system and whether the reporter gene is in the form of DNA or RNA, but may include, but not be limited to, such elements as promoters, enhancers, translational control sequences, poly A addition signals, transcriptional termination signals and the like.

The introduced nucleic acid may or may not be integrated (covalently linked) into nucleic acid of the recipient cell or organism. In bacterial, yeast, plant and mammalian cells, for example, the introduced nucleic acid may be maintained as an episomal element or independent replicon such as a plasmid. Alternatively, the introduced nucleic acid may become integrated into the nucleic acid of the recipient cell or organism and be stably maintained in that cell or organism and further passed on or inherited to progeny cells or organisms of the recipient cell or organism. Finally, the introduced nucleic acid may exist in the recipient cell or host organism only transiently.

The term "selectable marker gene" refers to a gene that when expressed confers a selectable phenotype, such as antibiotic resistance, on a transformed cell.

The term "operably linked" means that the regulatory sequences necessary for expression of the coding sequence are placed in the DNA molecule in the appropriate positions relative to the coding sequence so as to effect expression of the coding sequence. This same definition is sometimes applied to the arrangement of transcription units and other transcription control elements (e.g. enhancers) in an expression vector.

The terms "recombinant organism," or "transgenic organism" refer to organisms which have a new combination of genes or nucleic acid molecules. A new combination of genes or nucleic acid molecules can be introduced into an organism using a wide array of nucleic acid manipulation techniques available to those skilled in the art. The term "organism" relates to any living being comprised of a least one cell. An organism can be as simple as one eukaryotic cell or as complex as a mammal. Therefore, the phrase "a recombinant organism" encompasses a recombinant cell, as well as eukaryotic and prokaryotic organism.

The term "isolated protein" or "isolated and purified protein" is sometimes used herein. This term refers primarily to a protein produced by expression of an isolated nucleic acid molecule of the invention. Alternatively, this term may refer to a protein that has been sufficiently separated from other proteins with which it would naturally be associated, so as to exist in "substantially pure" form. "Isolated" is not meant to exclude artificial or synthetic mixtures with other compounds or materials, or the presence of impurities that do not interfere with the fundamental activity, and that may be present, for example, due to incomplete purification, addition of stabilizers, or compounding into, for example, immunogenic preparations or pharmaceutically acceptable preparations.

A "specific binding pair" comprises a specific binding member (sbm) and a binding partner (bp) which have a particular specificity for each other and which in normal conditions bind to each other in preference to other molecules. Examples of specific binding pairs are antigens and antibodies, ligands and receptors and complementary nucleotide sequences. The skilled person is aware of many other examples. Further, the term "specific binding pair" is also applicable where either or both of the specific binding member and the binding partner comprise a part of a large molecule. In embodiments in which the specific binding pair comprises nucleic acid sequences, they will be of a length to hybridize to each other under conditions of the assay, preferably greater than 10 nucleotides long, more preferably greater than 15, greater than 20 nucleotides long or greater than 30 nucleotides long.

"Sample" or "patient sample" or "biological sample" generally refers to a sample which may be tested for a particular molecule, preferably an asthma specific marker molecule, such as a marker shown in the tables provided below. Samples may include but are not limited to cells, body fluids, including blood, serum, plasma, urine, saliva, tears, pleural fluid and the like.

The terms "agent" and "test compound" are used interchangeably herein and denote a chemical compound, a mixture of chemical compounds, a biological macromolecule, or an extract made from biological materials such as bacteria, plants, fungi, or animal (particularly mammalian) cells or tissues. Biological macromolecules include siRNA, shRNA, antisense oligonucleotides, peptides, peptide/DNA complexes, and any nucleic acid based molecule which exhibits the capacity to modulate the activity of the SNP containing nucleic acids described herein or their encoded proteins. Agents are evaluated for potential biological activity by inclusion in screening assays described hereinbelow.

Methods of Using Asthma-Associated SNPS for Diagnosing a Propensity for the Development of Asthma in Subjects of European and African American Ancestry Nucleotides comprising asthma-associated single nucleotide polymorphisms (SNPs) as described herein in the Tables, for example at Table 18, may be used for a variety of purposes in accordance with the present invention. For example, asthma-associated SNP-containing DNA, RNA, or fragments thereof may be used as probes or primers to detect the presence of and/or expression of asthma-associated SNPs, or SNPs in linkage disequilibrium with one or more of the asthma-associated SNPs. Methods in which SNP-containing nucleic acids may be utilized as probes or primers include, but are not limited to: (1) in situ hybridization; (2) Southern hybridization (3) northern hybridization; and (4) assorted amplification reactions such as polymerase chain reactions (PCR) or quantitative PCR (qPCR).

Further, assays for detecting asthma-associated SNPs or the proteins encoded thereby may be conducted on any type of biological sample, including but not limited to body fluids (including blood, urine, serum, gastric lavage), any type of cell (such as brain cells, white blood cells, mononuclear cells) or body tissue.

From the foregoing discussion, it can be seen that asthma-associated SNP containing nucleic acids, vectors expressing the same, asthma-associated SNP containing marker proteins and anti-asthma specific marker antibodies may be used to detect asthma associated SNPs in body tissue, cells, or fluid, and to diagnose, detect, or identify a human subject as having a predisposition for, or having, asthma.

In some embodiments for screening for asthma-associated SNPs, the asthma-associated SNP containing nucleic acid in the sample will initially be amplified, e.g. using PCR, to increase the amount of the templates as compared to other sequences present in the sample. This allows the target sequences to be detected with a high degree of sensitivity if they are present in the sample. This initial step may be avoided by using highly sensitive array techniques that are becoming increasingly important in the art.

Alternatively, new detection technologies can overcome this limitation and enable analysis of small samples containing as little as 1 µg of total RNA. Using Resonance Light Scattering (RLS) technology, as opposed to traditional fluorescence techniques, multiple reads can detect low quantities of mRNAs using biotin labeled hybridized targets and anti-biotin antibodies. Another alternative to PCR amplification involves planar wave guide technology (PWG) to increase signal-to-noise ratios and reduce background interference. Both techniques are commercially available from Qiagen Inc. (USA).

Thus any of the aforementioned techniques may be used to detect or quantify asthma-associated SNP marker expression and accordingly, diagnose asthma.

Kits and Articles of Manufacture

Any of the aforementioned SNP-containing nucleic acids can be incorporated into a kit. In some embodiments, the kit comprises one or more nucleic acid molecules comprising an asthma-associated SNP. In some embodiments, the nucleic acid molecule is immobilized on a solid support, such as on a Gene Chip. In some embodiments, the solid support is affixed to the support so that it does not diffuse from the support when placed in solution. In some embodiments, the kit further comprises an oligonucleotide, a polypeptide, a peptide, an antibody, a label, marker, or reporter, a pharmaceutically acceptable carrier, a physiologically acceptable carrier, instructions for use, a container, a vessel for administration, an assay substrate, or any combination thereof.

Methods of Using Asthma-Associated SNPS for Development of Therapeutic Agents

Since the SNPs identified herein have been associated with the etiology of asthma, methods for identifying agents that modulate the activity of the genes and their encoded products containing such SNPs should result in the generation of efficacious therapeutic agents for the treatment of this condition.

Chromosomes 6, 9 and 10 contain protein coding regions which provide suitable targets for the rational design of therapeutic agents which modulate their activity. Small peptide molecules corresponding to these regions may be used to advantage in the design of therapeutic agents which effectively modulate the activity of the encoded proteins.

Molecular modeling should facilitate the identification of specific organic molecules with capacity to bind to the active site of the proteins encoded by the SNP containing nucleic acids based on conformation or key amino acid residues required for function. A combinatorial chemistry approach will be used to identify molecules with greatest activity and then iterations of these molecules will be developed for further cycles of screening. In certain embodiments, candidate drugs can be screened from large libraries of synthetic or natural compounds. One example is an FDA approved library of compounds that can be used by humans. In addition, compound libraries are commercially available from a number of companies including but not limited to Maybridge Chemical Co. (Trevillet, Cornwall, UK), Comgenex (Princeton, N.J.), Microsource (New Milford, Conn.), Aldrich (Milwaukee, Wis.), AKos Consulting and Solutions GmbH (Basel, Switzerland), Ambinter (Paris, France), Asinex (Moscow, Russia), Aurora (Graz, Austria), BioFocus DPI, Switzerland, Bionet (Camelford, UK), ChemBridge, (San Diego, Calif.), ChemDiv, (San Diego, Calif.), Chemical Block Lt, (Moscow, Russia), ChemStar (Moscow, Russia), Exclusive Chemistry, Ltd (Obninsk, Russia), Enamine (Kiev, Ukraine), Evotec (Hamburg, Germany), Indofine (Hillsborough, N.J.), Interbioscreen (Moscow, Russia), Interchim (Montlucon, France), Life Chemicals, Inc. (Orange, Conn.), Microchemistry Ltd. (Moscow, Russia), Otava, (Toronto, ON), PharmEx Ltd. (Moscow, Russia), Princeton Biomolecular (Monmouth Junction, N.J.), Scientific Exchange (Center Ossipee, N.H.), Specs (Delft, Netherlands), TimTec (Newark, Del.), Toronto Research Corp. (North York ON), UkrOrgSynthesis (Kiev, Ukraine), Vitas-M, (Moscow, Russia), Zelinsky Institute, (Moscow, Russia), and Bicoll (Shanghai, China).

Libraries of natural compounds in the form of bacterial, fungal, plant and animal extracts are commercially available or can be readily prepared by methods well known in the art. It is proposed that compounds isolated from natural sources, such as animals, bacteria, fungi, plant sources, including leaves and bark, and marine samples may be assayed as candidates for the presence of potentially useful pharmaceutical agents. It will be understood that the pharmaceutical agents to be screened could also be derived or synthesized from chemical compositions or man-made compounds. Several commercial libraries can be used in the screens.

The polypeptides or fragments employed in drug screening assays may either be free in solution, affixed to a solid support or within a cell. One method of drug screening utilizes eukaryotic or prokaryotic host cells which are stably transformed with recombinant polynucleotides expressing the polypeptide or fragment, preferably in competitive binding assays. Such cells, either in viable or fixed form, can be used for standard binding assays. One may determine, for example, formation of complexes between the polypeptide or fragment and the agent being tested, or examine the degree to which the formation of a complex between the polypeptide or fragment and a known substrate is interfered with by the agent being tested.

Another technique for drug screening provides high throughput screening for compounds having suitable binding affinity for the encoded polypeptides and is described in detail in Geysen, PCT published application WO 84/03564, published on Sep. 13, 1984. Briefly stated, large numbers of different, small peptide test compounds, such as those described above, are synthesized on a solid substrate, such as plastic pins or some other surface. The peptide test compounds are reacted with the target polypeptide and washed. Bound polypeptide is then detected by methods well known in the art.

A further technique for drug screening involves the use of host eukaryotic cell lines or cells (such as airway smooth muscle cells) which have a nonfunctional or altered asthma associated gene. These host cell lines or cells are defective at the polypeptide level. The host cell lines or cells are grown in the presence of drug compound. The rate of constriction or relaxation of the host cells is measured to determine if the compound is capable of regulating the airway responsiveness in the defective cells. Host cells contemplated for use in the present invention include but are not limited to bacterial cells, fungal cells, insect cells, mammalian cells, and plant cells. The asthma-associated SNP encoding DNA molecules may be introduced singly into such host cells or in combination to assess the phenotype of cells conferred by such expression. Methods for introducing DNA molecules are also well known to those of ordinary skill in the art. Such methods are set forth in Ausubel et al. eds., Current Protocols in Molecular Biology, John Wiley & Sons, NY, N.Y. 1995, the disclosure of which is incorporated by reference herein.

A wide variety of expression vectors are available that can be modified to express the novel DNA sequences of this invention. The specific vectors exemplified herein are merely illustrative, and are not intended to limit the scope of the invention. Expression methods are described by Sambrook et al. Molecular Cloning: A Laboratory Manual or Current Protocols in Molecular Biology 16.3-17.44 (1989). Expression methods in Saccharomyces are also described in Current Protocols in Molecular Biology (1989).

Suitable vectors for use in practicing the invention include prokaryotic vectors such as the pNH vectors (Stratagene Inc., 11099 N. Torrey Pines Rd., La Jolla, Calif. 92037), pET vectors (Novogen Inc., 565 Science Dr., Madison, Wis. 53711) and the pGEX vectors (Pharmacia LKB Biotechnology Inc., Piscataway, N.J. 08854). Examples of eukaryotic vectors useful in practicing the present invention include the vectors pRc/CMV, pRc/RSV, and pREP (Invitrogen, 11588 Sorrento Valley Rd., San Diego, Calif. 92121); pcDNA3.1/V5&His (Invitrogen); baculovirus vectors such as pVL1392, pVL1393, or pAC360 (Invitrogen); and yeast vectors such as YRP17, YIPS, and YEP24 (New England Biolabs, Beverly, Mass.), as well as pRS403 and pRS413 Stratagene Inc.); Picchia vectors such as pHIL-D1 (Phillips Petroleum Co., Bartlesville, Okla. 74004); retroviral vectors such as PLNCX and pLPCX (Clontech); and adenoviral and adeno-associated viral vectors.

Promoters for use in expression vectors of this invention include promoters that are operable in prokaryotic or eukaryotic cells. Promoters that are operable in prokaryotic cells include lactose (lac) control elements, bacteriophage lambda (pL) control elements, arabinose control elements, tryptophan (trp) control elements, bacteriophage T7 control elements, and hybrids thereof. Promoters that are operable in eukaryotic cells include Epstein Barr virus promoters, adenovirus promoters, SV40 promoters, Rous Sarcoma Virus promoters, cytomegalovirus (CMV) promoters, baculovirus promoters such as AcMNPV polyhedrin promoter, Picchia promoters such as the alcohol oxidase promoter, and Saccharomyces promoters such as the gal4 inducible promoter and the PGK constitutive promoter. In addition, a vector of this invention may contain any one of a number of various markers facilitating the selection of a transformed host cell. Such markers include genes associated with temperature sensitivity, drug resistance, or enzymes associated with phenotypic characteristics of the host organisms.

Host cells expressing the asthma-associated SNPs of the present invention or functional fragments thereof provide a system in which to screen potential compounds or agents for the ability to modulate the development of asthma. Thus, in one embodiment, the nucleic acid molecules of the invention may be used to create recombinant cell lines for use in assays to identify agents which modulate aspects of aberrant cytokine signaling associated with asthma and aberrant bronchoconstriction. Also provided herein are methods to screen for compounds capable of modulating the function of proteins encoded by SNP containing nucleic acids.

Another approach entails the use of phage display libraries engineered to express fragment of the polypeptides encoded by the SNP containing nucleic acids on the phage surface. Such libraries are then contacted with a combinatorial chemical library under conditions wherein binding affinity between the expressed peptide and the components of the chemical library may be detected. U.S. Pat. Nos. 6,057,098 and 5,965,456 provide methods and apparatus for performing such assays.

The goal of rational drug design is to produce structural analogs of biologically active polypeptides of interest or of small molecules with which they interact (e.g., agonists, antagonists, inhibitors) in order to fashion drugs which are, for example, more active or stable forms of the polypeptide, or which, e.g., enhance or interfere with the function of a polypeptide in vivo. See, e.g., Hodgson, (1991) Bio/Technology 9:19-21. In one approach, discussed above, the three-dimensional structure of a protein of interest or, for example, of the protein-substrate complex, is solved by x-ray crystallography, by nuclear magnetic resonance, by computer modeling or most typically, by a combination of approaches. Less often, useful information regarding the structure of a polypeptide may be gained by modeling based on the structure of homologous proteins. An example of rational drug design is the development of HIV protease inhibitors (Erickson et al., (1990) Science 249:527-533). In addition, peptides may be analyzed by an alanine scan (Wells, (1991) Meth. Enzym. 202:390-411). In this technique, an amino acid residue is replaced by Ala, and its effect on the peptide's activity is determined. Each of the amino acid residues of the peptide is analyzed in this manner to determine the important regions of the peptide.

It is also possible to isolate a target-specific antibody, selected by a functional assay, and then to solve its crystal structure. In principle, this approach yields a pharmacore upon which subsequent drug design can be based.

One can bypass protein crystallography altogether by generating anti-idiotypic antibodies (anti-ids) to a functional, pharmacologically active antibody. As a mirror image of a mirror image, the binding site of the anti-ids would be expected to be an analog of the original molecule. The anti-id could then be used to identify and isolate peptides from banks of chemically or biologically produced banks of peptides. Selected peptides would then act as the pharmacore.

Thus, one may design drugs which have, e.g., improved polypeptide activity or stability or which act as inhibitors, agonists, antagonists, etc. of polypeptide activity. By virtue of the availability of SNP containing nucleic acid sequences described herein, sufficient amounts of the encoded polypeptide may be made available to perform such analytical studies as x-ray crystallography. In addition, the knowledge of the protein sequence provided herein will guide those employing computer modeling techniques in place of, or in addition to x-ray crystallography.

In another embodiment, the availability of asthma-associated SNP containing nucleic acids enables the production of strains of laboratory mice carrying the asthma-associated SNPs of the invention. Transgenic mice expressing the asthma-associated SNP of the invention provide a model system in which to examine the role of the protein encoded by the SNP containing nucleic acid in the development and progression towards asthma. Methods of introducing transgenes in laboratory mice are known to those of skill in the art. Three common methods include: 1. integration of retroviral vectors encoding the foreign gene of interest into an early embryo; 2. injection of DNA into the pronucleus of a newly fertilized egg; and 3. the incorporation of genetically manipulated embryonic stem cells into an early embryo. Production of the transgenic mice described above will facilitate the molecular elucidation of the role that a target protein plays in various processes associated with the asthmatic phenotype, including: aberrant bronchoconstriction, airway inflammation and altered IgE production. Such mice provide an in vivo screening tool to study putative therapeutic drugs in a whole animal model and are encompassed by the present invention.

The term "animal" is used herein to include all vertebrate animals, except humans. It also includes an individual animal in all stages of development, including embryonic and fetal stages. A "transgenic animal" is any animal containing one or more cells bearing genetic information altered or received, directly or indirectly, by deliberate genetic manipulation at the subcellular level, such as by targeted recombination or microinjection or infection with recombinant virus. The term "transgenic animal" is not meant to encompass classical cross-breeding or in vitro fertilization, but rather is meant to encompass animals in which one or more cells are altered by or receive a recombinant DNA molecule. This molecule may be specifically targeted to a defined genetic locus, be randomly integrated within a chromosome, or it may be extrachromosomally replicating DNA. The term "germ cell line transgenic animal" refers to a transgenic animal in which the genetic alteration or genetic information was introduced into a germ line cell, thereby conferring the ability to transfer the genetic information to offspring. If such offspring, in fact, possess some or all of that alteration or genetic information, then they, too, are transgenic animals.

The alteration of genetic information may be foreign to the species of animal to which the recipient belongs, or foreign only to the particular individual recipient, or may be genetic information already possessed by the recipient. In the last case, the altered or introduced gene may be expressed differently than the native gene. Such altered or foreign genetic information would encompass the introduction of asthma-associated SNP containing nucleotide sequences.

The DNA used for altering a target gene may be obtained by a wide variety of techniques that include, but are not limited to, isolation from genomic sources, preparation of cDNAs from isolated mRNA templates, direct synthesis, or a combination thereof.

A preferred type of target cell for transgene introduction is the embryonal stem cell (ES). ES cells may be obtained from pre-implantation embryos cultured in vitro (Evans et al., (1981) Nature 292:154-156; Bradley et al., (1984) Nature 309:255-258; Gossler et al., (1986) Proc. Natl. Acad. Sci. 83:9065-9069). Transgenes can be efficiently introduced into the ES cells by standard techniques such as DNA transfection or by retrovirus-mediated transduction. The resultant transformed ES cells can thereafter be combined with blastocysts from a non-human animal. The introduced ES cells thereafter colonize the embryo and contribute to the germ line of the resulting chimeric animal.

One approach to the problem of determining the contributions of individual genes and their expression products is to use isolated asthma-associated SNP genes as insertional cassettes to selectively inactivate a wild-type gene in totipotent ES cells (such as those described above) and then generate transgenic mice. The use of gene-targeted ES cells in the generation of gene-targeted transgenic mice was described, and is reviewed elsewhere (Frohman et al., (1989) Cell 56:145-147; Bradley et al., (1992) Bio/Technology 10:534-539).

Techniques are available to inactivate or alter any genetic region to a mutation desired by using targeted homologous recombination to insert specific changes into chromosomal alleles. However, in comparison with homologous extrachromosomal recombination, which occurs at a frequency approaching 100%, homologous plasmid-chromosome recombination was originally reported to only be detected at frequencies between 10-6 and 10-3. Nonhomologous plasmid-chromosome interactions are more frequent occurring at levels $10^5$-fold to $10^2$ fold greater than comparable homologous insertion.

To overcome this low proportion of targeted recombination in murine ES cells, various strategies have been developed to detect or select rare homologous recombinants. One approach for detecting homologous alteration events uses the polymerase chain reaction (PCR) to screen pools of transformed cells for homologous insertion, followed by screening of individual clones. Alternatively, a positive genetic selection approach has been developed in which a marker gene is constructed which will only be active if homologous insertion occurs, allowing these recombinants to be selected directly. One of the most powerful approaches developed for selecting homologous recombinants is the positive-negative selection (PNS) method developed for genes for which no direct selection of the alteration exists. The PNS method is more efficient for targeting genes which are not expressed at high levels because the marker gene has its own promoter. Non-homologous recombinants are selected against by using the Herpes Simplex virus thymidine kinase (HSV-TK) gene and selecting against its non-homologous insertion with effective herpes drugs such as gancyclovir (GANC) or (1-(2-deoxy-2-fluoro-B-D arabino-fluranosyl)-5-iodou-racil, (FIAU). By this counter selection, the number of homologous recombinants in the surviving transformed cells can be increased. Utilizing asthma-associated SNP containing nucleic acid as a targeted insertional cassette provides means to detect a successful insertion as visualized, for example, by acquisition of immunoreactivity to an antibody immunologically specific for the polypeptide encoded by asthma-associated SNP nucleic acid and, therefore, facilitates screening/selection of ES cells with the desired genotype.

As used herein, a knock-in animal is one in which the endogenous murine gene, for example, has been replaced with human asthma-associated SNP containing gene of the invention. Such knock-in animals provide an ideal model system for studying the development of asthma.

As used herein, the expression of a asthma-associated SNP containing nucleic acid, fragment thereof, or an asthma-associated SNP fusion protein can be targeted in a "tissue specific manner" or "cell type specific manner" using a vector in which nucleic acid sequences encoding all or a portion of asthma-associated SNP are operably linked to regulatory sequences (e.g., promoters and/or enhancers) that direct expression of the encoded protein in a particular tissue or cell type. Such regulatory elements may be used to advantage for both in vitro and in vivo applications. Promoters for directing tissue specific proteins are well known in the art and described herein.

The nucleic acid sequence encoding the asthma-associated SNP of the invention may be operably linked to a variety of different promoter sequences for expression in transgenic animals. Such promoters include, but are not limited to airway cell specific promoters, a CMV promoter, a prion gene promoter such as hamster and mouse Prion promoter (MoPrP), described in U.S. Pat. No. 5,877,399 and in Borchelt et al., Genet. Anal. 13(6) (1996) pages 159-163; a rat neuronal specific enolase promoter, described in U.S. Pat. Nos. 5,612,486, and 5,387,742; a platelet-derived growth factor B gene promoter, described in U.S. Pat. No. 5,811,633; a brain specific dystrophin promoter, described in U.S. Pat. No. 5,849,999; a Thy-1 promoter; and a PGK promoter; for the expression of transgenes in airway smooth muscle cells.

Methods of use for the transgenic mice of the invention are also provided herein. Transgenic mice into which a nucleic acid containing the asthma-associated SNP or its encoded protein have been introduced are useful, for example, to develop screening methods to screen therapeutic agents to identify those capable of modulating the development of asthma.

Pharmaceuticals and Methods of Treatment and Uses

In some embodiments, methods for treating asthma are provided comprising administering an agent useful in the treatment of asthma to a subject having one or more SNPs recited in Table 18, or a SNP in linkage disequilibrium with one or more of these SNPs.

In some embodiments, methods for treating asthma in a European subject comprising administering an agent useful in the treatment of asthma to a subject having one or more SNPs recited in SEQ ID NO: 1-12, 14, 15 and 162, or a SNP in linkage disequilibrium with one or more of these SNPs.

In some embodiments, methods for treating asthma in an African American subject comprising administering an agent useful in the treatment of asthma to a subject having SNP rs11788591 (SEQ ID NO: 16), or a SNP in linkage disequilibrium with this SNP, or the SNPs recited in Table 16, or SNPs in linkage disequilibrium with these SNPs.

In each of the method of treating embodiments described above, the method may further comprise detecting or diagnosing the subject prior to treatment, wherein the detection or diagnosing comprises detecting one or more SNPs recited in Table 18, or a SNP in linkage disequilibrium with one or more of these SNPs.

In some embodiments, the agent comprises one or more of the agents recited in Table 4.

In some embodiments, the agent is selected from one or more of a PGE synthetic agonist, an oral steroid, an anti-IgE, a β1 agonist, a β2 agonist, a mast cell stabilizer, a leukotriene antagonist, Ipratropium bromide, and a phosphodiesterase inhibitor.

In some embodiments, the agent is selected from Epoprostenol, Iloprost, Treprostinil, Methylprednisolone, Prednisone, Prednisolone, Triamcinolone, Omalizumab, Beclomethasone, Budesonide, Ciclesonide, Flunisolide, Fluticasone, Fluticasone propionate HFA, Fluticasone Propionate inhaled, Mometasone, Triamcinolone Acetonide, Triamcinolone, Dobutamine, Epinephrine, Racepinephrine Isoproterenol β1, Isoproterenol β2, Methylxanthine, Theophylline, Arformoterol, Albuterol, Albuterol Sulfate, Clenbuterol, Fenoterol, Formoterol, Isoetarine, Levalbuterol, Levalbuterol HCL, Levalbuterol Tartrate, Metaproterenol, Pirbuterol, Procaterol, Ritodrine, Salmeterol, Terbutaline, Cromolyn, Cromolyn Sodium, Nedocromi, Montelukast, Zafirlukast, Zileuton, Ipratropium Bromide, Aerovent, Apovent, Atrovent, Ipraxa, and Ibudilast.

In each of the method of treating embodiments described above, the method may further comprise administering a second agent that is the same or different from the first agent, each agent being any agent known to those of skill to be useful in the treatment of asthma, such as, for example, the agents of Table 4. In some embodiments, the second agent is selected from
   i) a PGE-agonist and a leukotriene inhibitor;
   ii) a PGE-agonist and low dose inhaled steroid;
   iii) a PGE-agonist and a beta adrenergic agonist;
   iv) a PGE-agonist and a phosphodiesterase inhibitor;
   v) a PGE-agonist and an anti-IgE antibody;
   vi) a PGE-agonist and anticholinergic agent; and
   vii) a PGE-agonist and a mast cell stabilizer.

The second agent may be administered at the same time or after the first agent.

In some embodiments, a third agent is administered. In some aspects, the third agent is a mast cell stabilizer. The third agent may be administered at the same time or after the first and/or second agent.

In some embodiments, the PGE-agonist is selected from epoprostenol, iloprost and treprostinil, said leukotriene inhibitor is montelukast; said inhaled steroid is fluticasone; said phospdiesterase inhibitor is theophylline, said anti-IgE antibody is Xolair, said anticholinergic agent is Atrovent, and said mast cell stabilizer is chromolyn.

These agents may comprise, in addition to one of the above substances, a pharmaceutically acceptable excipient, carrier, buffer, stabilizer or other materials well known to those skilled in the art. Such materials should be non-toxic and should not interfere with the efficacy of the active ingredient. The precise nature of the carrier or other material may depend on the route of administration, e.g. oral, intravenous, cutaneous or subcutaneous, nasal, aerosolized, intramuscular, and intraperitoneal routes.

A lipid nanoparticle composition is a composition comprising one or more biologically active molecules independently or in combination with a cationic lipid, a neutral lipid, and/or a polyethyleneglycol-diacylglycerol (i.e., polyethyleneglycol diacylglycerol (PEG-DAG), PEG-cholesterol, or PEG-DMB) conjugate. In one embodiment, the biologically active molecule is encapsulated in the lipid nanoparticle as a result of the process of providing and aqueous solution comprising a biologically active molecule of the invention (i.e., siRNA), providing an organic solution comprising lipid nanoparticle, mixing the two solutions, incubating the solutions, dilution, ultrafiltration, resulting in concentrations suitable to produce nanoparticle compositions.

Nucleic acid molecules can be administered to cells by incorporation into other vehicles, such as biodegradable polymers, hydrogels, cyclodextrins. (see for example Gonzalez et al., 1999, Bioconjugate Chem., 10, 1068-1074; Wang et al., International PCT publication Nos. WO 03/47518 and WO 03/46185), poly(lactic-co-glycolic)acid (PLGA) and PLCA microspheres (see for example U.S. Pat. No. 6,447,796 and US Patent Application Publication No. US 2002130430), biodegradable nanocapsules, and bioadhesive microspheres, or by proteinaceous vectors (O'Hare and Normand, International PCT Publication No. WO 00/53722)

The following materials and methods are provided to facilitate the practice of the present invention.

Study Subjects and Definition of the Asthma Phenotype

Pediatric asthma cases and healthy controls from The Children's Hospital of Philadelphia (CHOP) were selected from the biorepository at the Center for Applied Genomics, which has a collection of over 350,000 samples including over 90,000 internal pediatric samples genotyped using standard genome-wide arrays and linked to subjects' EMRs. All subjects have consented to analyses and EMR mining from the full longitudinal record, which has a mean duration >5.5 years/subject. Mean age of these subjects is 11 years and 47% are of EA ancestry, 43% AA and 10% from other ancestry groups (20).

The adult asthma cohort was collected from seven sites from the eMERGE Network (Table 5). Characteristics of the sample collected at each site can be found in detail in (20). For all sites except Mount Sinai, EA ancestry represented over 80% of the subjects and the mean age of cases was over 48 years.

The project was approved by the Institutional Review Boards at CHOP and each of the eMERGE participating sites. Written informed consent was obtained from each participant in accordance with institutional requirements and the Declaration of Helsinki Principles.

Asthma cases and controls were identified using an EMR-based algorithm developed at CHOP (Hysinger et al, AJRCCM, DOI: 10.1164/rccm.201604-08610C on Sep. 9, 2016), and validated and implemented by the seven eMERGE sites.

The inclusion criteria for cases included being ≥4 years and either: 1) having received ≥1 prescriptions of asthma-related medications (Table 4) and diagnosed with ≥1 ICD9 codes 493.00-493.92 in ≥2 in-person visits, on separate calendar days; or 2) having ≥3 in person visits in any 12 month period, on separate calendar days, with affirmative mentions of "wheezing" or "asthma" in EMR notes. The algorithm was also designed to identify subjects with allergic asthma, defined as individuals having either ICD9 codes for extrinsic asthma (493.00, 493.01 or 493.02), or ≥2 ICD9 codes related to allergies (Table 6) on separate calendar days. Exclusion criteria used for cases included having any ICD9 codes related to respiratory conditions or organ transplantation (Table 7).

Subjects were selected as controls if they had no ICD9 code for asthma, no history of asthma medications, no positive confirmation of "wheezing" or "asthma" in the patient charts and no exclusionary ICD9 codes (Table 7).

The validity of the algorithm was initially assessed on a sample of 100 randomly selected EMRs at CHOP revealing some modifications were required: several prescriptions for medications not included in the initial algorithm were added, and allergy and ICD9 codes 416. xx and 748.5 were added as exclusions for controls (Table 7). Consequently, the algorithm was revised to its current form, rerun and formally validated to generate positive predictive values (PPVs). For the validation, case records were searched for a positive diagnosis of asthma based on physician diagnosis, coughing or wheezing symptoms, and clinical bronchodilator response where available. Similarly, controls were reviewed for the absence of clinical evidence of asthma. Evidence of exclusionary ICD9 codes was also assessed.

Internal validation at CHOP consisted of manual chart review of two independent samples: a first sample of 250 randomly selected subjects (76 cases and 174 controls) and a second sample of 301 asthma cases. External validation of the phenotyping algorithm included 170 subjects: 100 from Cincinnati Children's Hospital Medical Center (50 cases, 50 controls), 20 from Geisinger Clinic (10 cases, 10 controls) and 50 from Marshfield (25 cases, 25 controls). PPVs with 95% confidence interval were calculated for cases and controls at each site.

Genome-Wide Genotyping, Imputation and Population Stratification Assessment

Genotyping was performed at each eMERGE site using Illumina and Affymetrix platforms (Table 8). Imputation of the CHOP cohort was conducted at the Center for Applied Genomics. The eMERGE Coordinating Center (Pennsylvania State University) led the imputation of the adult dataset.

A standard pre-imputation quality control of the genotyping data was implemented at the individual and SNP level using PLINK (22). Cryptic relatedness and duplicated samples were also assessed by pairwise Identity-By-Descent values (PLINK) and removed. Haplotypes were phased using SHAPEIT v2 (23). Genome-wide imputation of the pediatric samples was performed with the IMPUTE2 package (24) using the cosmopolitan reference panel from the 1,000 Genomes Project, which included 1,092 samples from multiple ancestry groups.

Genotype imputation in the adult cohort was performed as described in (25), using SHAPEIT (23) and IMPUTE2 (24) with the cosmopolitan reference panel from the 1000 Genomes Project.

Population ancestry was determined by principal component analysis using Eigenstrat 3.0 (26) on the genotyping data in the pediatric samples and the imputed data in the adults (using 35,324 SNPs common to all Illumina and Affymetrix genotyping platforms). Samples were separated into AA and EA based on the principal components, which were re-generated for each cohort and included as covariates to control for population stratification in each individual analysis.

Association Analysis

We performed four sets of GWAS analyses in the pediatric and adult datasets, including each ancestry group separately, and we then re-analyzed nominally associated SNPs conditioning on allergy status. For the GWAS, we used SNPTEST (27) to take into account the genotype uncertainty introduced by the imputation. An additive model was applied to the genotype dosages generated by IMPUTE2 including the proportion of missing data as a covariate. The first 10 principal components and gender were included as covariates in the analysis of both the pediatric and the adult cohort and because the imputation at the eMERGE Coordinating Center was conducted for each genotyping platform and site separately, chip type and site were also used as covariates in the adults. Poorly imputed variants ('info' score≤0.7), variants with a minor allele frequency≤1% and variants not meeting Hardy-Weinberg equilibrium in controls (p-value<$5 \times 10^{-8}$) were removed from the analysis. Then, METAL was used for the meta-analyses of the EA, AA and the combined sample, and also in the pediatric and adult data sets, using an inverse variance fixed effects method, with control for genomic inflation. Additionally, genomic inflation factors for each individual GWAS and meta-analyses were calculated.

A cis-expression quantitative trait locus (eQTL) effect was investigated for all significant variants and variants in linkage disequilibrium (LD; $r^2>0.6$) by mining HaploReg v4 (28) and the NCBI Genotype-Tissue Expression (GTEx) version 6 (29) in all available tissues.

The Tables below set forth below provide cases study information and features associated with the SNP containing nucleic acids of the invention. Table 18 provides the sequence information for all of the SNPs described in the application.

TABLE 1

Participants of the study by site and ancestry group. The number of cases with allergic asthma is indicated in parenthesis.

| Cohort | African Americans | | | European Americans | | | Total |
|---|---|---|---|---|---|---|---|
| | Controls | Cases (allergy) | Total | Controls | Cases (allergy) | Total | |
| CHOP | 2,993 | 2,379 (1,881) | 5,372 | 4,097 | 1,180 (998) | 5,277 | 10,649 |
| Adults eMERGE | 1,367 | 658 (337) | 2,025 | 7,878 | 1,092 (466) | 8,970 | 10,995 |
| Total | 4,360 | 3,037 (2,218) | 7,397 | 11,975 | 2,272 (1,464) | 14,247 | 21,644 |

TABLE 2

Genome-wide significant associations with asthma after meta-analysis of the pediatric and adult European populations. $r^2$ of all associated SNPs with the top SNP is included. Genomic position is expressed in base pairs; genetic distance in kilobases (kb) and SE stands for standard error. Effect sizes (beta) and standard errors for each individual study along with the the p-value for the Cochran's test of heterogeneity is included in Table 9.

| Marker | Genomic position | Locus | Closest gene (distance) | $r^2$ | Frequency of risk allele | Beta (SE) | p-value all | p-value pediatrics | p-value adults |
|---|---|---|---|---|---|---|---|---|---|
| rs72721168 | 27308288 | 9p21.2 | EQTN (11 kb) | 1 | 0.959 | −0.602 (0.098) | $7.02 \times 10^{-10}$ | $2.62 \times 10^{-4}$ | $3.01 \times 10^{-7}$ |
| rs72721166 | 27304548 | 9p21.2 | EQTN (7.4 kb) | 0.96 | 0.038 | 0.599 (0.102) | $3.83 \times 10^{-9}$ | $1.58 \times 10^{-4}$ | $3.60 \times 10^{-6}$ |
| rs72721164 | 27300439 | 9p21.2 | EQTN (33 kb) | 0.96 | 0.038 | 0.597 (0.101) | $4.06 \times 10^{-9}$ | $1.55 \times 10^{-4}$ | $3.92 \times 10^{-6}$ |
| rs72721158 | 27275906 | 9p21.2 | EQTN (21 kb) | 0.84 | 0.036 | 0.551 (0.100) | $4.04 \times 10^{-8}$ | $4.28 \times 10^{-4}$ | $1.62 \times 10^{-5}$ |
| rs1776883 | 34156444 | 6p21.31 | GRM4 (33 kb) | 1 | 0.472 | −0.222 (0.038) | $5.29 \times 10^{-9}$ | $6.50 \times 10^{-6}$ | $1.02 \times 10^{-4}$ |
| rs1776888 | 34158331 | 6p21.31 | GRM4 (35 kb) | 0.96 | 0.531 | 0.219 (0.038) | $7.63 \times 10^{-9}$ | $7.35 \times 10^{-6}$ | $1.27 \times 10^{-4}$ |

TABLE 2-continued

Genome-wide significant associations with asthma after meta-analysis of the pediatric and adult European populations. $r^2$ of all associated SNPs with the top SNP is included. Genomic position is expressed in base pairs; genetic distance in kilobases (kb) and SE stands for standard error. Effect sizes (beta) and standard errors for each individual study along with the the p-value for the Cochran's test of heterogeneity is included in Table 9.

| Marker | Genomic position | Locus | Closest gene (distance) | $r^2$ | Frequency of risk allele | Beta (SE) | p-value all | p-value pediatrics | p-value adults |
|---|---|---|---|---|---|---|---|---|---|
| rs1776881 | 34156323 | 6p21.31 | GRM4 (33 kb) | 0.97 | 0.53 | 0.218 (0.038) | $7.96 \times 10^{-9}$ | $7.14 \times 10^{-6}$ | $1.39 \times 10^{-4}$ |
| chr6: 34158205:I (rs34754950) | 34158205 | 6p21.31 | GRM4 (35 kb) | 0.99 | 0.467 | −0.217 (0.038) | $1.09 \times 10^{-8}$ | $9.45 \times 10^{-6}$ | $1.47 \times 10^{-4}$ |
| rs1776886 | 34157113 | 6p21.31 | GRM4 (34 kb) | 0.85 | 0.512 | 0.218 (0.039) | $1.90 \times 10^{-8}$ | $7.21 \times 10^{-6}$ | $3.12 \times 10^{-4}$ |
| rs1776885 | 34156978 | 6p21.31 | GRM4 (34 kb) | 0.98 | 0.477 | −0.212 (0.038) | $2.56 \times 10^{-8}$ | $1.78 \times 10^{-5}$ | $2.01 \times 10^{-4}$ |
| rs1776889 | 34159166 | 6p21.31 | GRM4 (36 kb) | 0.84 | 0.498 | −0.212 (0.038) | $2.64 \times 10^{-8}$ | $5.28 \times 10^{-5}$ | $8.11 \times 10^{-5}$ |
| rs1776884 | 34156970 | 6p21.31 | GRM4 (34 kb) | 0.93 | 0.557 | 0.209 (0.038) | $3.78 \times 10^{-8}$ | $2.41 \times 10^{-4}$ | $2.72 \times 10^{-5}$ |

The sequences for the rs markers listed in table 2 from top to bottom are provided in SEQ ID NOS: 1-12.

TABLE 3

Genome-wide significant associations in the meta-analysis of pediatric and adult European subjects adjusted by allergy status of the cases. $r^2$ of all associated SNPs with the top SNP is included. Genomic position is expressed in base pairs, genetic distance is expressed in kilobases (kb) and SE stands for standard error. Table 17 shows the p-values of the variants significantly associated with asthma in the non-adjusted analysis and the analysis adjusting by the allergy status.

| Marker | Genomic position | Locus | Closest gene (distance) | $r^2$ | Frequency of risk allele | Beta (SE) | p-value all | p-value pediatrics | p-value adults |
|---|---|---|---|---|---|---|---|---|---|
| rs72721168 | 27308288 | 9p21.2 | EQTN (11 kb) | — | 0.957 | −0.927 (0.165) | $1.97 \times 10^{-8}$ | $2.44 \times 10^{-3}$ | $1.72 \times 10^{-6}$ |
| rs75446656 | 65100016 | 10q21.3 | JMJD1C (intron 2) | 1 | 0.036 | 0.970 (0.176) | $3.60 \times 10^{-8}$ | $4.94 \times 10^{-7}$ | $3.64 \times 10^{-4}$ |
| rs35632171 | 65109502 | 10q21.3 | JMJD1C (intron 2) | 1 | 0.964 | −0.970 (0.176) | $3.65 \times 10^{-8}$ | $4.98 \times 10^{-7}$ | $3.67 \times 10^{-4}$ |
| rs36080042 | 65426785 | 10q21.3 | REEP3 (68 kb) | 0.6 | 0.036 | 0.964 (0.176) | $4.70 \times 10^{-8}$ | $1.13 \times 10^{-7}$ | $6.99 \times 10^{-4}$ |

The sequences for the rs markers listed in Table 3 from top to bottom are provided in SEQ ID NOS: 1, 162, 14 and 15.

TABLE 4

Asthma-related medications by subtype used for case inclusion and control exclusion by the asthma algorithm. Compounds are present by the generic name and the brand name in parenthesis Oral Steroids Methylprednisolone (Medrol, Medrol Dosepak)
Prednisone (Orasone)
Prednisolone (Orapred, Pediapred, Prelone)
Triamcinolone (Aristocort)
Anti IgE: Omalizumab (Xolair)
Inhaled Steroids Beclomethasone (QVAR)
Budesonide (Pulmicort Turbuhaler, Pulmicort Respules)
Ciclesonide
Flunisolide (Aerobid, Pulmicort Respules)
Fluticasone (Flovent), Fluticasone propionate HFA, Fluticasone Propionate inhaled
Mometasone (Asmanex Twisthaler)
Triamcinolone (Azmacort), Triamcinolone Acetonide
β1 agonists Dobutamine
Epinephrine
Racepinephrine
Isoproterenol (β1 and β2)
Methylxanthine
Theophylline (aminophylline, Dimethylxanthine, Slo-Bid, Theo, Theodur, Theolair, Uniphyl)
Xamoterol
β2 agonists Arformoterol (Brovana, Sunovion,)
Albuterol, Albuterol Sulfate (Salbutamol, Ventolin, Proventil, ProAir, Accuneb)
Clenbuterol
Epinephrine
Fenoterol
Formoterol (Foradil)
Isoetarine
Isoproterenol (β1 and β2)
Levalbuterol, Levalbuterol HCL, Levalbuterol Tartrate (Levosalbutamol, Xopenex)
Metaproterenol
Pirbuterol (Maxair)

TABLE 4-continued

Asthma-related medications by subtype used for case inclusion and control exclusion by the asthma algorithm. Compounds are present by the generic name and the brand name in parenthesis Procaterol
Ritodrine
Salmeterol (Serevent)
Terbutaline (Brethine)
Mast cell stabilizers Cromolyn (Cromoglicic acid, cromoglycate, cromoglicate, Intal), Cromolyn Sodium
Nedocromil (Alocril, Rapitil, Tilade)
Leukotriene-Antagonists Montelukast
Zafirlukast
Zileuton
Ipratropium Bromide Aerovent
Apovent
Atrovent
Ipraxa
Phosphodiesterase Inhibitors: Ibudilast

TABLE 5

Number of cases and controls per ancestry group collected by each of the eMERGE sites and included in the present study.

| | African Americans | | | European Americans | | | |
|---|---|---|---|---|---|---|---|
| | Controls | Cases | Total | Controls | Cases | Total | Total |
| Adult sample (eMERGE) | 1,367 | 658 | 2,025 | 7,878 | 1,092 | 8,970 | 10,995 |
| University of Washington | 3 | 1 | 4 | 91 | 17 | 108 | 112 |
| Marshfield | — | — | — | 74 | 33 | 107 | 107 |
| Mayo Clinic | — | — | — | 1355 | 108 | 1463 | 1463 |
| Northwestern University | — | — | — | 1242 | 120 | 1362 | 1362 |
| Mount Sinai | 782 | 502 | 1284 | 136 | 36 | 172 | 1456 |
| Vanderbilt University | 13 | 30 | 43 | 166 | 93 | 259 | 302 |
| Geisinger | 569 | 125 | 694 | 4814 | 685 | 5499 | 6193 |
| Pediatric sample (CHOP) | 2,993 | 2,379 | 5,372 | 4,097 | 1,180 | 5,277 | 10,649 |
| Total | 4,360 | 3,037 | 7,397 | 11,975 | 2,272 | 14,247 | 21,644 |

TABLE 6

ICD9 codes related to allergies used to classify patients by the allergy status with the asthma algorithm

| ICD9 code | Diagnosis name |
|---|---|
| 287.0 | Allergic purpura |
| 372.14 | Other chronic allergic conjunctivitis |
| 477 | Allergic rhinitis |
| 495 | Extrinsic allergic alveolitis |
| 691.x | Atopic dermatitis and related conditions |
| 708.0 | Allergic urticarial |
| 995.3 | Allergy, unspecified |
| V14 | Personal history of allergy to medicinal agents |
| V15.0 | Allergy, other than to medicinal agents |
| V15.01 | Allergy to peanuts |
| V15.03 | Allergy to eggs |
| V15.09 | Other allergy, other than to medicinal agents |
| V19.6 | Allergic disorders |

TABLE 7

ICD9 codes applied by the asthma algorithm for subject exclusion in cases and controls

| ICD-9 Codes | Diagnosis | Application |
|---|---|---|
| 212.3 | Bronchus and lung | Controls |
| 478.3xx | Vocal Cord Dysfunction | Cases |
| 238.77 | Post-transplant lymphoproliferative disorder | Cases and controls |
| 277.xx | Cystic Fibrosis | Cases and controls |
| 279.4 | Autoimmune disease, not elsewhere classified | Controls |
| 283, 283.1x | Autoimmune and non-autoimmune hemolytic anemias | Controls |
| 287 | Allergic purpura | Controls |
| 372.14 | Other chronic allergic conjunctivitis | Controls |
| 416.xx | Chronic Pulmonary Heart Disease | Controls |
| 460-466.xx | Acute respiratory infections | Controls |
| 470-478.xx | Other diseases of the upper respiratory tract | Controls |

TABLE 7-continued

ICD9 codes applied by the asthma algorithm for subject exclusion in cases and controls

| ICD-9 Codes | Diagnosis | Application |
|---|---|---|
| 480-488.xx | Pneumonia and influenza | Controls |
| 490-492.xx; | Bronchitis, Emphysema | Cases and controls |
| 494-496.xx | Diseases of the respiratory system | Cases and controls |
| 500.xx-508.xx | Pneumoconiosis | Controls |
| 510-519.xx | Other diseases of the respiratory system | Controls |
| 555, 556 | Regional enteritis, ulcerative colitis | Controls |
| 571.42 | Autoimmune hepatitis | Controls |
| 708 | Allergic urticaria | Controls |
| 748.4, 748.5 | Congenital cystic lung; agenesis, hypoplasia, and dysplasia of lung | Controls |
| 751.61 | Biliary atresia | Controls |
| 769.xx | Respiratory Distress Syndrome | Cases and controls |
| V81.3 | Chronic bronchitis and emphysema | Cases |
| 525.66, 995.3; V14, V15.0, V15.01, V15.03, V15.09, V19.6 | Allergies | Controls |
| 996.8; E878.0; V42; V49.83; V58.44 | Organ transplantation | Cases and controls |

TABLE 8

Different chip types used and number of samples genotyped in each platform in the adults dataset

| ChipPlatform | Samples |
|---|---|
| Affymetrix Genome-Wide Human SNP Array 6.0 | 409 |
| Illumina Human 1M | 693 |
| Illumina Hap550 | 164 |
| Illumina Human610-Quad | 130 |
| Illumina660W-QuadBeadchip | 5833 |
| Illumina Human Omni Express | 3766 |

TABLE 9

Effect (beta) and standard error (SE) for the loci associated with asthma in the non-adjusted analysis in the pediatric and adult European American (EA), and African American (AA) and p-value for the Cochran's test of heterogeneity

| Population | SNP | Genomic position | Locus | Gene (distance) | p-value meta-analysis | Beta (SE) pediatric | Beta (SE) adult | Cochran's test p-value |
|---|---|---|---|---|---|---|---|---|
| EA | rs72721158 | 27275906 | 9p21.2 | EQTN (21 kb) | $4.04 \times 10^{-8}$ | 0.537 (0.153) | 0.562 (0.130) | 0.905 |
| EA | rs72721164 | 27300439 | 9p21.2 | EQTN (33 kb) | $4.06 \times 10^{-9}$ | 0.575 (0.152) | 0.615 (0.133) | 0.844 |
| EA | rs72721166 | 27304548 | 9p21.2 | EQTN (7.4 kb) | $3.83 \times 10^{-9}$ | 0.574 (0.152) | 0.618 (0.133) | 0.830 |
| EA | rs72721168 | 27308288 | 9p21.2 | EQTN (11 kb) | $7.02 \times 10^{-10}$ | 0.536 (0.147) | 0.655 (0.128) | 0.547 |
| EA | rs1776881 | 34156323 | 6p21.31 | GRM4 (33 kb) | $7.96 \times 10^{-9}$ | -0.249 (0.055) | -0.193 (0.050) | 0.457 |
| EA | rs1776883 | 34156444 | 6p21.31 | GRM4 (33 kb) | $5.29 \times 10^{-9}$ | -0.251 (0.056) | -0.197 (0.051) | 0.479 |
| EA | rs1776884 | 34156970 | 6p21.31 | GRM4 (34 kb) | $3.78 \times 10^{-8}$ | -0.204 (0.055) | -0.214 (0.051) | 0.888 |
| EA | rs1776885 | 34156978 | 6p21.31 | GRM4 (34 kb) | $2.56 \times 10^{-8}$ | -0.240 (0.056) | -0.189 (0.051) | 0.506 |
| EA | rs1776886 | 34157113 | 6p21.31 | GRM4 (34 kb) | $1.90 \times 10^{-8}$ | -0.255 (0.057) | -0.187 (0.052) | 0.385 |
| EA | rs34754950 | 34158205 | 6p21.31 | GRM4 (35 kb) | $1.09 \times 10^{-8}$ | -0.248 (0.056) | -0.192 (0.050) | 0.460 |
| EA | rs1776888 | 34158331 | 6p21.31 | GRM4 (35 kb) | $7.63 \times 10^{-9}$ | -0.251 (0.056) | -0.193 (0.050) | 0.448 |
| EA | rs1776889 | 34159166 | 6p21.31 | GRM4 (36 kb) | $2.64 \times 10^{-8}$ | -0.227 (0.056) | -0.200 (0.051) | 0.724 |
| AA | rs11788591 | 129740522 | 9q34.11 | PTGES (intronic) | $4.45 \times 10^{-8}$ | 0.320 (0.075) | 0.407 (0.110) | 0.524 |
| All | rs1837253 | 11066174 | 5q22.1 | TLSP (55 kb) | $7.25 \times 10^{-8}$ | EA: 0.203 (0.054); AA: 0.087 (0.045) | EA: 0.186 (0.053); AA: 0.156 (0.078) | 0.356 |

The sequences for the SNP markers listed in Table 9 from top to bottom are provided in SEQ ID NOS: 4, 3, 2, 1, 7, 5, 12, 10, 9, 8, 6, 11, 16 and 96, respectively.

TABLE 10

Expression quantitative trait loci (eQTL) effects with p-value < 0.05 of the variants associated with asthma (genome-wide significant and proxies ($r^2 \geq 0.6$) with p-values $\leq 1 \times 10^{-4}$) in the non-adjusted analysis and the analysis adjusting by the allergic status. GTEx refers to the eQTL results yielded by querying the Genotype-Tissue Expression (GTEx) database (v6) and Haploreg, those obtained by mining this database available on the worldwide web (broadinstitute.org/mammals/haploreg/haploreg_v4.php).

| SNP | Genomic position | p-value | $r^2$ | Locus | GTEx | Haploreg v4 |
|---|---|---|---|---|---|---|
| rs682632 | 27183463 | $4.38 \times 10^{-6}$ | 0.61* | 9p21.2 | EQTN: Esophagus-muscularis (p-value = 0.021; effect = -0.60) TEK: Heart-Atrial Appendage (p-value = 0.018; effect = -0.41); Brain-Nucleus accumbens (p-value = 0.039; effect = 0.68); Esophagus-Gastroesophageal Junction (p-value = 0.043; effect = 0.53) | TEK** |
| rs511619 | 27196494 | $1.34 \times 10^{-5}$ | 0.70* | 9p21.2 | EQTN: Esophagus-muscularis (p-value = 0.021; effect = -0.62) TEK: Brain-Cerebellar Hemisphere (p-value = 0.0023; effect = 2.0); Brain-Nucleus accumbens (p-value = 0.011; effect = 1.1); Brain-cerebellum (p-value = 0.015; effect = -0.83); Pituitary (p-value = 0.017; effect = 1.5); Brain-Caudate (p-value = 0.022; effect = 0.76); Heart-Atrial Appendage (p-value = 0.032; effect = -0.39); Esophagus-Gastroesophageal Junction (p-value = 0.043; effect = 0.53) | No eQTL |

TABLE 10-continued

Expression quantitative trait loci (eQTL) effects with p-value < 0.05 of the variants associated with asthma (genome-wide significant and proxies ($r^2 \geq 0.6$) with p-values $\leq 1 \times 10^{-4}$) in the non-adjusted analysis and the analysis adjusting by the allergic status. GTEx refers to the eQTL results yielded by querying the Genotype-Tissue Expression (GTEx) database (v6) and Haploreg, those obtained by mining this database available on the worldwide web (broadinstitute.org/mammals/haploreg/haploreg_v4.php).

| SNP | Genomic position | p-value | $r^2$ | Locus | GTEx | Haploreg v4 |
|---|---|---|---|---|---|---|
| rs621629 | 27196587 | $3.04 \times 10^{-5}$ | 0.65* | 9p21.2 | EQTN: Esophagus-muscularis (p-value = 0.021; effect = −0.62) TEK: Brain-Cerebellar Hemisphere (p-value = 0.0022; effect = 2.0); Brain-Nucleus accumbens (p-value = 0.011; effect = 1.1); Brain-cerebellum (p-value = 0.015; effect = −0.83); Pituitary (p-value = 0.017; effect = 1.5); Brain-Caudate (basal ganglia) (p-value = 0.022; effect = 0.76); Heart-Atrial Appendage (p-value = 0.031; effect = −0.39); Esophagus-Gastroesophageal Junction (p-value = 0.043; effect = 0.53) | C9orf11 and TEK\*\* |
| rs145744239 | 27241749 | $3.35 \times 10^{-5}$ | 0.6 | 9p21.2 | EQTN: Esophagus-muscularis (p-value = 0.033; effect = 0.55); Artery-Tibial (p-value = 0.040; effect = 0.48) TEK: Esophagus-mucosa (p-value = 0.030; effect = 0.33); Brain-cerebellum (p-value = 0.036; effect = −0.74); Heart-Atrial Appendage (p-value = 0.025; effect = −0.42) | No eQTL |
| rs72721158 | 27275906 | $4.04 \times 10^{-8}$ | 0.84 | 9p21.2 | EQTN: Esophagus-muscularis (p-value = 0.031; effect = 0.54); Artery-Tibial (p-value = 0.037; effect = 0.48) TEK: Esophagus-mucosa (p-value = 0.021; effect = 0.35); Brain-cerebellum (p-value = 0.027; effect = −0.77); Heart-Atrial Appendage (p-value = 0.030; effect = −0.39) | No eQTL |
| rs72721164 | 27300439 | $4.06 \times 10^{-9}$ | 0.96 | 9p21.2 | EQTN: Esophagus-muscularis (p-value = 0.030; effect = 0.55); Artery-Tibial (p-value = 0.037; effect = 0.47) TEK: Esophagus-mucosa (p-value = 0.019; effect = 0.35); Brain-cerebellum (p-value = 0.028; effect = −0.77); Heart-Atrial Appendage (p-value = 0.032; effect = −0.39) | No eQTL |
| rs72721166 | 27304548 | $3.83 \times 10^{-9}$ | 0.96 | 9p21.2 | EQTN: Esophagus-muscularis (p-value = 0.030; effect = 0.55); Artery-Tibial (p-value = 0.037; effect = 0.47) TEK: Esophagus-mucosa (p-value = 0.019; effect = 0.35); Brain-cerebellum (p-value = 0.028; effect = −0.77); Heart-Atrial Appendage (p-value = 0.032; effect = −0.39) | No eQTL |
| rs72721168 | 27308288 | $7.02 \times 10^{-10}$ | 1 | 9p21.2 | EQTN: Esophagus-muscularis (p-value = 0.030; effect = 0.55) Artery-Tibial (p-value = 0.037; effect = 0.47) TEK: Esophagus-mucosa (p-value = 0.018; effect = 0.35); Brain-cerebellum (p-value = 0.028; effect = −0.77); Heart-Atrial Appendage (p-value = 0.032; effect = −0.39) | No eQTL |
| rs1776883 | 34156444 | $5.29 \times 10^{-9}$ | 1 | 6p21.31 | HMGA1: Brain-Substantia nigra (p-value = 0.0050; effect = −0.24); Lung (p-value = 0.006; effect = −0.13); Artery-Tibial (p-value = 0.017; effect = −0.13); Brain-Anterior cingulate cortex (p-value = 0.024; effect = −0.18); Breast-Mammary Tissue (p-value = 0.038; effect = −0.13); Pituitary (p-value = 0.039; effect = −0.19) GRM4: Breast-Mammary Tissue (p-value = 0.018; effect = 0.24); Pituitary (p-value = 0.026; effect = 0.32) | No eQTL |
| rs1776888 | 34158331 | $7.63 \times 10^{-9}$ | 1 | 6p21.31 | HMGA1: Lung (p-value = 0.0056; effect = −0.13); Brain-Substantia nigra (p-value = 0.0094; effect = −0.22); Artery-Tibial (p-value = 0.021; effect = −0.12); Brain-Anterior cingulate cortex (p-value = 0.023; effect = −0.18); Pituitary (p-value = 0.037; effect = −0.19); Breast-Mammary Tissue (p-value = 0.045; effect = −0.13) GRM4: Breast-Mammary Tissue (p-value = 0.024; effect = 0.23); Pituitary (p-value = 0.027; effect = 0.31) | C6orf1, GRM4, HMGA1, NUDT3\*\* |
| rs1776881 | 34156323 | $7.96 \times 10^{-9}$ | 0.97 | 6p21.31 | HMGA1: Lung (p-value = 0.0051; effect = −0.13); Brain-Substantia nigra (p-value = 0.010; effect = −0.22); Artery-Tibial (p-value = 0.018; effect = −0.13); Brain-Anterior cingulate cortex (p-value = 0.023; effect = −0.18); Breast-Mammary Tissue (p-value = 0.040; effect = −0.13); Pituitary (p-value = 0.040; effect = −0.19) GRM4: Breast-Mammary Tissue (p-value = 0.019; effect = 0.24); Pituitary (p-value = 0.029; effect = 0.31) | No eQTL |
| rs1776886 | 34157113 | $1.90 \times 10^{-8}$ | 0.85 | 6p21.31 | HMGA1: Lung (p-value = 0.0062; effect = −0.12); Artery-Tibial (p-value = 0.019; effect = −0.13); Brain-Anterior cingulate cortex (p-value = 0.027; effect = −0.18); Pituitary (p-value = 0.027; effect = −0.22) GRM4: Pituitary (p-value = 0.019; effect = 0.35) | No eQTL |
| rs1776885 | 34156978 | $2.56 \times 10^{-8}$ | 0.98 | 6p21.31 | HMGA1: Brain-Substantia nigra (p-value = 0.0046; effect = −0.24); Lung (p-value = 0.0099; effect = −0.12); Artery-Tibial (p-value = 0.020; effect = −0.18); Brain-Anterior cingulate cortex (p-value = 0.025; effect = −0.18); Pituitary (p-value = 0.041; effect = −0.19) GRM4: Breast-Mammary Tissue (p-value = 0.030; effect = 0.22); Pituitary (p-value = 0.034; effect = 0.31) | No eQTL |
| rs1776889 | 34159166 | $2.64 \times 10^{-8}$ | 0.84 | 6p21.31 | HMGA1: Brain-Substantia nigra (p-value = 0.0077; effect = −0.21); Artery-Tibial (p-value = 0.0082; effect = −0.14); Brain-Anterior cingulate cortex (p-value = 0.015; effect = −0.20); Lung (p-value = 0.021; effect = −0.11); Spleen (p-value = 0.047; effect = 0.18) GRM4: No eQTL | No eQTL |

TABLE 10-continued

Expression quantitative trait loci (eQTL) effects with p-value < 0.05 of the variants associated with asthma (genome-wide significant and proxies ($r^2 \geq 0.6$) with p-values $\leq 1 \times 10^{-4}$) in the non-adjusted analysis and the analysis adjusting by the allergic status. GTEx refers to the eQTL results yielded by querying the Genotype-Tissue Expression (GTEx) database (v6) and Haploreg, those obtained by mining this database available on the worldwide web (broadinstitute.org/mammals/haploreg/haploreg_v4.php).

| SNP | Genomic position | p-value | $r^2$ | Locus | GTEx | Haploreg v4 |
|---|---|---|---|---|---|---|
| rs1776884 | 34156970 | $3.78 \times 10^{-8}$ | 0.93 | 6p21.31 | HMGA1: Brain-Substantia nigra (p-value = 0.0043; effect = −0.24); Lung (p-value = 0.0047; effect = −0.13); Artery-Tibial (p-value = 0.015; effect = −0.13); Pituitary (p-value = 0.046; effect = −0.19); Brain-Anterior cingulate cortex (p-value = 0.048; effect = −0.16) GRM4: Breast-Mammary Tissue (p-value = 0.046; effect = 0.21) | No eQTL |
| rs1776880 | 34155988 | $5.51 \times 10^{-5}$ | 0.62 | 6p21.31 | HMGA1: Brain-Putamen (p-value = 0.018; effect = −0.20); Lung (p-value = 0.022; effect = −0.10); Skin-Not Sun Exposed (p-value = 0.033; effect = 0.12) GRM4: No eQTL | No eQTL |
| rs112216073 | 34154949 | $5.90 \times 10^{-5}$ | 0.86 | 6p21.31 | HMGA1: pituitary (p-value = 0.031; effect = −0.20) GRM4: No eQTL | No eQTL |
| rs11788591 | 132502801 | $4.45 \times 10^{-8}$ | — | 9q34.11 | PTGES: Skin-Sun Exposed (p-value = 0.00049; effect = −0.54); Esophagus-Mucosa (p-value = 0.014; effect = −0.30) | PTGES, ASB6, C9orf78, PRRX2, TOR1A, TOR1B, USP20\*\* |
| rs1837253 | 111066174 | $7.25 \times 10^{-8}$ | — | 5q22.1 | TSLP: Testis (p-value = 0.016; effect = −0.33); Stomach (p-value = 0.043; effect = −0.16); Nerve-Tibial (p-value = 0.049; effect = 0.17) WDR36: Brain-Frontal cortex (p-value = 0.000055; effect = −0.33); Adipose-Subcutaneous (p-value = 0.00010; effect = −0.19); Brain-Cerebellar hemisphere (p-value = 0.00074; effect = −0.27); Testis (p-value = 0.0019; effect = −0.28); Liver (p-value = 0.012; effect = −0.20); Skin-Not Sun Exposed (p-value = 0.024; effect = −0.14); Lung (p-value = 0.038; effect = −0.14); Whole Blood (p-value = 0.044; effect = −0.078) | TSLP, WDR36\*\* |
| rs34106588 | 64852335 | $1.77 \times 10^{-4}$ | 0.6 | 10q21.3 | No eQTL | No eQTL |
| rs34662842 | 65034754 | $1.97 \times 10^{-5}$ | 0.83 | 10q21.3 | JMJD1C: Lung (p-value = 0.029; effect = −0.18); Artery-Aorta (p-value = 0.036; effect = −0.36); Esophagus-Muscularis (p-value = 0.037; effect = −0.38) NRBF2: Esophagus-Mucosa (p-value = 0.0015; effect = −0.43); Nerve-Tibial (p-value = 0.036; effect = −0.31); Lung (p-value = 0.040; effect = −0.30) | No eQTL |
| rs35506702 | 65045865 | $1.83 \times 10^{-5}$ | 0.87 | 10q21.3 | JMJD1C: Lung (p-value = 0.030; effect = −0.18); Artery-Aorta (p-value = 0.035; effect = −0.36); Esophagus-Muscularis (p-value = 0.036; effect = −0.38) NRBF2: Esophagus-Mucosa (p-value = 0.0015; effect = −0.43); Nerve-Tibial (p-value = 0.036; effect = −0.31); Lung (p-value = 0.040; effect = −0.30) | No |
| rs75446656 | 65100016 | $3.60 \times 10^{-8}$ | 1 | 10q21.3 | JMJD1C: Lung (p-value = 0.029; effect = −0.18); Artery-Aorta (p-value = 0.033; effect = −0.37); Esophagus-Muscularis (p-value = 0.036; effect = −0.38) NRBF2: Esophagus-Mucosa (p-value = 0.0013; effect = −0.43); Nerve-Tibial (p-value = 0.036; effect = −0.31); Lung (p-value = 0.039; effect = −0.30); Esophagus-Gastroesophageal Junction (p-value = 0.046; effect = −0.49) | No |
| rs35632171 | 65109502 | $3.65 \times 10^{-8}$ | 1 | 10q21.3 | JMJD1C: Lung (p-value = 0.029; effect = −0.18); Artery-Aorta (p-value = 0.033; effect = −0.37); Esophagus-Muscularis (p-value = 0.036; effect = −0.38) NRBF2: Esophagus-Mucosa (p-value = 0.0012; effect = −0.43); Nerve-Tibial (p-value = 0.036; effect = −0.31); Lung (p-value = 0.039; effect = −0.30); Esophagus-Gastroesophageal Junction (p-value = 0.046; effect = −0.49) | No |

\*in linkage disequilibrium (LD) with rs72721158 and \*\*are results yielded by Haploreg v4 from the study by Zou, et al in temporal cortex and cerebellum (1). Tissues most relevant to asthma are highlighted in bold
Sequences for each of the SNPs listed above are provided in Table 18.

TABLE 11 p-values for reported SNPs in known asthma loci in each of the meta-analysis performed in this study.

| Reported Gene | Locus | Top SNP | Genomic position | p-value meta-analysis all | p-value meta-analysis EA | p-value meta-analysis AA | p-value meta-analysis pediatrics | p-value meta-analysis adults |
|---|---|---|---|---|---|---|---|---|
| IL6R* | 1q21.3 | rs4129267 | 154426264 | 0.116 | 0.167 | 0.446 | 0.649 | 0.065 |
| CRCT1* | 1q21.3 | rs4845783 | 152492559 | 0.927 | 0.446 | 0.113 | 0.457 | 0.508 |

TABLE 11-continued p-values for reported SNPs in known asthma loci in each of the meta-analysis performed in this study.

| Reported Gene | Locus | Top SNP | Genomic position | p-value meta-analysis all | p-value meta-analysis EA | p-value meta-analysis AA | p-value meta-analysis pediatrics | p-value meta-analysis adults |
|---|---|---|---|---|---|---|---|---|
| IL1RL1/IL18R1* | 2q12.1 | rs13408661 | 102955082 | 0.034 | 0.073 | 0.216 | 0.031 | 0.510 |
| | | rs9807989 | 102971200 | 0.015 | 8.86 × 10⁻³ | 0.479 | 0.126 | 0.051 |
| | | rs10197862 | 102966549 | 0.032 | 0.082 | 0.188 | 0.029 | 0.499 |
| | | rs10173081 | 102957348 | 0.036 | 0.074 | — | 0.032 | 0.513 |
| | | rs3771166 | 102986222 | 4.24 × 10⁻³ | 5.08 × 10⁻³ | 0.238 | 0.073 | 0.020 |
| KLHL5 | 4p14 | rs35141484 | 39088341 | 0.090 | — | 0.090 | 0.174 | 0.309 |
| TLR1 | 4p14 | rs4833095 | 38799710 | 0.624 | 0.991 | 0.451 | 0.571 | 0.144 |
| TSLP* | 5q22.1 | rs1837253 | 110401872 | 4.22 × 10⁻⁸ | 3.91 × 10⁻⁷ | 8.50 × 10⁻³ | 1.33 × 10⁻⁴ | 6.45 × 10⁻⁵ |
| WDR36* | 5q22.1 | rs1438673 | 110467499 | 1.25 × 10⁻³ | 3.31 × 10⁻³ | 0.141 | 0.015 | 0.034 |
| RAD50* | 5q31.1 | rs2244012 | 131901225 | 1.42 × 10⁻⁵ | 0.293 | 1.02 × 10⁻⁶ | 6.36 × 10⁻³ | 3.95 × 10⁻⁴ |
| C5orf56* | 5q31.1 | rs11745587 | 131796922 | 0.317 | 0.238 | 0.826 | 0.685 | 0.042 |
| HLA* | 6p21.32 | rs3998159 | — | — | — | — | — | — |
| | | rs404860 | 32184345 | 0.074 | 0.299 | 0.146 | 0.074 | — |
| | | rs9268516 | — | — | — | — | — | — |
| | | rs9272346 | 32604372 | 0.015 | 2.91 × 10⁻⁴ | 0.765 | 0.638 | 1.11 × 10⁻³ |
| | | rs9273373 | — | — | — | — | — | — |
| | | rs987870 | 33042880 | 0.378 | 0.206 | 0.809 | 0.378 | — |
| | | rs9273349 | — | — | — | — | — | — |
| IL33* | 9p24.1 | rs72699186 | 6175855 | 0.016 | 0.017 | 0.359 | 0.437 | 4.17 × 10⁻³ |
| | | rs2381416 | 6193455 | 9.41 × 10⁻⁵ | 0.100 | 1.34 × 10⁻⁴ | 0.035 | 2.39 × 10⁻⁴ |
| | | rs1342326 | 6190076 | 2.29 × 10⁻³ | 0.011 | 0.064 | 0.202 | 6.56 × 10⁻⁴ |
| SMAD3* | 15q22.33 | rs17294280 | 67468285 | 0.878 | 0.390 | 0.206 | 0.344 | 0.210 |
| | | rs744910 | 67446785 | 0.339 | 0.386 | 0.647 | 0.8596 | 0.197 |
| ORMDL3/GSDMB* | 17q12 | rs2305480 | 38062196 | 4.89 × 10⁻⁵ | 1.41 × 10⁻⁴ | 0.109 | 4.76 × 10⁻⁶ | 0.363 |
| | | rs11078927 | 38064405 | 1.24 × 10⁻⁴ | 1.35 × 10⁻⁴ | 0.240 | 1.47 × 10⁻⁵ | 0.389 |
| | | rs7216389 | 38069949 | 6.38 × 10⁻⁴ | 7.25 × 10⁻⁵ | 0.685 | 3.23 × 10⁻⁵ | 0.738 |
| | | rs4794820 | 38089344 | 1.72 × 10⁻³ | 1.17 × 10⁻⁴ | 0.664 | 4.33 × 10⁻³ | 0.146 |
| | | rs6503525 | 38095174 | 3.85 × 10⁻⁴ | 3.08 × 10⁻⁵ | 0.459 | 6.55 × 10⁻⁴ | 0.157 |
| IGSF3 | 1p13.1 | rs17036023 | 117129711 | 0.182 | — | 0.182 | — | 0.182 |
| PYHIN1 | 1q23.1 | rs1102000 | 158932907 | 0.860 | — | 0.860 | 0.662 | 0.745 |
| XPR1 | 1q25.3 | rs7527074 | 180645441 | 0.700 | — | 0.700 | 0.547 | 0.816 |
| DENND1B | 1q31.3 | rs2786098 | 197325908 | 0.382 | 0.905 | 0.087 | 0.306 | 0.873 |
| c1orf10 | 1q44 | rs4658627 | 244511176 | 0.818 | — | 0.893 | 0.972 | 0.750 |
| IL5RA | 3p26.2 | rs9815663 | 3614887 | 0.459 | 0.966 | 0.321 | 0.600 | 0.596 |
| ABI3BP | 3q12.2 | rs9823506 | 100476713 | 0.275 | — | 0.275 | 0.115 | 0.635 |
| ATG3 | 3q13.2 | rs2705520 | 112269287 | 0.845 | — | 0.845 | 0.392 | 0.070 |
| USP38-GAB1 | 4q31 | rs7686660 | 144003159 | 0.468 | 0.874 | 0.250 | 0.458 | 0.813 |
| PDE4D | 5q12.1 | rs1588265 | 59369794 | 0.353 | 0.431 | 0.612 | 0.511 | 0.509 |
| NDFIP1 | 5q31.3 | rs6867913 | 141445980 | 0.180 | 0.314 | 0.372 | 0.652 | 0.129 |
| CDHR3 | 7q22.3 | rs6967330 | 105658451 | 0.022 | 0.932 | 2.33 × 10⁻³ | 0.012 | 0.633 |
| MKLN1 | 7q32.3 | rs7807274 | 131021099 | 0.481 | — | 0.481 | 0.954 | 0.161 |
| ZBTB10 | 8q21.13 | rs7009110 | 81291879 | 0.140 | 0.278 | 0.318 | 0.166 | 0.529 |
| ACO1 | 9p21.1 | rs10970976 | 32433526 | 0.578 | 0.143 | 0.447 | 0.426 | 0.065 |
| TLE4 | 9q21.31 | rs2378383 | 82039342 | 0.906 | 0.133 | 0.022 | 0.301 | 0.199 |
| IKZF4/CDK2 | 10p14 | rs10508372 | 8972018 | 0.185 | 0.444 | 0.279 | 0.343 | 0.339 |
| PSAP | 10q22.1 | rs11000019 | 73591530 | 0.688 | — | 0.688 | 0.247 | 0.271 |
| HPSE2 | 10q24.2 | rs12570188 | 100855702 | 0.269 | — | 0.269 | — | 0.269 |
| C11orf30/LRRC32 | 11q13.5 | rs7130588 | 76270683 | 4.73 × 10⁻⁵ | 1.09 × 10⁻³ | 0.015 | 1.02 × 10⁻⁴ | 0.092 |
| C11orf71 | 11q23.2 | rs11214966 | 114231255 | 0.209 | 0.499 | 0.049 | 0.259 | 0.563 |
| CLEC16A | 16p13.13 | rs62026376 | 11228712 | 7.22 × 10⁻⁴ | 3.03 × 10⁻⁴ | 0.810 | 0.174 | 4.29 × 10⁻⁴ |
| GSDMA | 17q21.1 | rs7212938 | 38122680 | 1.34 × 10⁻³ | 4.71 × 10⁻⁴ | 0.537 | 5.36 × 10⁻⁴ | 0.385 |
| ZNF665 | 19q13.42 | rs16984547 | 53682042 | 0.628 | 0.746 | 0.719 | 0.955 | 0.473 |
| IL2RB | 22q12.3 | rs2284033 | 37534034 | 0.918 | 0.698 | 0.585 | 0.172 | 0.061 |

*indicates that the SNP has been reported in more than one study. In bold, p-value<0.05 is highlighted. EA stands for European American and AA for African American. Sequences for each of the listed SNPs are provided in Table 18

TABLE 12

Associations showing nominal significance ($10^{-6}$ > p-value combined > $5 \times 10^{-8}$) in the meta-analysis of the pediatric cohort having a p-value < 0.05 in both European (EA) and African American (AA) populations.

| Top SNP | Genomic position | Locus | p-value combined | p-value EA | p-value AA | Risk allele frequency | Beta (SE) | Closest gene |
|---|---|---|---|---|---|---|---|---|
| rs9846423 | 113937335 | 3q13.31 | 8.29 × 10⁻⁸ | 3.58 × 10⁻³ | 7.25 × 10⁻⁷ | 0.061 | 0.309 (0.058) | 16 kb 3' of ZNF80 |
| rs2353275 | 88065112 | 10q23.2 | 1.86 × 10⁻⁷ | 2.91 × 10⁻³ | 8.28 × 10⁻⁶ | 0.620 | 0.194 (0.037) | GRID1 (intronic) |
| rs62344088 | 96064 | 5p15.33 | 1.37 × 10⁻⁶ | 0.024 | 8.47 × 10⁻⁶ | 0.147 | −0.258 (0.053) | 44 kb 5' of PLEKHG4B |
| rs4957798 | 108444554 | 5q21.3 | 3.23 × 10⁻⁶ | 0.040 | 7.48 × 10⁻⁶ | 0.248 | 0.163 (0.035) | FER (intronic) |
| rs35083325 | 153256712 | 2q23.3 | 3.27 × 10⁻⁶ | 7.37 × 10⁻⁴ | 6.77 × 10⁻⁴ | 0.180 | 0.198 (0.042) | FMNL2 (intronic) |

TABLE 12-continued

Associations showing nominal significance ($10^{-6}$ > p-value combined > $5 \times 10^{-8}$) in the meta-analysis of the pediatric cohort having a p-value < 0.05 in both European (EA) and African American (AA) populations.

| Top SNP | Genomic position | Locus | p-value combined | p-value EA | p-value AA | Risk allele frequency | Beta (SE) | Closest gene |
|---|---|---|---|---|---|---|---|---|
| rs62067034 | 38063738 | 17q12 | $3.44 \times 10^{-6}$ | $4.78 \times 10^{-6}$ | 0.044 | 0.348 | -0.171 (0.037) | GSDMB (intronic) |
| rs10811256 | 1995749 | 9p24.3 | $4.83 \times 10^{-6}$ | $8.18 \times 10^{-4}$ | $7.11 \times 10^{-4}$ | 0.819 | -0.198 (0.043) | 20 kb 5' of SMARCA2 |
| rs116126524 | 142000895 | 2q22.1 | $5.21 \times 10^{-6}$ | $1.52 \times 10^{-3}$ | $7.76 \times 10^{-4}$ | 0.013 | -0.727 (0.159) | LRP1B (intronic) |
| rs6907629 | 167569519 | 6q27 | $5.60 \times 10^{-6}$ | $6.66 \times 10^{-5}$ | 0.016 | 0.258 | -0.192 (0.042) | 839 bp 3' of GPR31 |
| rs6872411 | 124310692 | 5q23.2 | $7.45 \times 10^{-6}$ | 0.037 | $2.57 \times 10^{-5}$ | 0.392 | -0.159 (0.036) | 230 kb 5' of ZNF608 |
| rs17277929 | 154477913 | 6q25.2 | $7.75 \times 10^{-6}$ | $5.97 \times 10^{-3}$ | $5.28 \times 10^{-5}$ | 0.870 | 0.239 (0.053) | IPCEF1 (3'-UTR) |
| rs1530572 | 134638499 | 2q21.2 | $8.37 \times 10^{-6}$ | $1.26 \times 10^{-5}$ | 0.027 | 0.776 | 0.167 (0.037) | 246 kb 5' of MIR3679 |
| rs12600053 | 84844445 | 16q24.1 | $8.72 \times 10^{-6}$ | $4.58 \times 10^{-3}$ | $3.14 \times 10^{-4}$ | 0.617 | -0.152 (0.034) | 9.1 kb 5' of CRISPLD2 |
| rs11839433 | 22630603 | 13q12.11 | $9.47 \times 10^{-6}$ | $2.86 \times 10^{-3}$ | $7.39 \times 10^{-4}$ | 0.047 | 0.352 (0.080) | 352 kb 3' of FGF9 |
| rs13401339 | 234876037 | 2q37.1 | $9.48 \times 10^{-6}$ | $4.35 \times 10^{-3}$ | $5.04 \times 10^{-4}$ | 0.591 | 0.143 (0.032) | TRPM8 (intronic) |

SE stands for standard error, bp for base pairs, kb for kilobase and UTR for untranslated region. Sequences for each of the SNPs listed in Table 12 are found in Table 18 next to the indicated rs number.

TABLE 13

Associations showing nominal significance (10-> p-value combined > $5 \times 10^{-8}$) in the meta-analysis of the adult cohort having a p-value<0.05 in both European (EA) and African American (AA) populations.

| Top SNP | Genomic position | Locus | p-value combined | p-value EA | p-value AA | Risk allele frequency | Beta (SE) | Closest gene |
|---|---|---|---|---|---|---|---|---|
| rs3095318 | 31088145 | 6p21.33 | $1.61 \times 10^{-11}$ | $6.51 \times 10^{-8}$ | $1.35 \times 10^{-5}$ | 0.202 | 0.351 (0.052) | PSORS1C1 (missense) |
| rs2147959 | 228644232 | 1q42.13 | $1.49 \times 10^{-7}$ | $1.24 \times 10^{-3}$ | $6.54 \times 10^{-8}$ | 0.809 | 0.263 (0.050) | 833 bp HIST3H2A |
| rs7104956 | 993745 | 11p15.5 | $2.40 \times 10^{-7}$ | $1.11 \times 10^{-5}$ | $5.74 \times 10^{-3}$ | 0.804 | -0.269 (0.052) | AP2A2 (intronic) |
| rs114623225 | 30279074 | 6p22.1 | $2.48 \times 10^{-7}$ | $3.57 \times 10^{-5}$ | $6.74 \times 10^{-4}$ | 0.821 | -0.290 (0.056) | HGC18 (intronic) |
| rs9923856 | 11210415 | 16p13.13 | $5.73 \times 10^{-7}$ | $3.21 \times 10^{-4}$ | $1.74 \times 10^{-4}$ | 0.668 | 0.208 (0.042) | CLEC16A (intronic) |
| rs2431345 | 123137892 | 5q23.1 | $9.72 \times 10^{-7}$ | $2.61 \times 10^{-4}$ | $4.95 \times 10^{-4}$ | 0.227 | -0.225 (0.046) | 185 kb 3' of CSNK1G3 |
| rs1293767 | 113425154 | 12q24.13 | $1.53 \times 10^{-6}$ | $8.82 \times 10^{-4}$ | $8.56 \times 10^{-7}$ | 0.708 | 0.225 (0.047) | OAS2 (missense) |
| chr2:63203981 | 63203981 | 2p15 | $1.75 \times 10^{-6}$ | $3.96 \times 10^{-3}$ | $6.05 \times 10^{-4}$ | 0.014 | 0.868 (0.182) | EHBP1 (intronic) |
| rs1691562 | 77289420 | 12q21.2 | $1.84 \times 10^{-6}$ | $7.33 \times 10^{-5}$ | $3.53 \times 10^{-3}$ | 0.275 | 0.229 (0.048) | 17 kb 5' of CSRP2 |
| rs646356 | 55167773 | 1p32.3 | $1.91 \times 10^{-6}$ | $2.01 \times 10^{-3}$ | $9.40 \times 10^{-7}$ | 0.172 | -0.263 (0.055) | HEATR8 (missense) |
| rs11498342 | 38759553 | 10p11.1 | $1.92 \times 10^{-6}$ | $1.68 \times 10^{-3}$ | $4.92 \times 10^{-5}$ | 0.330 | 0.216 (0.045) | 18 kb 3' of LOC399744 |
| rs74106266 | 83078619 | 12q21.31 | $2.17 \times 10^{-6}$ | 0.044 | $9.66 \times 10^{-6}$ | 0.950 | 0.564 (0.119) | 2.3 kb 5' of TMTC2 |
| rs112461602 | 73009266 | 8q13.3 | $2.51 \times 10^{-6}$ | $6.55 \times 10^{-4}$ | $6.29 \times 10^{-4}$ | 0.929 | -0.454 (0.096) | 21 kb 5' of TRPA1 |
| rs4673397 | 209186122 | 2q34 | $2.84 \times 10^{-6}$ | $7.66 \times 10^{-4}$ | $7.29 \times 10^{-4}$ | 0.847 | 0.331 (0.071) | PIKFYVE (intronic) |
| rs147089311 | 31451923 | 6p21.33 | $3.04 \times 10^{-6}$ | $1.35 \times 10^{-4}$ | $4.06 \times 10^{-3}$ | 0.313 | 0.202 (0.043) | 12 kb 3' of HCG26 |
| rs10022260 | 83793921 | 4q21.22 | $3.30 \times 10^{-6}$ | $8.19 \times 10^{-4}$ | $1.29 \times 10^{-5}$ | 0.292 | 0.212 (0.046) | SEC31A (intronic) |
| rs78558203 | 146929105 | 3q24 | $3.83 \times 10^{-6}$ | $4.95 \times 10^{-5}$ | 0.027 | 0.962 | -0.557 (0.120) | 175 kb 3' of ZIC4 |

I stands for insertion, SE for standard error, bp for base pairs, and kb for kilobase. Sequences for each of the listed SNPs are provided in Table 18.

TABLE 14

Associations showing nominal significance ($10^{-6}$ > p-value combined > $5 \times 10^{-8}$) in the meta-analysis of European Americans having a p-value < 0.05 in both pediatric and adult populations.

| Top SNP | Genomic position | Locus | p-value combined | p-value pediatrics | p-value adults | Risk allele frequency | Beta (SE) | Closest gene |
|---|---|---|---|---|---|---|---|---|
| chr17:37831293:D | 37831293 | 17q12-21 | $2.14 \times 10^{-7}$ | $6.42 \times 10^{-5}$ | $4.49 \times 10^{-4}$ | 0.317 | -0.195 (0.037) | PGAP3 (intronic) |
| rs116020758 | 32365896 | 6p21.32 | $1.08 \times 10^{-6}$ | 0.021 | $3.30 \times 10^{-6}$ | 0.832 | 0.225 (0.046) | BTNL2 (intronic) |
| rs58354223 | 54794475 | 4q12 | $1.15 \times 10^{-6}$ | 0.041 | $1.22 \times 10^{-6}$ | 0.163 | -0.235 (0.048) | PDGFRA (intronic) |
| chr5: 90356207:D | 90356207 | 5q14.3 | $1.96 \times 10^{-6}$ | 0.026 | $6.80 \times 10^{-6}$ | 0.319 | -0.178 (0.037) | GPR98 (intronic) |
| rs114381917 | 65545567 | 3p14.1 | $2.26 \times 10^{-6}$ | $2.26 \times 10^{-6}$ | 0.033 | 0.032 | 0.507 (0.107) | MAGI1 (intronic) |
| rs2856328 | 11941579 | 12p13.2 | $3.64 \times 10^{-6}$ | 0.011 | $4.83 \times 10^{-5}$ | 0.598 | -0.161 (0.035) | ETV6 (intronic) |
| rs6761859 | 174250868 | 2q31.1 | $4.12 \times 10^{-6}$ | $8.97 \times 10^{-5}$ | $6.91 \times 10^{-3}$ | 0.020 | 0.634 (0.138) | CDCA7 (17kb) |
| rs67431028 | 43077386 | 22q13.2 | $4.69 \times 10^{-6}$ | $1.51 \times 10^{-3}$ | $4.84 \times 10^{-4}$ | 0.481 | -0.160 (0.035) | A4GALT (11kb) |
| rs2502757 | 136586954 | 9q34.2 | $4.75 \times 10^{-6}$ | $2.95 \times 10^{-3}$ | $3.45 \times 10^{-4}$ | 0.348 | -0.164 (0.036) | SARDH (intronic) |
| rs2373794 | 40354477 | 2p22.1 | $5.10 \times 10^{-6}$ | $1.02 \times 10^{-4}$ | $9.39 \times 10^{-3}$ | 0.715 | -0.177 (0.039) | SLC8A1 (intronic) |
| rs1342522 | 94363885 | 15q26.2 | $9.74 \times 10^{-6}$ | $9.20 \times 10^{-4}$ | $2.84 \times 10^{-3}$ | 0.417 | -0.152 (0.034) | MCTP2 (478kb) |

D stands for deletion and SE for standard error. Only the most significant SNP of the haplotype associated is presented in the table. Sequences for each of the SNPs shown are provided in Table 18.

TABLE 15

Associations showing nominal significance (10-> p-value combined > 5 × 10$^{-8}$) in the combined meta-analysis with p-values < 0.05 in at least two of the cohorts.

| Top SNP | Genomic position | Locus | p-value combined | p-value pediatric EA | p-value pediatric AA | p-value adults EA |
|---|---|---|---|---|---|---|
| rs4957798 | 108444554 | 5q21.3 | 1.11 × 10$^{-6}$ | 0.040 | 7.48 × 10$^{-6}$ | 0.424 |
| rs3741578 | 57394635 | 12q13.3 | 1.37 × 10$^{-6}$ | 0.016 | 2.18 × 10$^{-4}$ | 0.022 |
| rs116020758 | 32365896 | 6p21.32 | 2.41 × 10$^{-6}$ | 0.021 | 0.529 | 3.30 × 10$^{-6}$ |
| rs12105167 | 48175338 | 2p16.3 | 2.60 × 10$^{-6}$ | 7.31 × 10$^{-3}$ | 7.53 × 10$^{-3}$ | 2.75 × 10$^{-3}$ |
| rs10171428 | 234876843 | 2q37.1 | 3.02 × 10$^{-6}$ | 2.29 × 10$^{-3}$ | 4.27 × 10$^{-4}$ | 0.028 |
| chr10: 68952056:D | 68952056 | 10q21.3 | 3.82 × 10$^{-6}$ | 8.13 × 10$^{-3}$ | 3.28 × 10$^{-3}$ | 0.011 |
| rs2353275 | 88065112 | 10q23.2 | 4.72 × 10$^{-6}$ | 2.91 × 10$^{-3}$ | 8.28 × 10$^{-6}$ | 0.450 |
| rs578196 | 23762272 | 13q12.12 | 6.93 × 10$^{-6}$ | 5.43 × 10$^{-3}$ | 0.025 | 2.21 × 10$^{-3}$ |
| rs3784143 | 70079300 | 14q24.1 | 8.20 × 10$^{-6}$ | 8.29 × 10$^{-3}$ | 4.73 × 10$^{-3}$ | 0.028 |
| rs62026377 | 11229128 | 16p13.13 | 8.52 × 10$^{-6}$ | 0.126 | 0.203 | 3.71 × 10$^{-4}$ |
| rs7830057 | 101431801 | 8q22.2 | 9.00 × 10$^{-6}$ | 0.038 | 2.63 × 10$^{-3}$ | 3.33 × 10$^{-3}$ |

| Top SNP | p-value adults AA | Risk allele frequency | Beta (SE) | Closest gene |
|---|---|---|---|---|
| rs4957798 | 0.031 | 0.230 | 0.139 (0.028) | FER (intronic) |
| rs3741578 | 0.106 | 0.079 | −0.247 (0.051) | ZBTB39 (intronic) |
| rs116020758 | 0.023 | 0.841 | 0.162 (0.034) | BTNL2 (intronic) |
| rs12105167 | 0.651 | 0.383 | −0.127 (0.027) | FBXO11 (42kb) |
| rs10171428 | 0.912 | 0.402 | −0.118 (0.025) | TRPM8 (intronic) |
| chr10: 68952056:D | 0.342 | 0.272 | 0.142 (0.031) | CTNNA3 (intronic) |
| rs2353275 | 0.976 | 0.643 | 0.140 (0.031) | GRID1 (intronic) |
| rs578196 | 0.704 | 0.221 | 0.146 (0.032) | SGCG (intronic) |
| rs3784143 | 0.132 | 0.041 | 0.310 (0.069) | KIAA0247 (intronic) |
| rs62026377 | 1.14 × 10$^{-3}$ | 0.235 | −0.131 (0.029) | CLEC16A (intronic) |
| rs7830057 | 0.831 | 0.402 | −0.111 (0.025) | MIR4471 (37kb) |

D stands for deletion, EA and AA for European American and African American, respectively, and SE for standard error.
Sequences for each of the SNPs listed are provided in Table 18.

TABLE 16

Associations showing nominal significance (10 > p-value combined > 5 × 10$^{-8}$) in the meta-analysis of African Americans having a p-value < 0.05 in both pediatric and adult populations.

| Top SNP | Genomic position | Locus | p-value combined | p-value pediatrics | p-value adults | Risk allele frequency | Beta (SE) | Closest gene |
|---|---|---|---|---|---|---|---|---|
| rs141602583 | 6191418 | 8p23.2 | 1.94 × 10$^{-7}$ | 1.48 × 10$^{-6}$ | 0.026 | 0.023 | −0.649 (0.125) | LOC100287015 (70 kb) |
| rs2040704 | 131973177 | 5q31.1 | 2.40 × 10$^{-7}$ | 8.27 × 10$^{-5}$ | 2.07 × 10$^{-4}$ | 0.593 | −0.195 (0.038) | RAD50 (intronic) |
| rs9620247 | 23675803 | 22q11.23 | 4.11 × 10$^{-7}$ | 1.31 × 10$^{-5}$ | 9.92 × 10$^{-3}$ | 0.073 | −0.390 (0.077) | BCR (16 kb) |
| rs7281353 | 23151443 | 21q21.1 | 5.92 × 10$^{-7}$ | 7.52 × 10$^{-6}$ | 0.020 | 0.862 | 0.275 (0.077) | NCRNA00317 (42 kb) |
| chr10: 98160029:D | 98160029 | 10q24.1 | 8.66 × 10$^{-7}$ | 1.97 × 10$^{-4}$ | 5.03 × 10$^{-4}$ | 0.042 | −0.472 (0.055) | TLL2 (intronic) |
| rs10835689 | 30613013 | 11p14.1 | 9.14 × 10$^{-7}$ | 3.63 × 10$^{-6}$ | 5.68 × 10$^{-3}$ | 0.431 | 0.178 (0.096) | MPPED2 (5.1 kb) |
| rs77829948 | 16264763 | 20p12.1 | 1.34 × 10$^{-6}$ | 1.42 × 10$^{-4}$ | 6.06 × 10$^{-4}$ | 0.985 | 0.7651 (0.036) | KIF16B (intronic) |
| rs7169793 | 54165037 | 15q21.3 | 1.38 × 10$^{-6}$ | 2.14 × 10$^{-5}$ | 6.16 × 10$^{-3}$ | 0.228 | −0.228 (0.158) | WDR72 (113 kb) |
| rs116201499 | 13907160 | 16p13.12 | 1.45 × 10$^{-6}$ | 4.79 × 10$^{-6}$ | 0.039 | 0.024 | 0.610 (0.047) | ERCC4 (107 kb) |
| rs77960860 | 139995126 | 3q23 | 1.50 × 10$^{-6}$ | 5.29 × 10$^{-6}$ | 5.31 × 10$^{-3}$ | 0.032 | 0.521 (0.127) | CLSTN2 (intronic) |
| rs12669009 | 86227511 | 7q21.11 | 2.26 × 10$^{-6}$ | 2.00 × 10$^{-5}$ | 0.010 | 0.841 | 0.242 (0.108) | GRM3 (46 kb) |
| rs57728637 | 105045704 | 9q31.1 | 2.27 × 10$^{-6}$ | 3.04 × 10$^{-5}$ | 0.013 | 0.946 | −0.375 (0.051) | GRIN3A (545 kb) |
| rs12006110 | 123129972 | 9q33.2 | 2.88 × 10$^{-6}$ | 2.86 × 10$^{-5}$ | 0.018 | 0.800 | −0.223 (0.079) | CDK5RAP2 (21 kb) |
| rs191386225 | 30001315 | 9p21.1 | 3.22 × 10$^{-6}$ | 2.78 × 10$^{-4}$ | 1.36 × 10$^{-3}$ | 0.055 | −0.369 (0.048) | MIR873 (1.1 Mb) |
| rs116276540 | 114292796 | 8q23.3 | 3.28 × 10$^{-6}$ | 2.24 × 10$^{-4}$ | 2.87 × 10$^{-3}$ | 0.030 | 0.543 (0.079) | CSMD3 (intronic) |
| rs115366932 | 84800604 | 14q31.2 | 3.64 × 10$^{-6}$ | 2.08 × 10$^{-5}$ | 0.036 | 0.026 | −0.574 (0.117) | FLRT2 (1.2 Mb) |
| rs188887209 | 33292461 | 13q13.1 | 4.30 × 10$^{-6}$ | 3.37 × 10$^{-5}$ | 0.040 | 0.020 | 0.635 (0.124) | PDS5B (intronic) |
| rs10964378 | 19994736 | 9p23 | 4.62 × 10$^{-6}$ | 3.17 × 10$^{-5}$ | 0.029 | 0.085 | −0.306 (0.138) | SLC24A2 (206 kb) |
| rs9486080 | 105859167 | 6q21 | 6.54 × 10$^{-6}$ | 5.76 × 10$^{-4}$ | 6.22 × 10$^{-4}$ | 0.244 | 0.210 (0.067) | PREP (8.2 kb) |
| rs4645904 | 49465493 | 19q13.33 | 7.68 × 10$^{-6}$ | 2.62 × 10$^{-4}$ | 6.42 × 10$^{-3}$ | 0.394 | 0.174 (0.046) | BAX (437 bp) |
| rs4290604 | 238070885 | 2q37.3 | 7.71 × 10$^{-6}$ | 1.48 × 10$^{-4}$ | 0.010 | 0.807 | 0.208 (0.039) | COPS8 (63 kb) |
| rs7095944 | 126302936 | 10q26.13 | 8.23 × 10$^{-6}$ | 2.45 × 10$^{-4}$ | 5.65 × 10$^{-3}$ | 0.330 | 0.181 (0.046) | LHPP (255 bp) |
| rs59568570 | 6315702 | 7p22.1 | 8.54 × 10$^{-6}$ | 5.26 × 10$^{-4}$ | 1.20 × 10$^{-3}$ | 0.250 | 0.196 (0.041) | CYTH3 (3.5 kb) |
| rs9390491 | 147993054 | 6q24.3 | 9.43 × 10$^{-6}$ | 3.05 × 10$^{-4}$ | 2.94 × 10$^{-3}$ | 0.889 | 0.278 (0.044) | SAMD5 (102 kb) |
| rs77297849 | 156162161 | 4q32.1 | 9.76 × 10$^{-6}$ | 2.24 × 10$^{-4}$ | 7.83 × 10$^{-3}$ | 0.965 | 0.454 (0.063) | NPY2R (24 kb) |

D stands for deletion, SE for standard error, kb for kilobase and Mb for megabase. Sequences for each of the SNPs listed are provided in Table 18.

TABLE 17

Genome-wide significant variants associated with asthma in the non-adjusted analysis and the analysis adjusted by allergy. p-values from both analyses are included for all variants. Sequences for each of the SNPs listed are provided in Table 18.

| Marker | Genomic position | Locus | Closest gene (distance) | p-value asthma non-adjusted | p-value asthma adjusted by allergy status |
|---|---|---|---|---|---|
| rs72721168 | 27308288 | 9p21.2 | EQTN (11kb) | $7.02 \times 10^{-10}$ | $1.97 \times 10^{-8}$ |
| rs72721166 | 27304548 | 9p21.2 | EQTN (7.4kb) | $3.83 \times 10^{-9}$ | $9.18 \times 10^{-7}$ |
| rs72721164 | 27300439 | 9p21.2 | EQTN (33kb) | $4.06 \times 10^{-9}$ | $9.92 \times 10^{-7}$ |
| rs72721158 | 27275906 | 9p21.2 | EQTN (21kb) | $4.04 \times 10^{-8}$ | $1.08 \times 10^{-6}$ |
| rs1776883 | 34156444 | 6p21.31 | GRM4 (33kb) | $5.29 \times 10^{-9}$ | $7.95 \times 10^{-4}$ |
| rs1776881 | 34156323 | 6p21.31 | GRM4 (33kb) | $7.96 \times 10^{-9}$ | $8.22 \times 10^{-4}$ |
| rs1776884 | 34156970 | 6p21.31 | GRM4 (34kb) | $3.78 \times 10^{-8}$ | $4.45 \times 10^{-4}$ |
| rs1776885 | 34156978 | 6p21.31 | GRM4 (34kb) | $2.56 \times 10^{-8}$ | $1.59 \times 10^{-3}$ |
| rs1776886 | 34157113 | 6p21.31 | GRM4 (34kb) | $1.90 \times 10^{-8}$ | $5.64 \times 10^{-4}$ |
| chr6: 34158205:I | 34158205 | 6p21.31 | GRM4 (35kb) | $1.09 \times 10^{-8}$ | $1.23 \times 10^{-3}$ |
| rs1776888 | 34158331 | 6p21.31 | GRM4 (35kb) | $7.63 \times 10^{-9}$ | $1.05 \times 10^{-3}$ |
| rs1776889 | 34159166 | 6p21.31 | GRM4 (36kb) | $2.64 \times 10^{-8}$ | $1.99 \times 10^{-3}$ |
| rs75446656 | 65100016 | 10q21.3 | JMJD1C (intron 2) | $1.63 \times 10^{-3}$ | $3.60 \times 10^{-8}$ |
| rs35632171 | 65109502 | 10q21.3 | JMJD1C (intron 2) | $1.63 \times 10^{-3}$ | $3.65 \times 10^{-8}$ |
| rs36080042 | 65426785 | 10q21.3 | REEP3 (68kb) | $5.99 \times 10^{-3}$ | $4.70 \times 10^{-8}$ |

1. Zou F, Chai H S, Younkin C S, Allen M, Crook J, Pankratz V S, Carrasquillo M M, Rowley C N, Nair A A, Middha S, Maharjan S, Nguyen T, Ma L, Malphrus K G, Palusak R, Lincoln S, Bisceglio G, Georgescu C, Kouri N, Kolbert C P, Jen J, Haines J L, Mayeux R, Pericak-Vance M A, Farrer L A, Schellenberg G D, Alzheimer's Disease Genetics C, Petersen R C, Graff-Radford N R, Dickson D W, Younkin S G, Ertekin-Taner N. Brain expression genome-wide association study (egwas) identifies human disease-associated variants. *PLoS genetics* 2012; 8: e1002707.

TABLE 18

Table of Sequences

| | | |
|---|---|---|
| SEQ ID NO: 1 | rs72721168 | CTTAACAAATTTTGCTACCAACAAC[A/C]GTTGTGTCCCAGGTACCCCTCATTT |
| SEQ ID NO: 2 | rs72721166 | ATTAAAAGAGGGAGTCTGCGTTTCA[G/T]GACAATCTTTCTATGAAAGGTAGAG |
| SEQ ID NO: 3 | rs72721164 | AAATTGACTTTAGGCCAGGTGTGGT[A/G]GTTTGTGCCTATAATCTCAGCACTT |
| SEQ ID NO: 4 | rs72721158 | TATTTCAGGTAGTTATACTCTGTAA[C/G]TCACCACAAACTCAGATTTAGTGAA |
| SEQ ID NO: 5 | rs1776883 | AGGACTACAGGTGTGCACTGTCATG[C/T]CCAGCTAATTTTTTTAATTTTTTGT |
| SEQ ID NO: 6 | rs1776888 | CATCCAGGCCCAATATGACAAGCTG[G/T]CTCAGAAGAATCGAGAGAAGCTGAA |
| SEQ ID NO: 7 | rs1776881 | GTTGTTGTTACAAGGTCTTGCTCTG[C/T]TGCCCAGGCTGGAGTGCAGGGCCAC |
| SEQ ID NO: 8 | rs34754950 | ACTGCTCTTCATGAAGAAGAATAAC[-/A]ATGAGGAAGTTAAAGGCCAACAAGC |
| SEQ ID NO: 9 | rs1776886 | GAGCTTGCAGTGAGCCAAGATCATG[A/C]CACTGCACTCCAGCCTGGGCGACAG |
| SEQ ID NO: 10 | rs1776885 | GACCATCCTGGCTAACATGGTAAAA[C/T]TTCGTCTCTATTAAAAATACAAAAA |
| SEQ ID NO: 11 | rs1776889 | CTCCAGCCTGGGTGACAGAACAAGA[G/T]CCTATCTCTAAAAAATAAAAAATAA |
| SEQ ID NO: 12 | rs1776884 | GAGATCGAGACCATCCTGGCTAACA[C/T]GGTAAAACTTCGTCTCTATTAAAAA |
| SEQ ID NO: 13 | rs7544665 | CTGAGGGAAAAAAAGACCCTCTCAG[A/C]CCCCTTTAGCTGCAATATATCTTTT |
| SEQ ID NO: 14 | rs35632171 | TGGGGGAAAAGTATGAATAAAAGAA[G/T]GGACATGTAAAAACACCTAGTATTT |
| SEQ ID NO: 15 | rs36080042 | ATTTTCTACTTTTTTATTTTAATGG[A/G]GTTCCCAAAACAAGGGACAAAGGCA |
| SEQ ID NO: 16 | rs11788591 | CCGCTCCCACTCACTGGAGCCAACC[A/G]ATGGCCAGCCCCCGGTGAAGCTCTT |
| SEQ ID NO: 17 | chr17:37831293:D | CCTCCAACCGGCAGGTGTTGACAGC[ACCACC/A]CCACCCGGGCCCAGGGGAGCCAGTG |
| SEQ ID NO: 18 | rs116020758 | GAGGGCTTTCCTGGGCCCAAGCTAT[A/G]TTACATTTTCCATTCTCATCAGGCC |
| SEQ ID NO: 19 | rs58354223 | CCGCCTCCCGAGTTCAAGTGATTCT[C/T]CTGCCTCAGCCTCCCAAGTAGCTGG |
| SEQ ID NO: 20 | chr5:90356207:D | |
| SEQ ID NO: 21 | rs114381917 | TGTATAAAATATACAAAAAGCTAGC[C/T]GGGTATGGTGGCATGCAACTGTAGT |
| SEQ ID NO: 22 | rs2856328 | TCAATGTCCCCACTCCCCTCCCTTC[A/C]CTCTTGATTTCTTTTTGATTTCCTG |

TABLE 18-continued

Table of Sequences

| SEQ ID NO: 23 | rs6761859 | TGGCCGCACGCACTCAGCAGACCCT[A/G]ACTCTGCTCAGATCTTTCCTTCCTT |
|---|---|---|
| SEQ ID NO: 24 | rs67431028 | |
| SEQ ID NO: 25 | rs2502757 | TATAAGAGAGATGATACACCATGGC[C/T]AGACTGGACGTGGTGGCTCATGCCT |
| SEQ ID NO: 26 | rs2373794 | ATTTCTCCCCAAAGCACAGACTAAA[C/G]GGCAGGAAGCACGTCCAACCACTTC |
| SEQ ID NO: 27 | rs1342522 | GGTCTTGGCCTGTTTCTCTGTGCTT[C/T]TCTGGATGGCATCTTCCTCCCTGTA |
| SEQ ID NO: 28 | rs4957798 | GCCTCCAAGGCAGGATTGGAGCAAT[C/T]AACATACAGAACTAGAGAACTCTAG |
| SEQ ID NO: 29 | rs3741578 | TCCATCCTTGTTGGACCTGCTCTT[C/G]TCCCCAGCCCTGAACTGATAAAGCC |
| SEQ ID NO: 30 | rs116020758 | GAGGGCTTTCCTGGGCCCAAGCTAT[A/G]TTACATTTTCCATTCTCATCAGGCC |
| SEQ ID NO: 31 | rs12105167 | GGATAACTGCTTGAACCCGGGAGGC[A/G]GAAGTTGTAGTGAGCCGAGATCATG |
| SEQ ID NO: 32 | rs10171428 | AGGAGAGTGAGGAAGACTAAGCACT[A/G]CCTGTCTCCGTTGCCCGCCACCCCC |
| SEQ ID NO: 33 | chr10:68952056:D | CTGCAAAGCAAAGCAAACAACCAAA[AAC/A]ATGAAAAGGCAACACACAGAAAGAA |
| SEQ ID NO: 34 | rs2353275 | GGCAGGGCCTGTGCCTGCTCTGAGA[C/T]GTGTCCCATAAGCCTATCTCTATTT |
| SEQ ID NO: 35 | rs578196 | CAAGGCCAGAACCTGAAGTGGTCTA[A/G]GAGGCATCATTTTTCCTTTACAGTG |
| SEQ ID NO: 36 | rs3784143 | CCCTGGACGAATTTAGGAGCAGGAG[C/G]GGGAGGTGGTTATGGGGACAGCAAG |
| SEQ ID NO: 37 | rs62026377 | CCTGTTTGCCAAGCCTCTTTTCAGG[G/T]CTCCAGAGCAGCTGTGGAGAGAGAG |
| SEQ ID NO: 38 | rs7830057 | AGCCTTCCACTATTTGGAGAAAGTC[C/T]TGCCTFATGAGCTCATCTGAAAACG |
| SEQ ID NO: 39 | rs141602583 | TCACTCATGAAGTCACTGAGATCAT[C/G]AACCCACCAAAAGAAGAAACTCTG |
| SEQ ID NO: 40 | rs2040704 | TGTAGATAGGGATAAGCCAAAATGC[A/G]ATAAGAAAAACCATCCAGAGGAAAC |
| SEQ ID NO: 41 | rs9620247 | TTACTGAGGAGTTTCTCAGTGCTCT[A/G]TCTGCATCATCTGCTCGCTCTCTCC |
| SEQ ID NO: 42 | rs7281353 | CAGCATGAGAAAGACCTTCCCCCAT[C/G]ATTCAATTACCTCCATCTGGGTCCC |
| SEQ ID NO: 43 | chr10:98160029:D | AGTCAGAGAATTTAACTCTCAAAGC[TGTAA/T]GTAAGTAAGAGCAGGATTTGAACCA |
| SEQ ID NO: 44 | rs10835689 | GGGAAACCTTTTCTCCTCTGGGGTT[C/G]AGTGAAGACCTTCCTAGTGGAGGAA |
| SEQ ID NO: 45 | rs77829948 | AGAGGGCTCGCATGCTTGATCTGCC[C/T]GATCACGGGAACTATCACAAGACAT |
| SEQ ID NO: 46 | rs7169793 | CTAGGCTGGTTATAATGAAATTGAT[C/G]TTGTTGGGGGCACACACATTAAACC |
| SEQ ID NO: 47 | rs116201499 | AATCTTATTGGCTCAGCCTAAGTCA[A/G]GTGTCTATCCCTGGGTCAATCAACC |
| SEQ ID NO: 48 | rs77960860 | TGAGAATGCATATGTATCCCCTTGG[A/C]ATGCCCAGTTTGAAGGCCCTGAGAG |
| SEQ ID NO: 49 | rs12669009 | ATTATACAAAACAGTCTTGTAGCAC[C/T]TCCTCAACTCTAGCAATGCACTCTG |
| SEQ ID NO: 50 | rs57728637 | ATTTAGAAAGGCAAGACACGTGCTC[A/G]AAGTCTGTTTGGTTGCTTGACAGAG |
| SEQ ID NO: 51 | rs12006110 | CAGCCTGGGTGACAGGGTAAGACCC[C/T]GTCTCAAAAAAAAAAAAGTAAAAA |
| SEQ ID NO: 52 | rs191386225 | GTTCCCCTCCCTGTGTCCAAGTGAT[C/T]TCATTGTTCAATTCCCACCTATGAG |
| SEQ ID NO: 53 | rs116276540 | GATTTCTTCTCTTTTCTTGGTTAAT[A/C]TTGTGAATGGTCTATCCATTTTATC |
| SEQ ID NO: 54 | rs115366932 | GAAGAAGAAAAAACAGATGAGTGTG[A/T]TGTCTTGGCAGCCAAGTAAATTCAA |
| SEQ ID NO: 55 | rs188887209 | CGCCACCATGCCCGGCTAATTTTTT[A/G]TATTTTTAATAGAGACGGGGTTTCG |
| SEQ ID NO: 56 | rs10964378 | CCATCTACTTTCCCTGAAGATAGTG[A/G]GCTTCATGCACCGGTCCTCAACAAC |
| SEQ ID NO: 57 | rs9486080 | TAAAATACAAGATAGTTATAGAACA[C/G]TAAGCAGATTTAACCAAAAGAGGCA |
| SEQ ID NO: 58 | rs4645904 | CTCGGCCCGGGGACCACAGCCTGGC[A/C/G]TGTCACACGTGGGACCTCAGGAGGC |
| SEQ ID NO: 59 | rs4290604 | TTTGCAAAACTAGTTTTGTTTGATT[A/G]TTCTGTTTTTTTTAGTGCCCCGTCT |
| SEQ ID NO: 60 | rs7095944 | AGCTGCTGTTGGCCCTATCTGGAAC[A/C]AGGCAGTCCAGGGCAAACTTTGGCA |

TABLE 18-continued

Table of Sequences

| SEQ ID NO: 61 | rs59568570 | GCACTCCAGCATGGGCGACAGGAGC[A/G]AGACTCCGTCTCAAAAAAAAAAAA |
| SEQ ID NO: 62 | rs9390491 | TTTTTTTTTTTTTTTTTTTAGCTC[A/G]TCTTGCACATTTACCCTTCCAGATG |
| SEQ ID NO: 63 | rs77297849 | AGTTGTATTTTTTTATCAGGACTC[C/T]TTAATCTCATTTTAATTTCCTTTGA |
| SEQ ID NO: 64 | rs9846423 | GGCTTCCATTCCTTCTGCATTGAA[A/G]TCAAATGGGAACGGAGATAGGGTCC |
| SEQ ID NO: 65 | rs2353275 | GGCAGGGCCTGTGCCTGCTCTGAGA[C/T]GTGTCCCATAAGCCTATCTCTATTT |
| SEQ ID NO: 66 | rs62344088 | AGGTCTAGTGCAGGAGGTATAGTTT[A/G]GTGGAAACTTTTGCCTGAAGTTCTC |
| SEQ ID NO: 67 | rs4957798 | GCCTCCAAGGCAGGATTGGAGCAAT[C/T]AACATACAGAACTAGAGAACTCTAG |
| SEQ ID NO: 68 | rs35083325 | CTGTGGTCCCAGCACTTTGGGAAGC[C/T]GAGGCGGGCGGATCACTTGAGGTCG |
| SEQ ID NO: 69 | rs62067034 | CTGTGGTCCCAGCACTTTGGGAGC[C/T]GAGGCGGGCGGATCACTTGAGGTCG |
| SEQ ID NO: 70 | rs10811256 | TGTGCTCACTGCAGTTGACTAGGAT[C/G]CATGTGAAATGATTTTTAAAAGGCA |
| SEQ ID NO: 71 | rs116126524 | AGAGAGATCCTGTGTGTACAAAAAA[A/T]TTTTAAATTAGCTGGGCATGGTGGT |
| SEQ ID NO: 72 | rs6907629 | CACCATTGTCCACCAGCTGTGCCAG[C/T]GGGGTTGGAAATGACCATTTCAAAC |
| SEQ ID NO: 73 | rs6872411 | ACCCACTTACCTGTTACCCCATATA[A/T]TGCCCACAGAAATATGCCATGTGAA |
| SEQ ID NO: 74 | rs17277929 | AAAAGACGCCCTTGCAATGCAGGGC[C/T]CAGAGTGTCTATTTGCAATATATCA |
| SEQ ID NO: 75 | rs1530572 | ACTTGATGATAAAAAGATGAATACG[A/G]CTCAGTCCCTGACCTCAAGCATTCA |
| SEQ ID NO: 76 | rs12600053 | TTGCCAAAGGAGCCGCCCAGGGGAT[A/G]TTTTTCTGAGGAATTCCCGCTCCAG |
| SEQ ID NO: 77 | rs11839433 | GAAAACTTCCTCCTAATCTAGGTCA[G/T]TGTCATTTATGTCTGTTCTACTTCT |
| SEQ ID NO: 78 | rs13401339 | AATGTGGGTGTGAGAAGGGGAGGGG[A/G]AAAGGAAGAGATGGAGAGACCAACG |
| SEQ ID NO: 79 | rs3095318 | GGGGCGTGTGGGTGGGCACGGGATG[A/T]TGGCACTGCTGCTGGCTGGTCTCCT |
| SEQ ID NO: 80 | rs2147959 | TGTAACTACATTTTTCCTTATAAAA[A/T]GGAGGGTTTAAGAGCGTCGGAGACC |
| SEQ ID NO: 81 | rs7104956 | GGAACTGGATCAGCGGGCTGGGAC[C/G]GGGAGGCACAACACAGGGACACCGT |
| SEQ ID NO: 82 | rs114623225 | TGTTGTGGGGAGGCCGGGGTGGGGT[C/G]GGGGTGTGTGCGGGGTGGTCCTTTT |
| SEQ ID NO: 83 | rs9923856 | GAGGACCAACTGGGTGACATCCACA[C/T]GAAACCAGAATCTCAGACAGGTTAC |
| SEQ ID NO: 84 | rs2431345 | AAGCTAAACGTATGATTATATTGGG[G/T]TTGTTCTAGAAGGGGGTAGTGATGA |
| SEQ ID NO: 85 | rs1293767 | GGTTGCACAGAGCTGTCTGGCACCC[C/G]CTTCTTTGGCTTTTCTCTCCTGACA |
| SEQ ID NO: 86 | chr2:63203981:I | TAGCACAGACTTTCTCTCCCTCCCTT[C/CT]TTATAGTTCCTTTTAGTTTTTCTATTTCTATT |
| SEQ ID NO: 87 | rs1691562 | CTCAAAAAAAAAAATAAAATAAAA[A/T]AAATAAAAAAAGAGGCACTGAAGAG |
| SEQ ID NO: 88 | rs646356 | CAGGTTGATGCAGGAGGAGCGCACG[A/T]CCTCTCGTGCCTGGGGAAGACCAAA |
| SEQ ID NO: 89 | rs11498342 | TTCACACCTTGAATCAGTACAATAA[A/C]CCCCCCTCCCCAATCACAAAAGAAA |
| SEQ ID NO: 90 | rs74106266 | GGACATTTAAAAATACAACAGGAAG[G/T]TGTGGAACATTTAAAAATTGGGAAT |
| SEQ ID NO: 91 | rs112461602 | TGAGACCTGGCCTGCCACAATCCCT[A/G]CTGTCAATTTGCACATGTTTCTAT |
| SEQ ID NO: 92 | rs4963397 | GAGGATTCCCTCTTTTTCTATTGAT[G/T]GGAATAGTTTCAGAAGGAATGGTAC |
| SEQ ID NO: 93 | rs147089311 | ATTCACCAAATTCAAGACATCCGCC[A/T]CTCCCCACTGGCAGTCCAGTACTCA |
| SEQ ID NO: 94 | rs10022260 | ACCCAGGCTGGAGTGCAGTGTGGCA[C/T]GATCTCAGCTCACTGCCACCTCCGC |
| SEQ ID NO: 95 | rs78558203 | AATCCAACAATTGACAGCCTACAGG[C/T]CAGATCCAGCTTATAATTATAACCT |
| SEQ ID NO: 96 | rs1837253 | AAAAGATCCTTTTATACATAAACAA[C/T]GTGTCTAAACTATGAAGCAAATTAC |
| SEQ ID NO: 97 | rs682632 | ATCCACTATCTTTGGGGTCATCCTC[G/T]GTATGCCTGAAGGAAGAAAACAGCA |
| SEQ ID NO: 98 | rs511619 | AGTACAGACTAATACAAGGGTGGAG[G/T]CAATGACAGCGCTAAAGGGCACCTT |

TABLE 18-continued

Table of Sequences

| SEQ ID NO: 100 | rs621629 | AATGGTTACTGTTTTTACTGTTTGG[C/T]TTGGTAAAAAGCCAAACCTCTTTTC |
| SEQ ID NO: 101 | rs145744239 | GACTTTAAACCAACAAAGATCAAAA[G/T]AGACAAAGAAGGCCATTACATAATG |
| SEQ ID NO: 102 | rs1776880 | CTCTTTCTTCCAGGCTGGAGTTCAG[C/T]GGCAGGATCTCAGCTCACTGCAACG |
| SEQ ID NO: 103 | rs112216073 | TGGGACTACAGGCGCCCGCCACCAC[A/G]TCCAGCTAATCTATTGTATTCTTAG |
| SEQ ID NO: 104 | rs34106588 | TTTTAAAATACAACACATTGGGCCA[G/T]GCATGATGGCTCATGCCTATGATCC |
| SEQ ID NO: 105 | rs34662842 | AGGATGGCTTGAGCCCAGGGAGTAG[A/G]AGACCAGCCTGGGCAACATTGCAAG |
| SEQ ID NO: 106 | rs35506702 | AAATTCTTAGGTCATTCTGATACAC[C/T]ATCAAGTTTGAGAATTAGTGGCTTC |
| SEQ ID NO: 107 | rs4129267 | CTCAGCTTGGAGTGGGGTCAATTCT[C/T]AAAGGAAATGACATCACCTCATCTG |
| SEQ ID NO: 108 | rs4845783 | TTGAGAAAGAGGAAGCAACTGGGGT[A/G]TCTCTGAGGTTTTGTGCCTTGTGCC |
| SEQ ID NO: 109 | rs13408661 | ACACACAGTTTGTTTAGATAGATAA[A/G]GCTGCTTTTCCATTGGATAACTGTG |
| SEQ ID NO: 110 | rs9807989 | GTATATCCCTTTATTCTTAGATGT[C/T]TCATCTCTGTTAGCAATATTTTGTA |
| SEQ ID NO: 111 | rs10197862 | TGCTAATAGCCTCAATAACGGCTCA[A/G]GAGACTTGTGAAAGATACAATTTAG |
| SEQ ID NO: 112 | rs10173081 | GTGAAAGAAGTCGAAGTGGGAACAG[C/T]GGTGCCCTTCTGGTTGGGTTCTTG |
| SEQ ID NO: 113 | rs3771166 | AAAAATTAAAGAATTACTGTTCTAA[C/T]GGGAAATTTTCAGGTGTAAAGTCTG |
| SEQ ID NO: 114 | rs35141484 | CTTATATTAGGCTACCTCTTCTTGC[A/C]CCACAGGTAATTAATAGGCACTTGT |
| SEQ ID NO: 115 | rs4833095 | TGTTTCAATGTTGTTTAAGGTAAGA[C/T]TTGATAACTTTGGATTTGTTTGAAG |
| SEQ ID NO: 116 | rs1837253 | AAAAGATCCTTTTATACATAAACAA[C/T]GTGTCTAAACTATGAAGCAAATTAC |
| SEQ ID NO: 117 | rs1438673 | ATAATGCTAATTTAGCTTGTCAGAA[A/G]ACAAAATTACAACATATTTAGTTAT |
| SEQ ID NO: 118 | rs2244012 | AAGGGCGGGGAATGAGGACATGATC[C/T]AGCACCAGAAGTCAAAGTGTATACA |
| SEQ ID NO: 119 | rs11745587 | ACATCTCTGGGGTCCAAGAATTCAC[A/G]GCTTTCTTTTTCTTTAGAGAGCCTT |
| SEQ ID NO: 120 | rs3998159 | TATTTTTATGTACAATTGTAAGTAT[A/C]TTTGACCATTAGATAATGCCTACAT |
| SEQ ID NO: 121 | rs404860 | TGGGCTATGATCAACAGGAGACTTG[C/T]TGGTCTCTCTGTATTAGACTTAAAG |
| SEQ ID NO: 122 | rs9268516 | TTCACCTCCTAACAGCTATAATCCT[C/T]TCAACAGTGAAACTCCGGGGACAAG |
| SEQ ID NO: 123 | rs9272346 | AGAGATCCCTAGGTAGGTGGGGTCA[A/G]CTTAACATTTGGAGAATTCCATACG |
| SEQ ID NO: 124 | rs9273373 | TGTGAGGACAGGCTCTGGAGGCTGA[A/G]GTGCTCCACATGACTGGTGTAGACA |
| SEQ ID NO: 125 | rs987870 | ACCTCCTTCAAAGCATCTGATTCTA[C/T]TTTGTTTAGAGTGAATATTTTACA |
| SEQ ID NO: 126 | rs9273349 | TCTTTCTTTTCCCCACAGCTACACA[C/T]AGAGACTGAGGACACCCTGGACAAC |
| SEQ ID NO: 127 | rs72699186 | GGAAGAAGAATGCATCAACTGAAAA[A/T]CTATTCCTTTGAGAGGACCAATAAA |
| SEQ ID NO: 128 | rs2381416 | ATGGAGGAAAGAAACAATGGACTTA[A/C]AAGTCAATAGAAATTATCTGATTTG |
| SEQ ID NO: 129 | rs1342326 | CCAATCTTTTCTCATGAAGACACCA[G/T]CATGACCTCTTATTCTTATTTATAT |
| SEQ ID NO: 130 | rs17294280 | TCCCCACACTTGTGAAATCACAGGC[A/G]GGCAACATAATGACAGGAAGTCAGC |
| SEQ ID NO: 131 | rs744910 | CTTAGCACACTTACAGAACTTGTTG[A/G]GAACACTCAGGAAACTCAGCTACAG |
| SEQ ID NO: 132 | rs2305480 | TTCCGGGGAGCTACACATGGAGGAC[C/T]CAGACAAGCCTCTCCTAAGCAGCCT |
| SEQ ID NO: 133 | rs11078927 | TCTTTGCCCATTCTGAAATGACGAA[C/T]GGGAAGCCCAGCAGCTCACTCACCT |
| SEQ ID NO: 134 | rs7216389 | AGGCAACCCTGGAAAGTCACAAACA[C/T]GCATGGACTCGGCCCTGATTGATCA |
| SEQ ID NO: 135 | rs4794820 | AGGAAGGAAGGAAGGAAGAAAGACA[A/G]CAACAAAAAAACCTTGAATCAGGAT |
| SEQ ID NO: 136 | rs6503525 | GAATCACTTGAATCTGGGAAGTGAA[C/G]GTTGTAGTGAAGCGAGATCATGCAA |
| SEQ ID NO: 137 | rs17036023 | GCACAGGCCACATGTGGAGTTTGGT[A/G]TCGGGTTCCACTGGCTTACTGAATA |
| SEQ ID NO: 138 | rs1102000 | GCTGCACCTCAGAGAGATGCAGAGC[C/T]GCTGCTACTGGGAATGTTCAGCTAG |

TABLE 18-continued

Table of Sequences

| SEQ ID NO: 139 | rs7527074 | CATTGGTGATGTATTTGGTTCCTGA[C/T]AGCATTATTTAATTTTGCTACACAT |
| --- | --- | --- |
| SEQ ID NO: 140 | rs2786098 | CTAAGTCAAAGGTGTTGAATTATAG[A/C]GCATTTGCCTAAAAGGAGGTTGACT |
| SEQ ID NO: 141 | rs4658627 | AAAATATTAAAAATTGGTGAAACTA[A/G]GTTGAAGGTACATGAACGCTTGTTG |
| SEQ ID NO: 142 | rs9815663 | GCATAAGTGAATGGAACATCCACTG[C/T]GTTATATATCAGAAGCAGGTGGGAA |
| SEQ ID NO: 143 | rs9823506 | GCATCTGGGGAACCAAATTTAGCAA[C/T]AGGGAGGAGATGCTTTTGTGATAAT |
| SEQ ID NO: 144 | rs2705520 | GTATGTTTCACTTAGATTATTGTTG[C/T]GCTTTTCTCCATGCCCTGACATGTA |
| SEQ ID NO: 145 | rs7686660 | ATCATGTGCACAGCCCTGAGACAAG[G/T]AGCTAGAGGAGTACTATGATTGGAA |
| SEQ ID NO: 146 | rs1588265 | GTCCATCTGTCTTATTAATTTTTCA[A/G]AAACACAGCCCCTGGATACATTGAT |
| SEQ ID NO: 147 | rs6867913 | GACCCATGAGGAAACCACTGCGCTG[A/G]CCCAGGTGAGAGCTGAAGGGCTGCC |
| SEQ ID NO: 148 | rs6967330 | CTCCAGCTGGTAACTAAAGTGGACT[A/G]TGAAACAACCCCCATCTATATTCTC |
| SEQ ID NO: 149 | rs7807274 | TAATGCTCCTGTAGCTTTATATTTG[A/G]AGTCTGTTTCTTGTTAAGAATAAAC |
| SEQ ID NO: 150 | rs7009110 | ACTGAGGAAACATAACATTTTGATT[C/T]ATAGTTAATGGTGATTGGGAACGGT |
| SEQ ID NO: 151 | rs10970976 | TGGGATTAATAGATGTGAGCTACCA[C/T]GCCCAGCCCACAGTGTCTCTGGATT |
| SEQ ID NO: 152 | rs2378383 | TTCTCTCCAGACGCTCTGCCTAATG[A/G]TAAGAATGGGATATTGAAGGCACCA |
| SEQ ID NO: 153 | rs10508372 | CGTCCCAAGGCCTTGGAATGTTGGC[A/G]TAACAGGAAAAAGGGTGTGGAGTGG |
| SEQ ID NO: 154 | rs11000019 | CTACACCATTCCTCTTTAGACACCC[A/G]GAATCACAGCTCTCTTAGGAACCAG |
| SEQ ID NO: 155 | rs12570188 | ACTTTCTTTGCTTGTATACAATGGA[C/T]GGTGGTCTTACCTTATGGTGAAATC |
| SEQ ID NO: 156 | rs713088 | CTGCTGGGGAAGGGGAAAGAGACAG[G/T]CCCTGCTGTCAGTTCTCAGCTGGTT |
| SEQ ID NO: 157 | rs11214966 | CACAACCCCAGTCACTTCCATATTA[C/T]GTGACCTTTATTACAAGAAAGGAAT |
| SEQ ID NO: 158 | rs62026376 | CCTTAGAGAGGGGCCTCAAGGGATG[C/T]CCCTGGTCTAGACAGAATGTTCCCT |
| SEQ ID NO: 159 | rs7212938 | TGTGGCTCCCAAGGCCCTGGAGACC[G/T]TGCAGGAGAGGTGAGAGTGGGCGGG |
| SEQ ID NO: 160 | rs16984547 | AACAGAATAAAAAGTCCTAGAAAGA[C/T]ACAGTAAAAAGTAGTGTCTGTCTCT |
| SEQ ID NO: 161 | rs2284033 | CAGTGCTTATCATCACCTGACCTAC[A/G]AAATATATGGTTTGGTTTCTTTACT |
| SEQ ID NO: 162 | rs75446656 | CTGAGGGAAAAAAAGACCCTCTCAG[A/C]CCCCTTTAGCTGCAATATATCTTTT |

EXEMPLARY EMBODIMENTS

Embodiment 1. A method for identifying a human subject as having a predisposition for asthma, comprising,
a. obtaining a nucleic acid sample from said subject;
b. detecting whether the nucleic acid has one or more single nucleotide polymorphisms (SNPs) listed in Table 18, or a SNP in linkage disequilibrium with one or more of the SNPs listed in Table 18, by contacting the nucleic acid sample with a probe or primer of sufficient length and composition to detect the SNP; and
c. identifying the subject as having a predisposition for asthma if one or more SNPs are identified.

Embodiment 2. The method of embodiment 1, further comprising administering at least one an agent useful to treat asthma.

Embodiment 3. The method of embodiment 1, wherein said agent is selected from one or more of a PGE synthetic agonist, an oral steroid, an anti-IgE, a β1 agonist, a β2 agonist, a mast cell stabilizer, a leukotriene antagonist, Ipratropium bromide, and a phosphodiesterase inhibitor.

Embodiment 4. The method of embodiment 3, wherein said agent is selected from Epoprostenol, Iloprost, Treprostinil, Methylprednisolone, Prednisone, Prednisolone, Triamcinolone, Omalizumab, Beclomethasone, Budesonide, Ciclesonide, Flunisolide, Fluticasone, Fluticasone propionate HFA, Fluticasone Propionate inhaled, Momethasone, Triamcinolone Acetonide, Triamcinolone, Dobutamine, Epinephrine, Racepinephrine Isoproterenol β1, Isoproterenol β2, Methylxanthine, Theophylline, Arformoterol, Albuterol, Albuterol Sulfate, Clenbuterol, Fenoterol, Formoterol, Isoetarine, Levalbuterol, Levalbuterol HCL, Levalbuterol Tartrate, Metaproterenol, Pirbuterol, Procaterol, Ritodrine, Salmeterol, Terbutaline, Cromolyn, Cromolyn Sodium, Nedocromi, Montelukast, Zafirlukast, Zileuton, Ipratropium Bromide, Aerovent, Apovent, Atrovent, Ipraxa, and Ibudilast.

Embodiment 5. The method of embodiment 3, wherein a combination of drugs is administered, said combination selected from
i) a PGE-agonist and a leukotriene inhibitor;
ii) a PGE-agonist and low dose inhaled steroid;
iii) a PGE-agonist and a beta adrenergic agonist;
iv) a PGE-agonist and a phosphodiesterase inhibitor;
v) a PGE-agonist and an anti-IgE antibody;
vi) a PGE-agonist and anticholinergic agent; and
vii) a PGE-agonist and a mast cell stabilizer.

Embodiment 6. The method of embodiment 5, wherein combinations i-vi further comprises a mast cell stabilizer.

Embodiment 7. The method of embodiment 5, wherein said PGE-agonist is selected from epoprostenol, iloprost and treprostinil, said leukotriene inhibitor is montelukast; said inhaled steroid is fluticasone; said phospdiesterase inhibitor is theophylline, said anti-IgE antibody is Xolair, said anticholinergic agent is Atrovent, and said mast cell stabilizer is chromolyn.

Embodiment 8. The method of any one of embodiments 1-7, wherein the subject is of European decent and has a SNP selected from any one of SEQ ID NOS: 1-12, 14, 15 and 162.

Embodiment 9. The method of any one of embodiments 1-7, wherein the subject is of African American decent and has a SNP selected from any one of SEQ ID NOS: 16 and 39-63.

Embodiment 10. The method of embodiment 9, wherein said SNP has the sequence of SEQ ID NO: 16.

Embodiment 11. A method for diagnosing and treating asthma in a European human subject, comprising,
 a. detecting whether at least one single nucleotide polymorphism (SNP) selected from SEQ ID NO: 1-12, 14, 15 and 162 is present in a nucleic acid sample from the subject,
 b. diagnosing the subject with asthma when the presence of at least one SNP is detected; and
 c. administering an effective amount of an agent useful for the treatment of asthma.

Embodiment 12. The method of embodiment 11, wherein the agent is one or more of the agents described in Table 4.

Embodiment 13. A method for identifying a predisposition to asthma in an African American human subject, comprising,
 a. obtaining a biological sample from said subject, said sample containing nucleic acids;
 b. detecting whether SNP rs11788591 (SEQ ID NO: 16) is present in said sample; and
 c. identifying the subject as having a predisposition to asthma if the SNP is detected.

Embodiment 14. A method for diagnosing and treating asthma in an African American human subject, comprising,
 a. detecting whether SNP rs11788591 (SEQ ID NO: 16) is present;
 b. diagnosing the subject with asthma when said SNP is detected; and
 c. administering an effective amount of an agent useful for the treatment of asthma.

Embodiment 15. The method of embodiment 14, wherein the agent is one or more of the agents described in Table 4.

Embodiment 16. The method of any one of the preceding embodiments, wherein the step of detecting the presence of the SNP is performed using a process selected from detection of specific hybridization, measurement of allele size, restriction fragment length polymorphism analysis, allele-specific hybridization analysis, single base primer extension reaction, and sequencing of an amplified polynucleotide.

Embodiment 17. The method of any one of the preceding embodiments, wherein the target nucleic acid is DNA.

Embodiment 18. The method of any one of the preceding embodiments, wherein the nucleic acid sample is from blood, urine, serum, gastric lavage, cerebral spinal fluid, brain cells, mononuclear cells, fetal cells in maternal circulation, or body tissue.

Embodiment 19. A kit for practicing the method of any one of the preceding embodiments.

Embodiment 20. A method of treating asthma in a patient having any one or more of rs72721168, rs72721166, rs72721164, rs72721158, rs1776883, rs1776888, rs1776881, rs34754950

Embodiment 21. rs1776886, rs1776885, rs1776889, rs1776884, rs11788591 having SEQ ID NOS 1-12, 162, 14, 15 and 16, respectively, comprising administering one or more agents useful in treating asthma Embodiment 22. The method of embodiment 20, wherein the agent is listed in Table 4.

Embodiment 23. The method of embodiment 20, wherein the patient is of European decent and has one or more SNPs selected from rs72721168, rs72721166, rs72721164, rs72721158, rs1776883, rs1776888, rs1776881, rs34754950, rs1776886, rs1776885, rs1776889, and rs1776884 of SEQ ID Nos: 1-12, 162, 14 and 15, respectively.

Embodiment 24. The method of embodiment 20, wherein the patient is of African American decent and has SNP rs11788591 of SEQ ID NO: 16.

Embodiment 25. A solid support comprising one or more nucleic acid molecules comprising one or more of SEQ ID NOS: 1-162.

Embodiment 26. The solid support of embodiment 24, wherein said nucleic acid molecules are affixed to the support so that they do not diffuse from the support when placed in solution.

Embodiment 27. The solid support of embodiment 24 or embodiment 25, wherein said nucleic acid molecules comprise a non-naturally occurring detectable label.

Embodiment 28. A kit comprising the solid support of any one of embodiments 24-26, said kit further comprising reagents for PCR.

Embodiment 29. The solid support of any of embodiments 24 and 25 or the kit of embodiment 27, wherein the nucleic acid molecules are probes and/or primers.

The following examples are provided to illustrate certain embodiments of the invention. They are not intended to limit the invention in any way.

Example I

Validation and Implementation of the EMR-Based Asthma Algorithm at CHOP and the eMERGE Sites Despite significant advances in our knowledge of the genetic architecture of asthma, specific contributors to the variability in the burden between populations remain uncovered. To identify additional genetic susceptibility factors of asthma in European American and African American populations, a phenotyping algorithm mining Electronic Medical Records was developed and validated to recruit cases with asthma and controls from the eMERGE (electronic Medical Records and Genomics) network. Genome-wide association analyses were performed in pediatric and adult asthma cases and controls from European and African American ancestry using SNPTEST followed by meta-analysis with METAL. Nominally significant results were re-analyzed conditioning on allergy status.

The validation of the algorithm yielded an average of 95.5% positive predictive values for both cases and controls. The algorithm accrued 21,644 subjects (65.83% European American and 34.17% African American). We identified four novel population-specific associations with asthma after meta-analyses: loci 6p21.31, 9p21.2 and 10q21.3 in the European American population and the PTGES gene in African Americans. TEK at 9p21.2, which encodes TIE2, has been shown to be involved in remodeling the airway wall in asthma and the association remained significant after conditioning by allergy status. PTGES, which encodes the prostaglandin E synthase, has also been linked to asthma, where deficient prostaglandin E2 synthesis has been associated with airway remodeling.

Results

The internal validation of the algorithm by manual chart review yielded PPVs (95% confidence interval) of 97.07% (94.66%-98.45%) and 99.4% (96.8%-100%) at CHOP, and the external PPVs amounted to 96% (85.14%-99.30%) and 82% (68.08%-90.95%) at Cincinnati, 100% (65.54%-100%) for both at Geisinger and 96% (77.67%-99.79%) for both at Marshfield Clinic, for cases and controls, respectively.

The implementation of the algorithm in the Center for Applied Genomics' biorepository identified 11,784 asthma cases and controls. After quality control filtering, 215 samples were removed due to low genotyping call rate and 446 due to cryptic relatedness. Principal component analysis on the remaining 11,569 samples classified 5,680 subjects as AA (49.10%), 5,414 as EA (46.80%), and 474 belonging to other ancestry groups (4.10%). Only individuals in the EA and AA clusters were included in the analysis. The mean age of the final sample (±standard deviation) was 14.02±7.7 years, 50.95% of whom were male.

The number of subjects accrued across the eMERGE sites was 11,929, 40.31% of whom were males and with a mean age (±standard deviation) of 64.52±17.52 years. Principal component analysis identified 8,970 subjects as EA (75.19%), 2,025 as AA (17.31%) and 934 were classified as 'other' (7.49%). Only EA and AA clusters were included in the analysis (Table 1).

The algorithm was also used to capture the allergy status of the asthma cases. Among the 5,304 pediatric and adult cases, 69.42% had allergic asthma: 79.1% and 51.2% in AA children and adults, respectively and 84.6% and 42.7% in the EA pediatric and adult cohorts, respectively (Table 1).

Meta-Analyses Reveal Three Novel Population-Specific Susceptibility Loci and Confirm 5q22.1 as a Shared Risk Locus for Asthma Across Populations We performed GWAS in each of the four cohorts separately and then conducted meta-analyses in the combined sample of 21,446 subjects, in each of the ancestry groups and in the pediatric and adult samples separately (top results with p-value≤$10^{-6}$ in Tables 11, 12, 14, 15, and 16).

Genomic inflation factors were 1.015 and 1.056 for the pediatric EA and AA, respectively; 1.021 and 1.036 for the adult EA and AA, respectively; and 1.015, 1.007, 0.996, 1.013, and 1.000 for the meta-analysis of the combined, EA, AA, pediatric and adult cohorts, respectively, indicating no population stratification (FIG. 2).

Figure 1B:
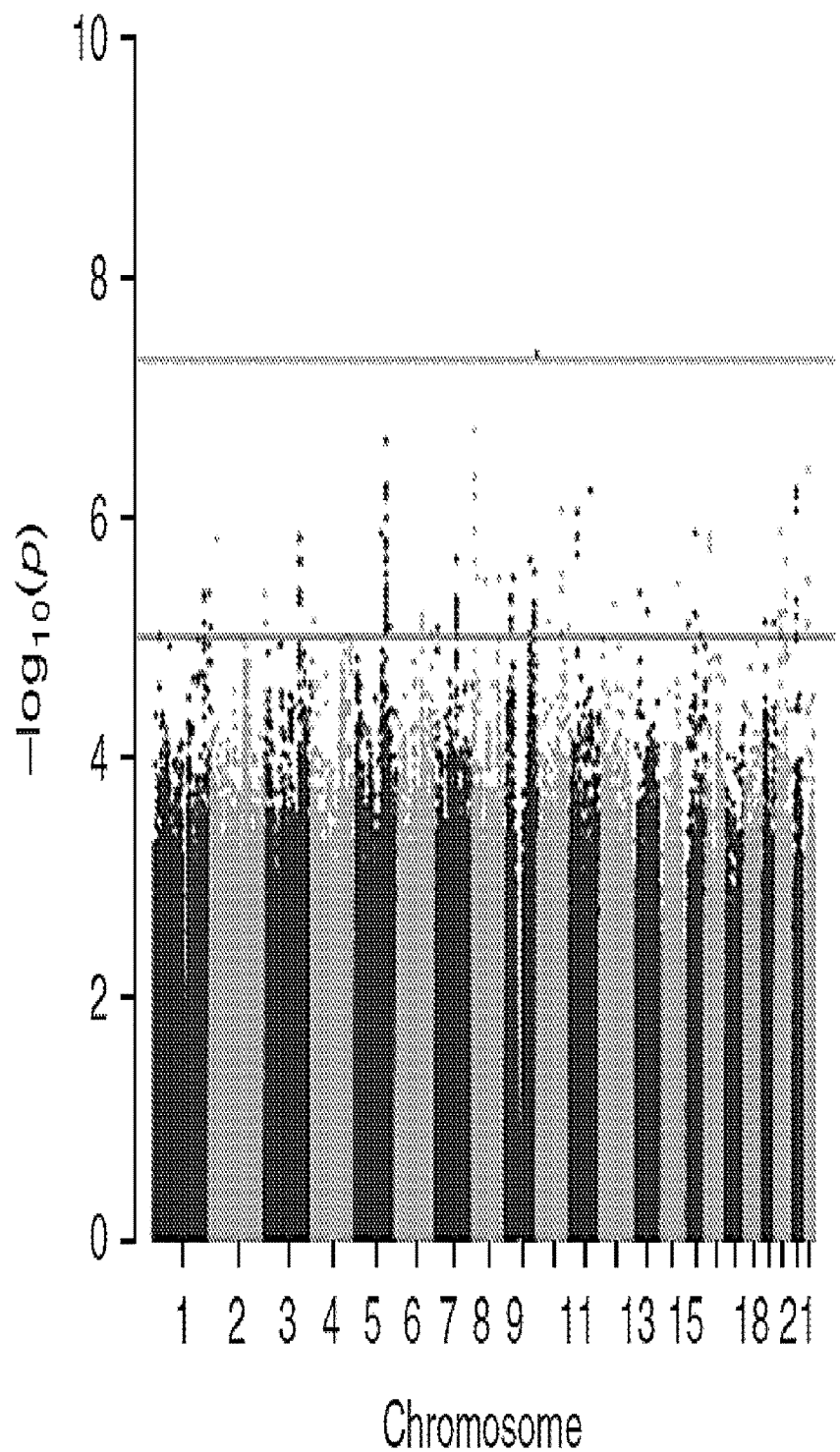
Figure 1C:
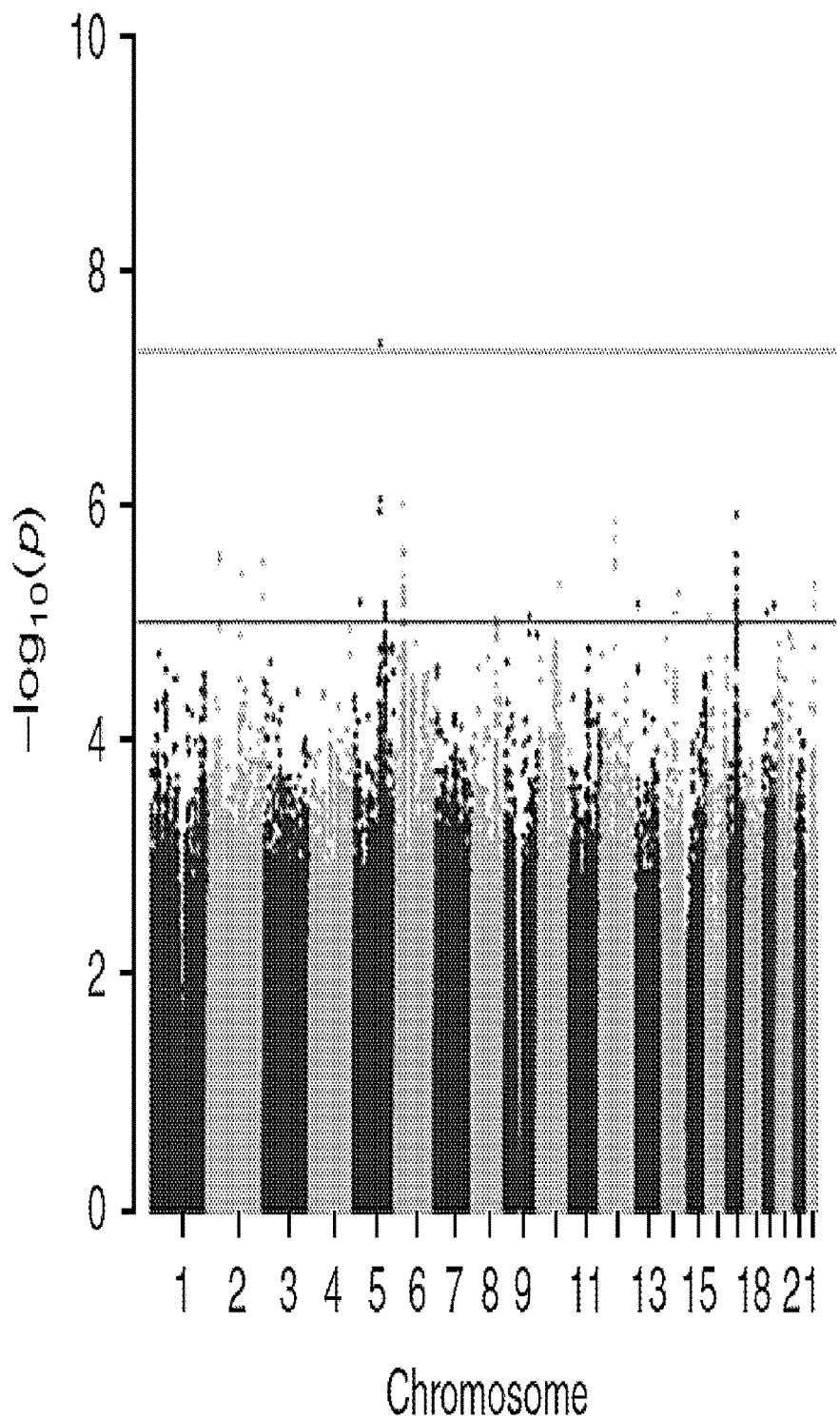
Figure 2A:
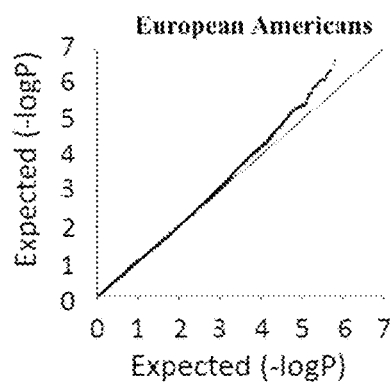
FIGS. 2A-2E. Quantile-quantile plots show −log 10(p-value) of observed genomewide association results against expected association results for asthma in the three analysis. Genomic inflation factors are 1.015, for European Americans (FIG. 2A, 1.007 for African Americans (FIG. 2B), and 0.996 for the combined analysis (FIG. 2C). 1.010 for the pediatric (FIG. 2D) and 1.000 for the adult (FIG. 2E) analyses FIGS. 3A-3F. Regional association plots of the loci associated with asthma without adjusting by the allergy status (FIGS. 3A-3E) and adjusting by allergy. Statistical significance of each SNP on the −log 10(p-value) scale as a function of chromosome position in the meta-analyses. The top SNP at each locus is shown in purple with the correlations ($r^2$) of surrounding SNPs indicated by color as illustrated in the figure. Grey represents unknown $r^2$. The fine scale recombination rate is shown on the right side of the plots in blue.
Figure 2B:
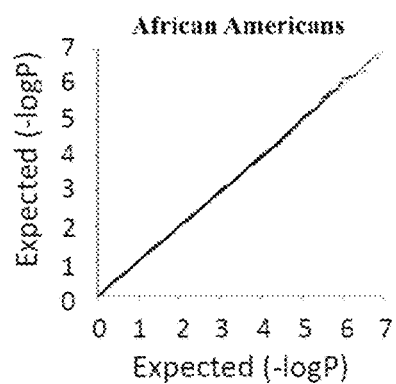
Figure 2C:
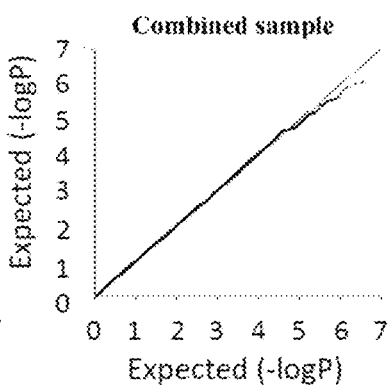
Figure 2D:
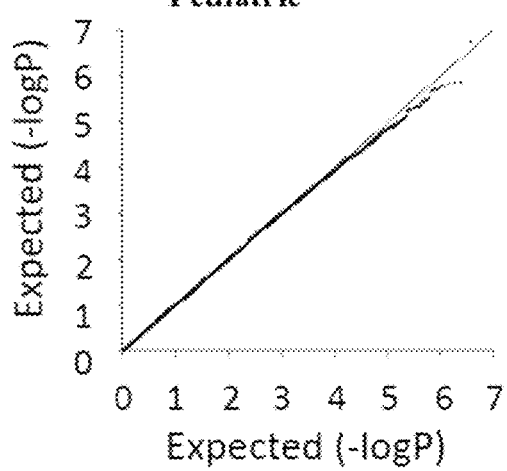
Figure 2E:
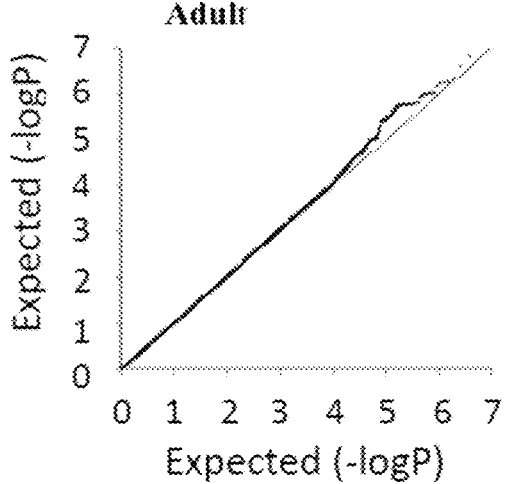
Figure 3A:
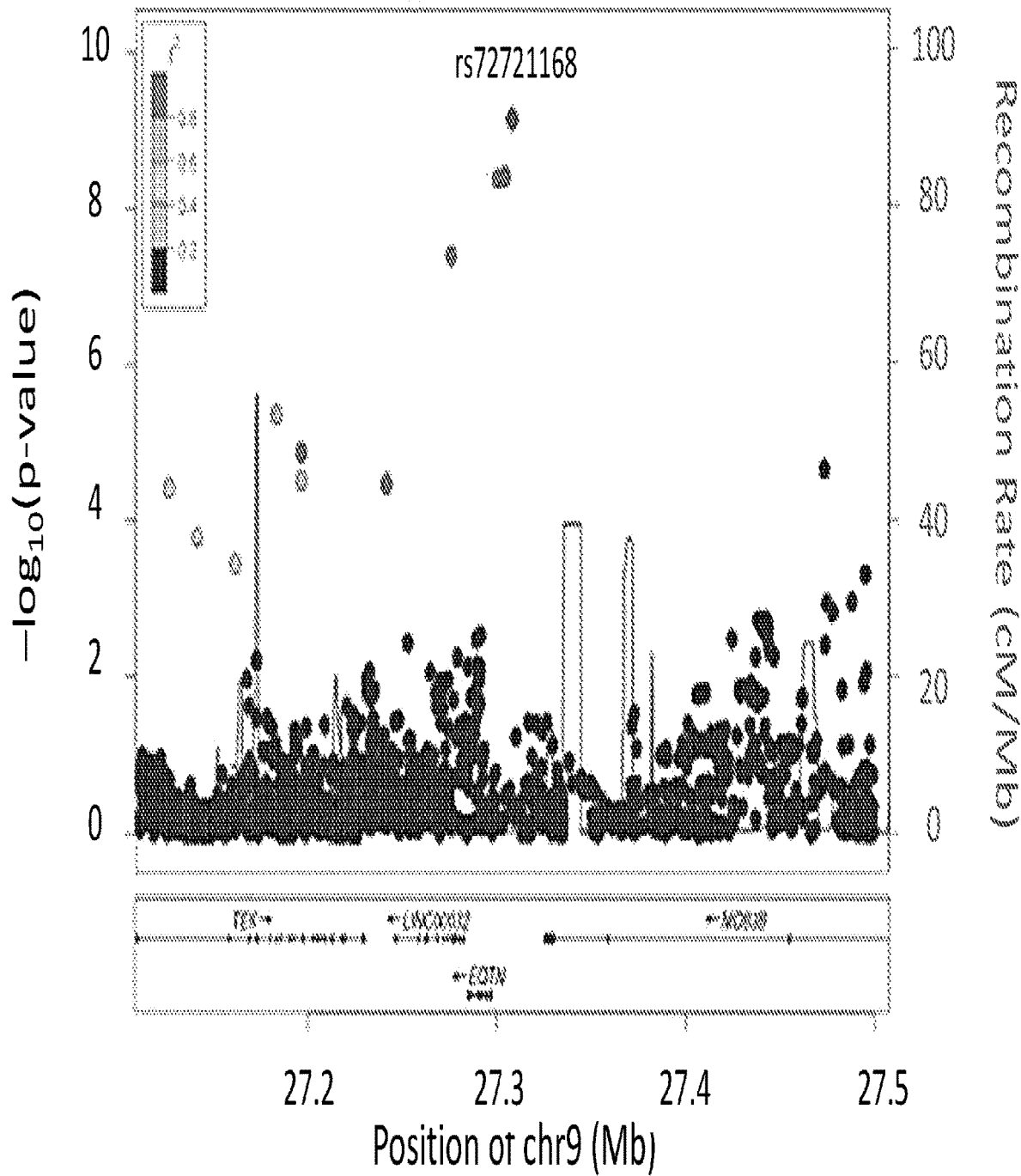
Figure 3B:
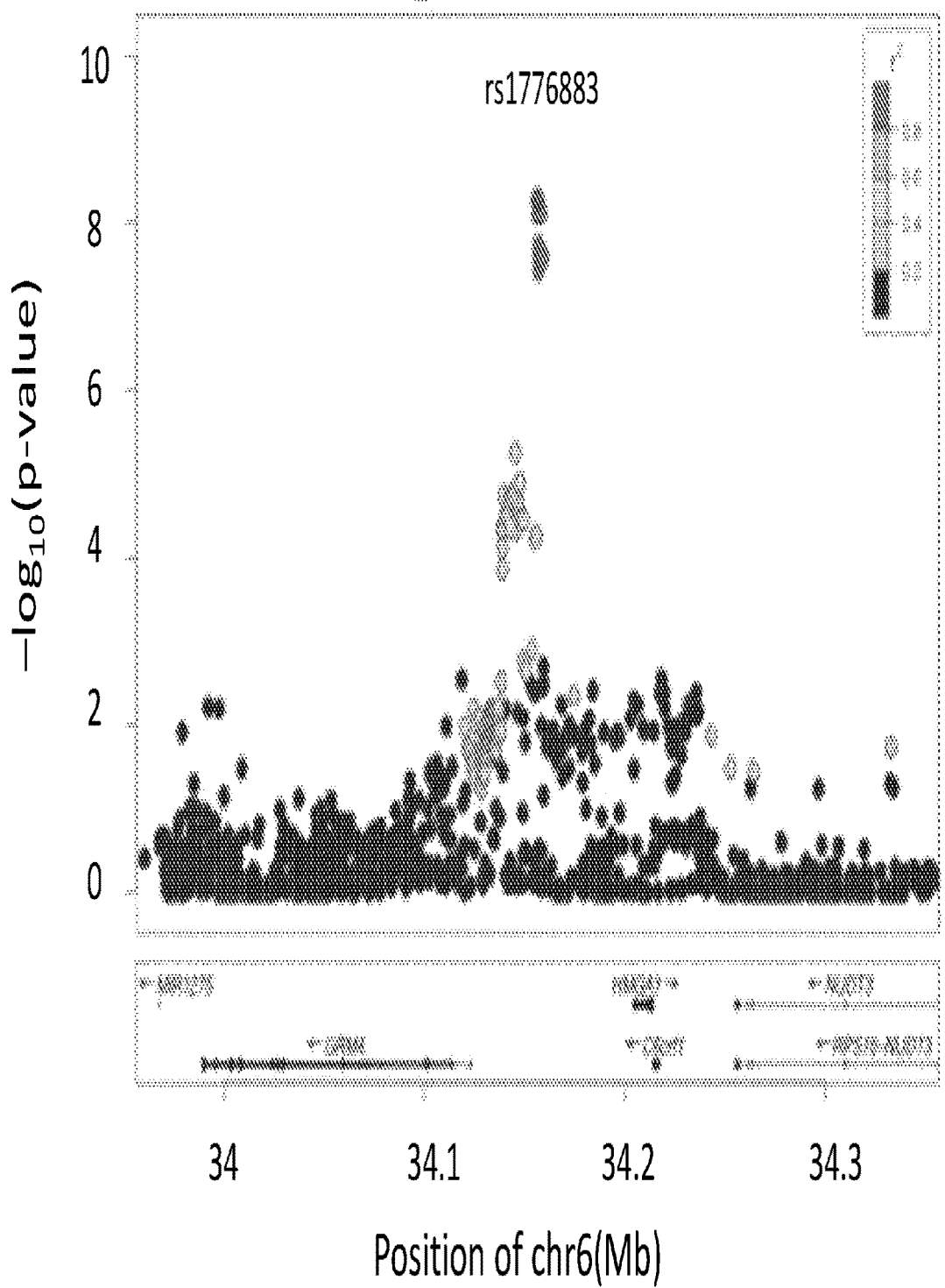
Figure 3C:
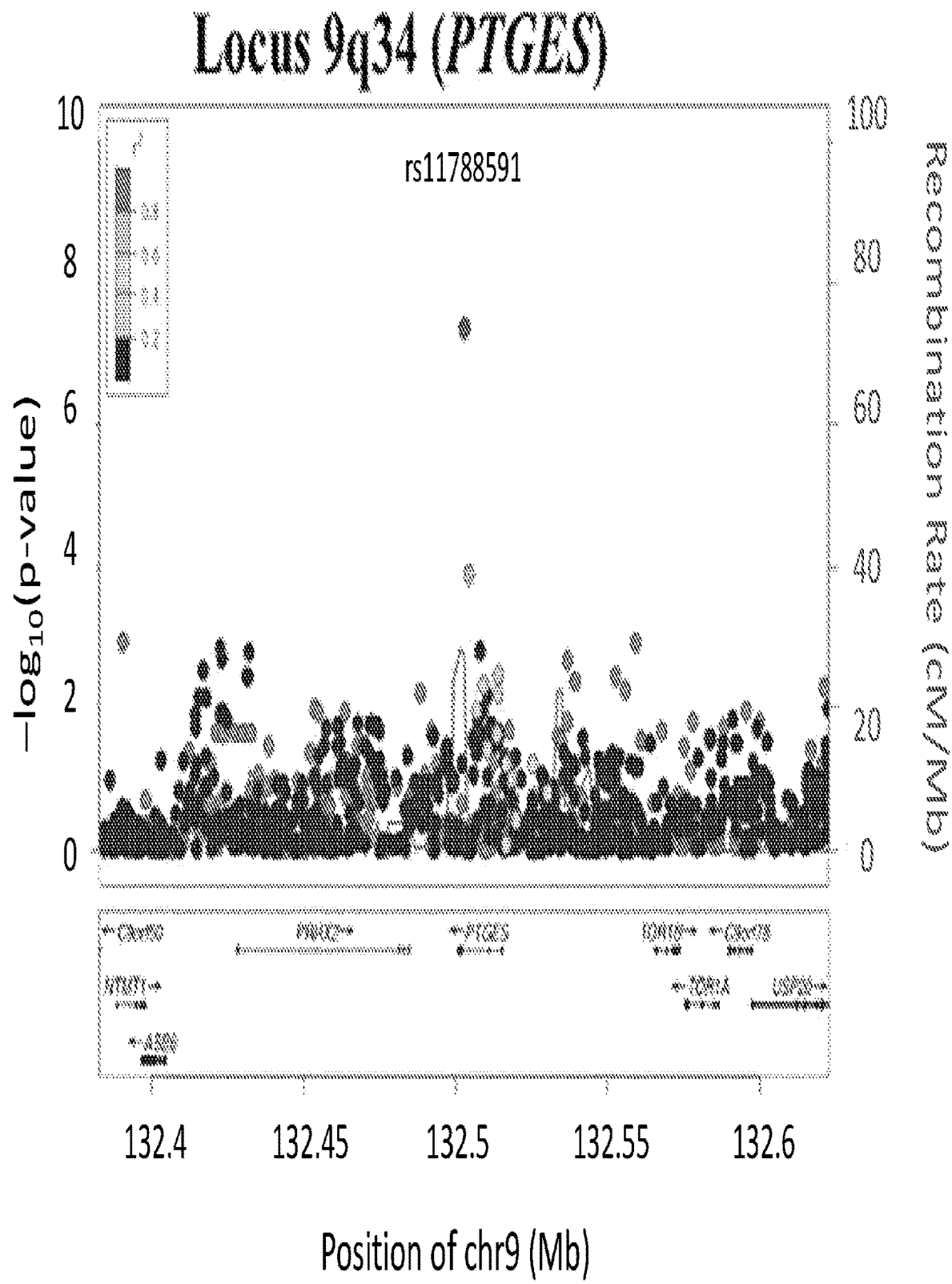
Figure 3D:
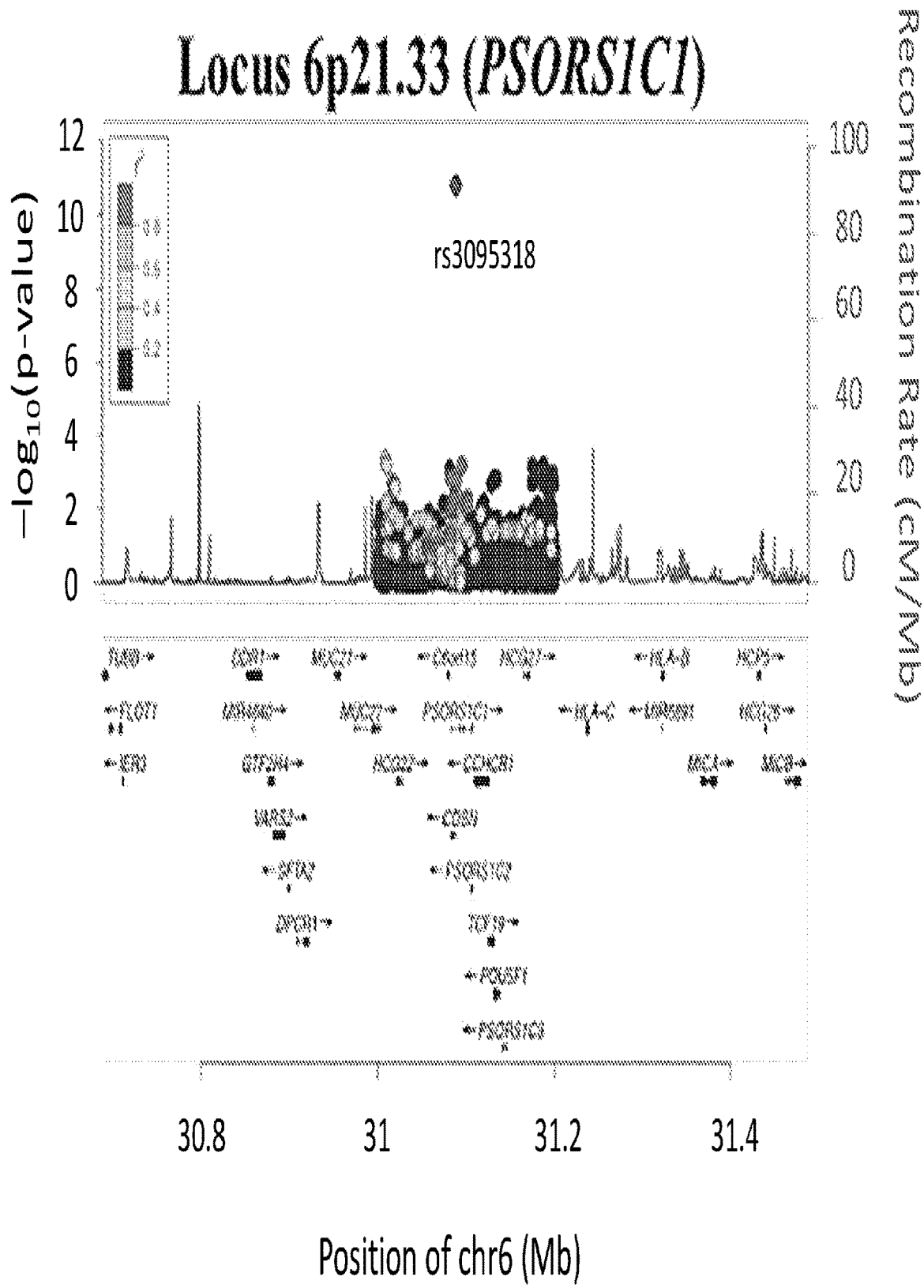
Figure 3E:
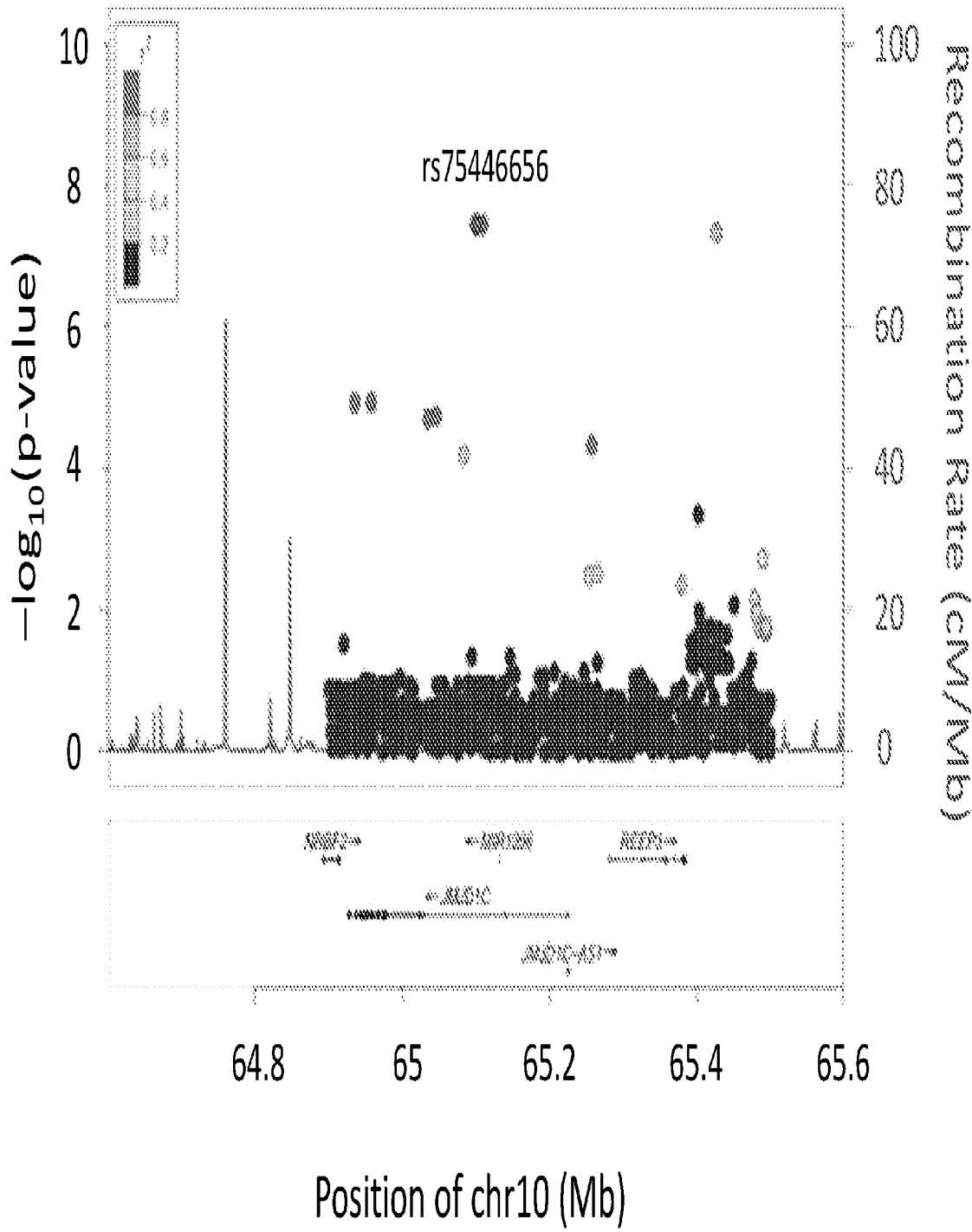

Two genome-wide significant association signals were identified in the EA-only meta-analysis, consisting on twelve SNP mapping to two separate loci, including 9p21.2 and 6p21.31 (Table 2, FIG. 1, FIG. 3, Table 9). The 9p21.2 locus, which included four low-frequency SNPs in LD spanned three genes: TEK (TEK tyrosine kinase, endothelial), EQTN (equatorin, sperm acrosome associated) and MOB3B (MOB kinase activator 3B). Notably, the significant variants are in LD with a missense variant in TEK (rs682632 (SEQ ID NO: 97); Q346P; p-value=4.38×$10^{-6}$).

Fine mapping of the region evidenced no eQTL effects in any of the tissues relevant to asthma but effects in other tissues were observed (p<0.05; Table 10).

The second significant locus in EA mapped to 6p21.31 and included eight SNPs in LD (Table 2, FIG. 3) in the intergenic region between GRM4 (glutamate receptor, metabotropic 4) and HMGA1 (high mobility group AT-hook 1), all variants with slight eQTL effects on HMGA1 in lung (lowest p-value=4.7×$10^{-3}$, Table 10).

The AA-only meta-analysis led to the identification of one genome-wide significant SNP in the intronic region of the prostaglandin E synthase gene (PTGES), on chromosome 9 (rs11788591 (SEQ ID NO: 16) p-value=4.45×$10^{-8}$; p-value_pediatric=2.22×$10^{-5}$, p-value_adult=2.05×$10^{-4}$; FIG. 1, FIG. 3, Table 9). We identified the previously reported SNP rs1837253 (SEQ ID NO: 96) in 5q22.1 reaching genome-wide significance in the meta-analysis of the combined sample (p-value=7.25×$10^{-8}$, p-value_EA=1.86×$10^{-4}$, p-value_AA=4.80×$10^{-4}$, Table 9).

Besides 5q22.1, we also aimed to assess the association of other known asthma SNPs/loci in our sample (Table 11). rs3771166 (SEQ ID NO: 113) at 2q12.1, rs2244012 (SEQ ID NO: 118) at 5q31.1, rs2381416 (SEQ ID NO: 128) at 9p24.1 and all reported SNPs at 17q12-21.1 showed nominal significance in the meta-analysis of the combined sample (p-value<5×$10^{-3}$ in all cases). Other loci such as 11q13.5 (p-value=4.73×$10^{-5}$) and CLEC16A (p-value=7.22×$10^{-4}$) also showed association with asthma in our study.

Since asthma is a disease typically occurring during childhood and the pediatric cohort constitutes a more homogeneous population in terms of genetic influence, we also ran meta-analyses in the pediatric and the adult population separately. No significant results were observed in the analysis of the pediatric sample (Table 12) however, a haplotype in the intronic region of GSDMB was among the top associations (p-value=3.44×$10^{-6}$). In the adult-only analysis, a common intronic variant in PSORS1C1 (psoriasis susceptibility 1 candidate 1) reached genome-wide significance (r53095318 (SEQ ID NO: 79); p-value=1.61×$10^{-11}$; FIG. 3; Table 13). The variant is associated with a reduced expression of PSORS ICI in lung tissue (p-value=9.4×$10^{-6}$).

Conditioning on Allergy Status Indicates rs72721168 (SEQ ID NO: 1) at 9p21.2 is a Risk Factor for Asthma in EA Independent of Allergy and Identifies Two Additional Loci To determine if the observed associations were driven by asthma specifically or more broadly associated with an allergic phenotype we reanalyzed all SNPs that reached nominal significance (p-value<5×$10^{-3}$) adjusting for allergy status in both EA (n=41,835 variants) and AA (n=67,774 variants) followed by meta-analyses in the two populations and in the combined sample.

Adjusting the analysis by allergy, the 9p21.2 locus and three low-frequency SNPs on chromosome 10 reached genome-wide significance in Europeans (Table 3, FIG. 3). The region includes the genes jumonji domain containing 1C (JMJD1C) and receptor accessory protein 3 (REEP3) at 10q21.3. All three variants are associated with decreased expression of JMJD1C in lung tissue (p-value=0.029) in the GTEx data.

In this study, we present the results from meta-analyses of asthma in individuals of European and African ancestry. We replicated the known association of 5q22.1 with asthma and we identified four novel loci at 6p21.31, 9p21.2 and 10q21.3 in EA and PTGES in AA.

The strongest association found in this study was with variants at 9p21.1 and asthma in the EA. The most plausible candidate gene in the region is TEK, which encodes the endothelial tyrosine kinase, commonly referred to as TIE2 and that plays a central role in the regulation of the development and remodeling of the vascular system (30). TIE2 has been involved in remodeling the airway wall in asthmatic patients and models of chronic asthma in mice (31), (32), evidenced by the correlation between the degree of airway obstruction and expression of TIE2 receptors in the respiratory epithelium in mice; and increased levels of TIE2 ligands, angiopoietins 1 and 2, in the sputum of asthmatic patients has been reported (31). Despite the importance of TIE2 signaling in asthma, to our knowledge this is the first report of genetic variants in TEK contributing to the susceptibility to asthma. Further, this was the only locus where the association remained genome-wide significant after adjusting for allergy status of the asthma cases, indicating that TEK contributes to the risk of asthma independent of allergy status.

The second associated locus in the EA mapped to a 20 kb LD block at 6p21.31 flanked by GRM4 and HGMA1, the latter being expressed in lung and subject to eQTL effects from the associated variants. Notably, a 280 kb LD block in 6p21.32 also showed suggestive association with asthma, independent of 6p21.31, in the EA and the combined sample. This locus includes the MHC region and has been linked to asthma and related phenotypes in populations of European (11), (14), (16), Asian (13), and Latino descent (33). Interestingly, PSORS1C1 at locus 6p21.33 was associated with asthma in adults. This gene has been previously associated with asthma in Latino population (33), or chronic obstructive pulmonary disease biomarkers (34).

Meta-analysis in AA revealed a novel association of asthma with rs11788591 (SEQ ID NO: 16), a common variant in the prostaglandin E synthase gene. Similar to TIE2, the biological role of prostaglandin E2 synthase and its product, the inflammatory mediator prostaglandin E2, in asthma and other related phenotypes has been extensively investigated (36), (37), (38), (39), (40). Stumm et al. reported a correlation between deficient prostaglandin E2 synthesis by lung fibroblasts and airway remodeling in mouse models of asthma (37). Similarly, Reeves and colleagues recently described reduced expression of prostaglandin E2 synthase by airway epithelial cells of asthmatic patients compared with controls (39). We replicated the previously reported association at TSLP on 5q22.1 across EA and AA. TSLP is a TH2 response mediator (41) and has been associated with various atopic traits including asthma in Asian populations (13), as well as AA (10), EA (10), (14) and Latinos (10). Besides TSLP, two of the most extensively replicated loci across ethnically diverse populations, 17q21-12 and 5q31.1 (16), (42), (43), (44), also showed suggestive association in the EA and AA, respectively. The association at 17q21-12 consisted on a LD bock of over 200 kb spanning from PGAP 3 to ORMDL3/GSDMB. Interestingly, the meta-analysis in the pediatric sample also yielded a signal in this locus, different from that found in EA, associated with asthma in both populations and mapping to the intronic region of GSDMB. Together these results suggest that different haplotypes may be associated with asthma in different populations, or that the algorithm used captures different subtypes of asthma depending on the population/age. These population-specific patterns of association have been previously reported by our group (17) and others (10).

We also aimed to explore whether other SNPs reported in asthma GWAS or meta-analyses replicated in our sample. Most of the well-established asthma susceptibility loci such as IL1RL1 at 2q12.1, RAD50 at 5q31.1, the HLA region, IL33 or the ORMDL3/GSDMB/GSDMA locus (17q21-12) and others like CLEC16A or locus 11q13.5, showed a trend towards significance in our study.

The replication of well-established asthma susceptibility loci along with the high PPVs obtained supports the validity of our algorithm in capturing individuals with asthma using EMR data for investigation of genetic risk factors, as also extensively demonstrated by the eMERGE network (45). Even though the use of a phenotyping algorithm may not necessarily be more accurate than a prospective study, one of the advantages of using the algorithm for the ascertainment of cases compared to the traditional cross-sectional phenotyping is the accurate and objective definition of the asthma diagnosis based on at least two ICD9 codes and the prescription of specific asthma medications with the possibility of a lengthy follow-up of each individual. However, given the nature of EMR data, there are also limitations such as the actual need of developing and validating algorithmic approaches to identify study subjects. Data in EMRs can be either structured (ICD9 codes or medications) or unstructured (notes, free text, etc.), and the latter, which may constitute up to 80% of the value in EMR data (46, 47) often requires the application of natural language processing tools to derive relevant phenotyping elements and thus dedicated expertise. Algorithm sharing is limited by the ability of participating sites to implement these practices and there will always be limits to our capacity to fully capture the richness of clinical notes.

A benefit of the use of this algorithm is the extensive information collected on secondary phenotypes such as allergy, which allowed us to investigate whether the observed associations were specific to asthma or more broadly with an allergic phenotype by adjusting for allergy status. When the analysis was adjusted by the allergic status of the cases, additional novel associations were identified. A novel locus in the intergenic region between JMJD1C and REEP3 in 10q21.3 became significant in Europeans. JMJD1C encodes a hormone dependent transcription factor, whose expression has been reported in lymphocytes and lung and has been associated with juvenile idiopathic arthritis (49). It is noteworthy that except for the significant finding of 9p21.2 in Europeans, all associations found in the non-adjusted analysis disappeared when allergy was considered. This is not surprising given that associations identified in this study were enriched with genes involved in inflammation, autoimmunity or allergic processes, such as the inflammatory gene PTGES, the HLA locus, the known atopic loci 5q22.1 and 5q31.1 (11), (12), (16), (43), (50) or the established autoimmune susceptibility gene CLEC16A, which has been linked to asthma with hay fever in adults (15).

This study further elucidates the genetic architecture of asthma in EA and AA populations with four novel asthma risk loci identified, including one associated with non-allergic asthma, and reinforces the need to study populations of diverse ethnic background to identify both shared and unique genetic predictors that contribute to the observed heterogeneity across ethnic groups. The biological relevance of the candidate genes of interest suggests provides the means to develop novel therapies to more effectively treat the underlying causes of this common disease.

Example II

Diagnostic Methods for Asthma and Screening Assays to Identify Therapeutic Agents Useful for Treatment of the Same The information herein above can be applied clinically to patients for diagnosing an increased susceptibility for developing asthma, and therapeutic intervention. A preferred embodiment of the invention comprises clinical application of the information described herein to a patient. Diagnostic compositions, including microarrays, and methods can be designed to identify the genetic alterations described herein in nucleic acids from a patient to assess susceptibility for developing asthma. This can occur after a patient arrives in the clinic; the patient has blood drawn, and using the diagnostic methods described herein, a clinician can detect the SNPs in the chromosomal regions described herein. The information obtained from the patient sample, which can optionally be amplified prior to assessment, will be used to diagnose a patient with an increased or decreased susceptibility for developing asthma. Kits for performing the diagnostic method of the invention are also provided herein. Such kits comprise a microarray comprising at least one of the SNPs provided herein in and the necessary reagents for assessing the patient samples as described above.

REFERENCES

1. Weiss K B, Sullivan S D, Lyttle C S. Trends in the cost of illness for asthma in the united states, 1985-1994. *The Journal of allergy and clinical immunology* 2000; 106: 493-499.
2. Navarro R P, Schaecher K L, Rice G K. Asthma management guidelines: Updates, advances, and new options. *Journal of managed care pharmacy: JMCP* 2007; 13: S3-11; quiz S12-13.
3. Bhan N, Kawachi I, Glymour M M, Subramanian S V. Time trends in racial and ethnic disparities in asthma prevalence in the united states from the behavioral risk factor surveillance system (brfss) study (1999-2011). *American journal of public health* 2015; 105:1269-1275.
4. Mitchell S J, Bilderback A L, Okelo S O. Racial disparities in asthma morbidity among pediatric patients seeking asthma specialist care. *Academic pediatrics* 2016; 16:64-67.
5. Akinbami L J, Moorman J E, Garbe P L, Sondik E J. Status of childhood asthma in the united states, 1980-2007. *Pediatrics* 2009; 123 Suppl 3: S131-145.
6. van Beijsterveldt C E, Boomsma D I. Genetics of parentally reported asthma, eczema and rhinitis in 5-yr-old twins. *The European respiratory journal* 2007; 29:516-521.
7. March M E, Sleiman P M, Hakonarson H. The genetics of asthma and allergic disorders. *Discovery medicine* 2011; 11:35-45.
8. March M E, Sleiman P M, Hakonarson H. Genetic polymorphisms and associated susceptibility to asthma. *International journal of general medicine* 2013; 6:253-265.
9. Moffatt M F, Gut I G, Demenais F, Strachan D P, Bouzigon E, Heath S, von Mutius E, Farrall M, Lathrop M, Cookson W O, Consortium G. A large-scale, consortium-based genomewide association study of asthma. *The New England journal of medicine* 2010; 363:1211-1221.
10. Torgerson D G, Ampleford E J, Chiu G Y, Gauderman W J, Gignoux C R, Graves P E, Himes B E, Levin A M, Mathias R A, Hancock D B, Baurley J W, Eng C, Stern D A, Celedon J C, Rafaels N, Capurso D, Conti D V, Roth L A, Soto-Quiros M, Togias A, Li X, Myers R A, Romieu I, Van Den Berg D J, Hu D, Hansel N N, Hernandez R D, Israel E, Salam M T, Galanter J, Avila P C, Avila L, Rodriquez-Santana J R, Chapela R, Rodriguez-Cintron W, Diette G B, Adkinson N F, Abel R A, Ross K D, Shi M, Faruque M U, Dunston G M, Watson H R, Mantese V J, Ezurum S C, Liang L, Ruczinski I, Ford J G, Huntsman S, Chung K F, Vora H, Li X, Calhoun W J, Castro M, Sienra-Monge J J, del Rio-Navarro B, Deichmann K A, Heinzmann A, Wenzel S E, Busse W W, Gem J E, Lemanske R F, Jr., Beaty T H, Bleecker E R, Raby B A, Meyers D A, London S J, Mexico City Childhood Asthma S, Gilliland F D, Children's Health S, study H, Burchard E G, Genetics of Asthma in Latino Americans Study SoG-E, Admixture in Latino A, Study of African Americans AG, Environments, Martinez F D, Childhood Asthma R, Education N, Weiss S T, Childhood Asthma Management P, Williams L K, Study of Asthma P, Pharmacogenomic Interactions by R-E, Barnes K C, Genetic Research on Asthma in African Diaspora S, Ober C, Nicolae DL. Meta-analysis of genome-wide association studies of asthma in ethnically diverse north american populations. *Nature genetics* 2011; 43:887-892.
11. Li X, Howard T D, Zheng S L, Haselkorn T, Peters S P, Meyers D A, Bleecker E R. Genome-wide association study of asthma identifies rad504113 and hla-dr/dq regions. *The Journal of allergy and clinical immunology* 2010; 125:328-335 e311.
12. Weidinger S, Willis-Owen S A, Kamatani Y, Baurecht H, Morar N, Liang L, Edser P, Street T, Rodriguez E, O'Regan G M, Beattie P, Folster-Holst R, Franke A, Novak N, Fahy C M, Winge M C, Kabesch M, Illig T, Heath S, Soderhall C, Melen E, Pershagen G, Kere J, Bradley M, Lieden A, Nordenskj old M, Harper J I, McLean W H, Brown S J, Cookson W O, Lathrop G M, Irvine A D, Moffatt M F. A genome-wide association study of atopic dermatitis identifies loci with overlapping effects on asthma and psoriasis. *Human molecular genetics* 2013; 22:4841-4856.
13. Hirota T, Takahashi A, Kubo M, Tsunoda T, Tomita K, Doi S, Fujita K, Miyatake A, Enomoto T, Miyagawa T, Adachi M, Tanaka H, Niimi A, Matsumoto H, Ito I, Masuko H, Sakamoto T, Hizawa N, Taniguchi M, Lima J J, Irvin C G, Peters S P, Himes B E, Litonjua A A, Tantisira K G, Weiss S T, Kamatani N, Nakamura Y, Tamari M. Genome-wide association study identifies three new susceptibility loci for adult asthma in the japanese population. *Nature genetics* 2011; 43:893-896.
14. Bonnelykke K, Matheson M C, Pers T H, Granell R, Strachan D P, Alves A C, Linneberg A, Curtin J A, Warrington N M, Standl M, Kerkhof M, Jonsdottir I, Bukvic B K, Kaakinen M, Sleimann P, Thorleifsson G, Thorsteinsdottir U, Schramm K, Baltic S, Kreiner-Moller E, Simpson A, St Pourcain B, Coin L, Hui J, Walters E H, Tiesler C M, Duffy D L, Jones G, Ring S M, McArdle W L, Price L, Robertson C F, Pekkanen J, Tang C S, Thiering E, Montgomery G W, Hartikainen A L, Dharmage S C, Husemoen L L, Herder C, Kemp J P, Elliot P, James A, Waldenberger M, Abramson M J, Fairfax B P, Knight J C, Gupta R, Thompson P J, Holt P, Sly P, Hirschhorn J N, Blekic M, Weidinger S, Hakonarsson H, Stefansson K, Heinrich J, Postma D S, Custovic A, Pennell C E, Jarvelin M R, Koppelman G H, Timpson N, Ferreira M A, Bisgaard H, Henderson A J, Australian Asthma Genetics C, Genetics E A, Lifecourse Epidemiology C. Meta-analysis of genome-wide association studies identifies ten loci influencing allergic sensitization. *Nature genetics* 2013; 45:902-906.

15. Ferreira M A, Matheson M C, Tang C S, Granell R, Ang W, Hui J, Kiefer A K, Duffy D L, Baltic S, Danoy P, Bui M, Price L, Sly P D, Eriksson N, Madden P A, Abramson M J, Holt P G, Heath A C, Hunter M, Musk B, Robertson C F, Le Souef P, Montgomery G W, Henderson A J, Tung J Y, Dharmage S C, Brown M A, James A, Thompson P J, Pennell C, Martin N G, Evans D M, Hinds D A, Hopper J L, Australian Asthma Genetics Consortium C. Genome-wide association analysis identifies 11 risk variants associated with the asthma with hay fever phenotype. *The Journal of allergy and clinical immunology* 2014; 133: 1564-1571.

16. Moffatt M F, Kabesch M, Liang L, Dixon A L, Strachan D, Heath S, Depner M, von Berg A, Bufe A, Rietschel E, Heinzmann A, Simma B, Frischer T, Willis-Owen S A, Wong K C, Illig T, Vogelberg C, Weiland S K, von Mutius E, Abecasis G R, Farrall M, Gut I G, Lathrop G M, Cookson W O. Genetic variants regulating ormd13 expression contribute to the risk of childhood asthma. *Nature* 2007; 448:470-473.

17. Sleiman P M, Annaiah K, Imielinski M, Bradfield J P, Kim C E, Frackelton E C, Glessner J T, Eckert A W, Otieno F G, Santa E, Thomas K, Smith R M, Glaberson W, Garris M, Gunnlaugsson S, Chiavacci R M, Allen J, Spergel J, Grundmeier R, Grunstein M M, Magnusson M, Bisgaard H, Grant S F, Hakonarson H. Ormd13 variants associated with asthma susceptibility in north americans of european ancestry. *The Journal of allergy and clinical immunology* 2008; 122:1225-1227.

18. Sleiman P M, Flory J, Imielinski M, Bradfield J P, Annaiah K, Willis-Owen S A, Wang K, Rafaels N M, Michel S, Bonnelykke K, Zhang H, Kim C E, Frackelton E C, Glessner J T, Hou C, Otieno F G, Santa E, Thomas K, Smith R M, Glaberson W R, Garris M, Chiavacci R M, Beaty T H, Ruczinski I, Orange J S, Allen J, Spergel J M, Grundmeier R, Mathias R A, Christie J D, von Mutius E, Cookson W O, Kabesch M, Moffatt M F, Grunstein M M, Barnes K C, Devoto M, Magnusson M, Li H, Grant S F, Bisgaard H, Hakonarson H. Variants of dennd1b associated with asthma in children. *The New England journal of medicine* 2010; 362:36-44.

19. Bonnelykke K, Sleiman P, Nielsen K, Kreiner-Moller E, Mercader J M, Belgrave D, den Dekker H T, Husby A, Sevelsted A, Faura-Tellez G, Mortensen L J, Paternoster L, Flaaten R, Molgaard A, Smart D E, Thomsen P F, Rasmussen M A, Bonas-Guarch S, Holst C, Nohr E A, Yadav R, March M E, Blicher T, Lackie P M, Jaddoe V W, Simpson A, Holloway J W, Duijts L, Custovic A, Davies D E, Torrents D, Gupta R, Hollegaard M V, Hougaard D M, Hakonarson H, Bisgaard H. A genome-wide association study identifies cdhr3 as a susceptibility locus for early childhood asthma with severe exacerbations. *Nature genetics* 2014; 46:51-55.

20. Gottesman O, Kuivaniemi H, Tromp G, Faucett W A, Li R, Manolio T A, Sanderson S C, Kannry J, Zinberg R, Basford M A, Brilliant M, Carey D J, Chisholm R L, Chute C G, Connolly J J, Crosslin D, Denny J C, Gallego C J, Haines J L, Hakonarson H, Harley J, Jarvik G P, Kohane I, Kullo I J, Larson E B, McCarty C, Ritchie M D, Roden D M, Smith M E, Bottinger E P, Williams M S, e MN. The electronic medical records and genomics (emerge) network: Past, present, and future. *Genetics in medicine: official journal of the American College of Medical Genetics* 2013; 15:761-771.

21. Pacheco J A, Avila P C, Thompson J A, Law M, Quraishi J A, Greiman A K, Just E M, Kho A. A highly specific algorithm for identifying asthma cases and controls for genome-wide association studies. ANITA Annual Symposium Proceedings: American Medical Informatics Association; 2009. p. 497.

22. Purcell S, Neale B, Todd-Brown K, Thomas L, Ferreira M A, Bender D, Maller J, Sklar P, de Bakker P I, Daly M J, Sham P C. Plink: A tool set for whole-genome association and population-based linkage analyses. *American journal of human genetics* 2007; 81:559-575.

23. Delaneau O, Marchini J, Genomes Project C, Genomes Project C. Integrating sequence and array data to create an improved 1000 genomes project haplotype reference panel. *Nature communications* 2014; 5:3934.

24. Howie B N, Donnelly P, Marchini J. A flexible and accurate genotype imputation method for the next generation of genome-wide association studies. *PLoS genetics* 2009; 5: e1000529.

25. Verma S S, de Andrade M, Tromp G, Kuivaniemi H, Pugh E, Namjou-Khales B, Mukherjee S, Jarvik G P, Kottyan L C, Burt A, Bradford Y, Armstrong G D, Derr K, Crawford D C, Haines J L, Li R, Crosslin D, Ritchie M D. Imputation and quality control steps for combining multiple genome-wide datasets. *Frontiers in genetics* 2014; 5:370.

26. Price A L, Patterson N J, Plenge R M, Weinblatt M E, Shadick N A, Reich D. Principal components analysis corrects for stratification in genome-wide association studies. *Nature genetics* 2006; 38:904-909.

27. Marchini J, Howie B. Genotype imputation for genome-wide association studies. *Nature reviews Genetics* 2010; 11:499-511.

28. Ward L D, Kellis M. Haploreg: A resource for exploring chromatin states, conservation, and regulatory motif alterations within sets of genetically linked variants. *Nucleic acids research* 2012; 40: D930-934.

29. Consortium G T. The genotype-tissue expression (gtex) project. *Nature genetics* 2013; 45:580-585.

30. Moss A. The angiopoietin:Tie 2 interaction: A potential target for future therapies in human vascular disease. *Cytokine & growth factor reviews* 2013; 24:579-592.

31. Kanazawa H, Nomura S, Asai K. Roles of angiopoietin-1 and angiopoietin-2 on airway microvascular permeability in asthmatic patients. *Chest* 2007; 131:1035-1041.

32. Makinde T O, Agrawal D K. Increased expression of angiopoietins and tie2 in the lungs of chronic asthmatic mice. *American journal of respiratory cell and molecular biology* 2011; 44:384-393.

33. Galanter J M, Gignoux C R, Torgerson D G, Roth L A, Eng C, Oh S S, Nguyen E A, Drake K A, Huntsman S, Hu D, Sen S, Davis A, Farber H J, Avila P C, Brigino-Buenaventura E, LeNoir M A, Meade K, Serebrisky D, Borrell L N, Rodriguez-Cintron W, Estrada A M, Mendoza K S, Winkler C A, Klitz W, Romieu I, London S J, Gilliland F, Martinez F, Bustamante C, Williams L K, Kumar R, Rodriguez-Santana J R, Burchard E G. Genome-wide association study and admixture mapping identify different asthma-associated loci in latinos: The genes-environments & admixture in latino americans study. *The Journal of allergy and clinical immunology* 2014; 134:295-305.

34. Kim D K, Cho M H, Hersh C P, Lomas D A, Miller B E, Kong X, Bakke P, Gulsvik A, Agusti A, Wouters E, Celli B, Coxson H, Vestbo J, MacNee W, Yates J C, Rennard S, Litonjua A, Qiu W, Beaty T H, Crapo J D, Riley J H, Tal-Singer R, Silverman E K, Eclipse I, Investigators CO. Genome-wide association analysis of blood biomarkers in chronic obstructive pulmonary disease. *American journal of respiratory and critical care medicine* 2012; 186:1238-1247.
35. Jostins L, Ripke S, Weersma R K, Duerr R H, McGovern D P, Hui K Y, Lee J C, Schumm L P, Sharma Y, Anderson C A, Essers J, Mitrovic M, Ning K, Cleynen I, Theatre E, Spain S L, Raychaudhuri S, Goyette P, Wei Z, Abraham C, Achkar J P, Ahmad T, Amininej ad L, Ananthakrishnan A N, Andersen V, Andrews J M, Baidoo L, Balschun T, Bampton P A, Bitton A, Boucher G, Brand S, Buning C, Cohain A, Cichon S, D'Amato M, De Jong D, Devaney K L, Dubinsky M, Edwards C, Ellinghaus D, Ferguson L R, Franchimont D, Fransen K, Gearry R, Georges M, Gieger C, Glas J, Haritunians T, Hart A, Hawkey C, Hedl M, Hu X, Karlsen T H, Kupcinskas L, Kugathasan S, Latiano A, Laukens D, Lawrance I C, Lees C W, Louis E, Mahy G, Mansfield J, Morgan A R, Mowat C, Newman W, Palmieri O, Ponsioen C Y, Potocnik U, Prescott N J, Regueiro M, Rotter J I, Russell R K, Sanderson J D, Sans M, Satsangi J, Schreiber S, Simms L A, Sventoraityte J, Targan S R, Taylor K D, Tremelling M, Verspaget H W, De Vos M, Wijmenga C, Wilson D C, Winkelmann J, Xavier R J, Zeissig S, Zhang B, Zhang C K, Zhao H, International IBDGC, Silverberg M S, Annese V, Hakonarson H, Brant S R, Radford-Smith G, Mathew C G, Rioux J D, Schadt E E, Daly M J, Franke A, Parkes M, Vermeire S, Barrett J C, Cho J H. Host-microbe interactions have shaped the genetic architecture of inflammatory bowel disease. *Nature* 2012; 491:119-124.
36. Gauvreau G M, Watson R M, O'Byrne P M. Protective effects of inhaled pge2 on allergen-induced airway responses and airway inflammation. *American journal of respiratory and critical care medicine* 1999; 159:31-36.
37. Stumm C L, Wettlaufer S H, Jancar S, Peters-Golden M. Airway remodeling in murine asthma correlates with a defect in pge2 synthesis by lung fibroblasts. *American journal of physiology Lung cellular and molecular physiology* 2011; 301: L636-644.
38. Liu T, Laidlaw T M, Feng C, Xing W, Shen S, Milne G L, Boyce J A. Prostaglandin e2 deficiency uncovers a dominant role for thromboxane a2 in house dust mite-induced allergic pulmonary inflammation. *Proceedings of the National Academy of Sciences of the United States of America* 2012; 109:12692-12697.
39. Reeves S R, Kolstad T, Lien T Y, Elliott M, Ziegler S F, Wight T N, Debley J S. Asthmatic airway epithelial cells differentially regulate fibroblast expression of extracellular matrix components. *The Journal of allergy and clinical immunology* 2014; 134:663-670 e661.
40. Safholm J, Manson M L, Bood J, Delin I, Orre A C, Bergman P, Al-Ameri M, Dahlen S E, Adner M. Prostaglandin e inhibits mast cell-dependent bronchoconstriction in human small airways through the e prostanoid subtype 2 receptor. *The Journal of allergy and clinical immunology* 2015.
41. Ziegler S F, Artis D. Sensing the outside world: Tslp regulates barrier immunity. *Nature immunology* 2010; 11:289-293.
42. Madore A M, Tremblay K, Hudson T J, Laprise C. Replication of an association between 17q21 snps and asthma in a french-canadian familial collection. *Human genetics* 2008; 123:93-95.
43. Galanter J, Choudhry S, Eng C, Nazario S, Rodriguez-Santana J R, Casal J, Torres-Palacios A, Salas J, Chapela R, Watson H G, Meade K, LeNoir M, Rodriguez-Cintron W, Avila P C, Burchard E G. Ormdl3 gene is associated with asthma in three ethnically diverse populations. *American journal of respiratory and critical care medicine* 2008; 177:1194-1200.
44. Leung T F, Sy H Y, Ng M C, Chan I H, Wong G W, Tang N L, Waye M M, Lam C W. Asthma and atopy are associated with chromosome 17q21 markers in chinese children. *Allergy* 2009; 64:621-628.
45. Newton K M, Peissig P L, Kho A N, Bielinski S J, Berg R L, Choudhary V, Basford M, Chute C G, Kullo U, Li R, Pacheco J A, Rasmussen L V, Spangler L, Denny J C. Validation of electronic medical record-based phenotyping algorithms: Results and lessons learned from the emerge network. *Journal of the American Medical Informatics Association: JAMIA* 2013; 20: e147-154.
46. Voorham J, Denig P. Computerized extraction of information on the quality of diabetes care from free text in electronic patient records of general practitioners. *Journal of the American Medical Informatics Association: JAMIA* 2007; 14:349-354.
47. Murdoch T B, Detsky A S. The inevitable application of big data to health care. *Jama* 2013; 309:1351-1352.
48. Wilke R A, Xu H, Denny J C, Roden D M, Krauss R M, McCarty C A, Davis R L, Skaar T, Lamba J, Savova G. The emerging role of electronic medical records in pharmacogenomics. *Clinical pharmacology and therapeutics* 2011; 89:379-386.
49. Thompson S D, Marion M C, Sudman M, Ryan M, Tsoras M, Howard T D, Barnes M G, Ramos P S, Thomson W, Hinks A, Haas J P, Prahalad S, Bohnsack J F, Wise C A, Punaro M, Rose C D, Pajewski N M, Spigarelli M, Keddache M, Wagner M, Langefeld C D, Glass D N. Genome-wide association analysis of juvenile idiopathic arthritis identifies a new susceptibility locus at chromosomal region 3q13. *Arthritis and rheumatism* 2012; 64:2781-2791.
50. Bisgaard H, Bonnelykke K, Sleiman P M, Brasholt M, Chawes B, Kreiner-Moller E, Stage M, Kim C, Tavendale R, Baty F, Pipper C B, Palmer C N, Hakonarsson H. Chromosome 17q21 gene variants are associated with asthma and exacerbations but not atopy in early childhood. *American journal of respiratory and critical care medicine* 2009; 179:179-185.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. A method for identifying a human subject of European descent having a predisposition for asthma, comprising,
   a) identifying a risk allele indicative of a predisposition for asthma present in a single nucleotide polymorphism (SNP) containing nucleic acid isolated from biological sample obtained from said subject, selected from:
   an A allele at rs72721168 in SEQ ID NO: 1;
   a T allele at rs72721166 in SEQ ID NO: 2;
   an A allele at rs72721164 in SEQ ID NO: 3;
   a C allele at rs72721158 in SEQ ID NO: 4;
   a T allele at rs35632171 in SEQ ID NO: 14;
   an A allele at rs36080042 in SEQ ID NO: 15; and
   an A allele at rs75446656 in SEQ ID NO: 162 in the subject of European descent; and
   b) administering at least one agent useful to treat asthma to the subject, wherein said agent is selected from one or more of a PGE synthetic agonist, an oral steroid, an anti-IgE, a β1 agonist, a β2 agonist, a mast cell stabilizer, a leukotriene antagonist, Ipratropium bromide, and a phosphodiesterase inhibitor.

2. The method of claim 1, wherein said agent is selected from Epoprostenol, Iloprost, Treprostinil, Methylprednisolone, Prednisone, Prednisolone, Triamcinolone, Omalizumab, Beclomethasone, Budesonide, Ciclesonide, Flunisolide, Fluticasone, Fluticasone propionate HFA, Fluticasone Propionate inhaled, Mometasone, Triamcinolone Acetonide, Triamcinolone, Dobutamine, Epinephrine, Racepinephrine Isoproterenol β1, Isoproterenol β2, Methylxanthine, Theophylline, Arformoterol, Albuterol, Albuterol Sulfate, Clenbuterol, Fenoterol, Formoterol, Isoetarine, Levalbuterol, Levalbuterol HCL, Levalbuterol Tartrate, Metaproterenol, Pirbuterol, Procaterol, Ritodrine, Salmeterol, Terbutaline, Cromolyn, Cromolyn Sodium, Nedocromi, Montelukast, Zafirlukast, Zileuton, Ipratropium Bromide, and Ibudilast.

3. The method of claim 1, wherein a combination of drugs is administered, said combination selected from
   i) a PGE-agonist and a leukotriene inhibitor;
   ii) a PGE-agonist and low dose inhaled steroid;
   iii) a PGE-agonist and a beta adrenergic agonist;
   iv) a PGE-agonist and a phosphodiesterase inhibitor;
   v) a PGE-agonist and an anti-IgE antibody;
   vi) a PGE-agonist and anticholinergic agent; and
   vii) a PGE-agonist and a mast cell stabilizer.

4. The method of claim 3, wherein combinations i-vi further comprise a mast cell stabilizer.

5. The method of claim 3, wherein said PGE-agonist is selected from epoprostenol, iloprost and treprostinil, said leukotriene inhibitor is montelukast; said inhaled steroid is fluticasone; said phospdiesterase inhibitor is theophylline, said anti-IgE antibody is omalizumab, said anticholinergic agent is ipratropium bromide, and said mast cell stabilizer is chromolyn.

6. The method of claim 1, wherein the risk allele is identified by contacting the nucleic acid sample with a collection of probes or primers of sufficient length and composition to detect said asthma-associated SNP, wherein said probes or primers hybridize to, or amplify SEQ ID NO: 1-4, 14, 15, and 162.

7. The method of claim 1, wherein the step of identifying said risk allele in said SNP containing nucleic acid is performed using a process selected from detection of specific hybridization, measurement of allele size, restriction fragment length polymorphism analysis, allele-specific hybridization analysis, single base primer extension reaction, and sequencing of an amplified polynucleotide.

8. The method of claim 1, wherein the nucleic acid in the sample is DNA or RNA.

9. The method of claim 1, wherein the nucleic acid sample is from blood, urine, serum, gastric lavage, cerebral spinal fluid, brain cells, mononuclear cells, fetal cells in maternal circulation, or body tissue.

10. The method of claim 1, wherein the SNP containing nucleic acids are selected from:
a T allele at rs72721166 in SEQ ID NO: 2;
an A allele at rs72721164 in SEQ ID NO: 3;
a C allele at rs72721158 in SEQ ID NO: 4;
an A allele at rs36080042 in SEQ ID NO: 15; and
an A allele at rs75446656 in SEQ ID NO: 162.

* * * * *

SEQUENCE LISTING

<160> NUMBER OF SEQ ID NOS: 162

<210> SEQ ID NO 1
<211> LENGTH: 51
<212> TYPE: DNA

-continued

```
<213> ORGANISM: Homo sapiens

<400> SEQUENCE: 1
cttaacaaat tttgctacca acaacmgttg tgtcccaggt acccctcatt t         51

<210> SEQ ID NO 2
<211> LENGTH: 51
<212> TYPE: DNA
<213> ORGANISM: Homo sapiens

<400> SEQUENCE: 2
attaaaagag ggagtctgcg tttcakgaca atctttctat gaaaggtaga g         51

<210> SEQ ID NO 3
<211> LENGTH: 51
<212> TYPE: DNA
<213> ORGANISM: Homo sapiens

<400> SEQUENCE: 3
aaattgactt taggccaggt gtggtrgttt gtgcctataa tctcagcact t         51

<210> SEQ ID NO 4
<211> LENGTH: 51
<212> TYPE: DNA
<213> ORGANISM: Homo sapiens

<400> SEQUENCE: 4
tatttcaggt agttatactc tgtaastcac cacaaactca gatttagtga a         51

<210> SEQ ID NO 5
<211> LENGTH: 51
<212> TYPE: DNA
<213> ORGANISM: Homo sapiens

<400> SEQUENCE: 5
aggactacag gtgtgcactg tcatgyccag ctaatttttt taattttttg t         51

<210> SEQ ID NO 6
<211> LENGTH: 51
<212> TYPE: DNA
<213> ORGANISM: Homo sapiens

<400> SEQUENCE: 6
catccaggcc caatatgaca agctgkctca gaagaatcga gagaagctga a         51

<210> SEQ ID NO 7
<211> LENGTH: 51
<212> TYPE: DNA
<213> ORGANISM: Homo sapiens

<400> SEQUENCE: 7
gttgttgtta caaggtcttg ctctgytgcc caggctggag tgcagggcca c         51

<210> SEQ ID NO 8
<211> LENGTH: 51
<212> TYPE: DNA
<213> ORGANISM: Homo sapiens
<220> FEATURE:
<221> NAME/KEY: misc_difference
<222> LOCATION: (26)..(26)
<223> OTHER INFORMATION: a or deletion
<220> FEATURE:
<221> NAME/KEY: misc_difference
<222> LOCATION: (26)..(26)
<223> OTHER INFORMATION: a or -
```

<400> SEQUENCE: 8
actgctcttc atgaagaaga ataacaatga ggaagttaaa ggccaacaag c        51

<210> SEQ ID NO 9
<211> LENGTH: 51
<212> TYPE: DNA
<213> ORGANISM: Homo sapiens

<400> SEQUENCE: 9
gagcttgcag tgagccaaga tcatgmcact gcactccagc ctgggcgaca g        51

<210> SEQ ID NO 10
<211> LENGTH: 51
<212> TYPE: DNA
<213> ORGANISM: Homo sapiens

<400> SEQUENCE: 10
gaccatcctg gctaacatgg taaaayttcg tctctattaa aaatacaaaa a        51

<210> SEQ ID NO 11
<211> LENGTH: 51
<212> TYPE: DNA
<213> ORGANISM: Homo sapiens

<400> SEQUENCE: 11
ctccagcctg ggtgacagaa caagakccta tctctaaaaa ataaaaata a         51

<210> SEQ ID NO 12
<211> LENGTH: 51
<212> TYPE: DNA
<213> ORGANISM: Homo sapiens

<400> SEQUENCE: 12
gagatcgaga ccatcctggc taacayggta aaacttcgtc tctattaaaa a        51

<210> SEQ ID NO 13
<211> LENGTH: 51
<212> TYPE: DNA
<213> ORGANISM: Homo sapiens

<400> SEQUENCE: 13
ctgagggaaa aaaagaccct ctcagmcccc tttagctgca atatatcttt t        51

<210> SEQ ID NO 14
<211> LENGTH: 51
<212> TYPE: DNA
<213> ORGANISM: Homo sapiens

<400> SEQUENCE: 14
tgggggaaaa gtatgaataa aagaakggac atgtaaaaac acctagtatt t        51

<210> SEQ ID NO 15
<211> LENGTH: 51
<212> TYPE: DNA
<213> ORGANISM: Homo sapiens

<400> SEQUENCE: 15
attttctact tttttatttt aatggrgttc ccaaaacaag ggacaaaggc a        51

<210> SEQ ID NO 16
<211> LENGTH: 51
<212> TYPE: DNA

```
<213> ORGANISM: Homo sapiens

<400> SEQUENCE: 16
ccgctcccac tcactggagc caaccratgg ccagccccg gtgaagctct t          51

<210> SEQ ID NO 17
<211> LENGTH: 51
<212> TYPE: DNA
<213> ORGANISM: Homo sapiens
<220> FEATURE:
<221> NAME/KEY: misc_difference
<222> LOCATION: (26)..(26)
<223> OTHER INFORMATION: a or accacc

<400> SEQUENCE: 17
cctccaaccg gcaggtgttg acagcaccac ccgggcccag gggagccagt g          51

<210> SEQ ID NO 18
<211> LENGTH: 51
<212> TYPE: DNA
<213> ORGANISM: Homo sapiens

<400> SEQUENCE: 18
gagggctttc ctgggcccaa gctatrttac attttccatt ctcatcaggc c          51

<210> SEQ ID NO 19
<211> LENGTH: 51
<212> TYPE: DNA
<213> ORGANISM: Homo sapiens

<400> SEQUENCE: 19
ccgcctcccg agttcaagtg attctyctgc ctcagcctcc caagtagctg g          51

<210> SEQ ID NO 20

<400> SEQUENCE: 20

000

<210> SEQ ID NO 21
<211> LENGTH: 51
<212> TYPE: DNA
<213> ORGANISM: Homo sapiens

<400> SEQUENCE: 21
tgtataaaat atacaaaaag ctagcygggt atggtggcat gcaactgtag t          51

<210> SEQ ID NO 22
<211> LENGTH: 51
<212> TYPE: DNA
<213> ORGANISM: Homo sapiens

<400> SEQUENCE: 22
tcaatgtccc cactcccctc ccttcmctct tgatttcttt ttgatttcct g          51

<210> SEQ ID NO 23
<211> LENGTH: 51
<212> TYPE: DNA
<213> ORGANISM: Homo sapiens

<400> SEQUENCE: 23
tggccgcacg cactcagcag accctractc tgctcagatc tttccttcct t          51

<210> SEQ ID NO 24
```

<400> SEQUENCE: 24

000

<210> SEQ ID NO 25
<211> LENGTH: 51
<212> TYPE: DNA
<213> ORGANISM: Homo sapiens

<400> SEQUENCE: 25
tataagagag atgatacacc atggcyagac tggacgtggt ggctcatgcc t            51

<210> SEQ ID NO 26
<211> LENGTH: 51
<212> TYPE: DNA
<213> ORGANISM: Homo sapiens

<400> SEQUENCE: 26
atttctcccc aaagcacaga ctaaasggca ggaagcacgt ccaaccactt c            51

<210> SEQ ID NO 27
<211> LENGTH: 51
<212> TYPE: DNA
<213> ORGANISM: Homo sapiens

<400> SEQUENCE: 27
ggtcttggcc tgtttctctg tgcttytctg gatggcatct tcctccctgt a            51

<210> SEQ ID NO 28
<211> LENGTH: 51
<212> TYPE: DNA
<213> ORGANISM: Homo sapiens

<400> SEQUENCE: 28
gcctccaagg caggattgga gcaatyaaca tacagaacta gagaactcta g            51

<210> SEQ ID NO 29
<211> LENGTH: 51
<212> TYPE: DNA
<213> ORGANISM: Homo sapiens

<400> SEQUENCE: 29
tccatccttg ttggacctgc tgcttstccc cagccctgaa ctgataaagc c            51

<210> SEQ ID NO 30
<211> LENGTH: 51
<212> TYPE: DNA
<213> ORGANISM: Homo sapiens

<400> SEQUENCE: 30
gagggctttc ctgggcccaa gctatrttac attttccatt ctcatcaggc c            51

<210> SEQ ID NO 31
<211> LENGTH: 51
<212> TYPE: DNA
<213> ORGANISM: Homo sapiens

<400> SEQUENCE: 31
ggataactgc ttgaacccgg gaggcrgaag ttgtagtgag ccagagatca g            51

<210> SEQ ID NO 32
<211> LENGTH: 51
<212> TYPE: DNA

```
<213> ORGANISM: Homo sapiens

<400> SEQUENCE: 32
aggagagtga ggaagactaa gcactrcctg tctccgttgc ccgccacccc c          51

<210> SEQ ID NO 33
<211> LENGTH: 51
<212> TYPE: DNA
<213> ORGANISM: Homo sapiens
<220> FEATURE:
<221> NAME/KEY: misc_difference
<222> LOCATION: (26)..(26)
<223> OTHER INFORMATION: a or aac

<400> SEQUENCE: 33
ctgcaaagca aagcaaacaa ccaaaaatga aaaggcaaca cacagaaaga a          51

<210> SEQ ID NO 34
<211> LENGTH: 51
<212> TYPE: DNA
<213> ORGANISM: Homo sapiens

<400> SEQUENCE: 34
ggcagggcct gtgcctgctc tgagaygtgt cccataagcc tatctctatt t          51

<210> SEQ ID NO 35
<211> LENGTH: 51
<212> TYPE: DNA
<213> ORGANISM: Homo sapiens

<400> SEQUENCE: 35
caaggccaga acctgaagtg gtctargagg catcattttt cctttacagt g          51

<210> SEQ ID NO 36
<211> LENGTH: 51
<212> TYPE: DNA
<213> ORGANISM: Homo sapiens

<400> SEQUENCE: 36
ccctggacga atttaggagc aggagsggga ggtggttatg gggacagcaa g          51

<210> SEQ ID NO 37
<211> LENGTH: 51
<212> TYPE: DNA
<213> ORGANISM: Homo sapiens

<400> SEQUENCE: 37
cctgtttgcc aagcctcttt tcaggkctcc agagcagctg tggagagaga g          51

<210> SEQ ID NO 38
<211> LENGTH: 51
<212> TYPE: DNA
<213> ORGANISM: Homo sapiens

<400> SEQUENCE: 38
agccttccac tatttggaga aagtcytgcc ttatgagctc atctgaaaac g          51

<210> SEQ ID NO 39
<211> LENGTH: 51
<212> TYPE: DNA
<213> ORGANISM: Homo sapiens

<400> SEQUENCE: 39
tcactcatga agtcactgag atcatsaacc caccaaaaag aagaaactct g          51
```

<210> SEQ ID NO 40
<211> LENGTH: 51
<212> TYPE: DNA
<213> ORGANISM: Homo sapiens

<400> SEQUENCE: 40
tgtagatagg gataagccaa aatgcrataa gaaaaaccat ccagaggaaa c          51

<210> SEQ ID NO 41
<211> LENGTH: 51
<212> TYPE: DNA
<213> ORGANISM: Homo sapiens

<400> SEQUENCE: 41
ttactgagga gtttctcagt gctctrtctg catcatctgc tcgctctctc c          51

<210> SEQ ID NO 42
<211> LENGTH: 51
<212> TYPE: DNA
<213> ORGANISM: Homo sapiens

<400> SEQUENCE: 42
cagcatgaga aagaccttcc cccatsattc aattacctcc atctgggtcc c          51

<210> SEQ ID NO 43
<211> LENGTH: 51
<212> TYPE: DNA
<213> ORGANISM: Homo sapiens
<220> FEATURE:
<221> NAME/KEY: misc_difference
<222> LOCATION: (26)..(26)
<223> OTHER INFORMATION: t or tgtaa

<400> SEQUENCE: 43
agtcagagaa tttaactctc aaagctgtaa gtaagagcag gatttgaacc a          51

<210> SEQ ID NO 44
<211> LENGTH: 51
<212> TYPE: DNA
<213> ORGANISM: Homo sapiens

<400> SEQUENCE: 44
gggaaacctt ttctcctctg gggttsagtg aagaccttcc tagtggagga a          51

<210> SEQ ID NO 45
<211> LENGTH: 51
<212> TYPE: DNA
<213> ORGANISM: Homo sapiens

<400> SEQUENCE: 45
agagggctcg catgcttgat ctgccygatc acgggaacta tcacaagaca t          51

<210> SEQ ID NO 46
<211> LENGTH: 51
<212> TYPE: DNA
<213> ORGANISM: Homo sapiens

<400> SEQUENCE: 46
ctaggctggt tataatgaaa ttgatsttgt tgggggcaca cacattaaac c          51

<210> SEQ ID NO 47
<211> LENGTH: 51
<212> TYPE: DNA

<213> ORGANISM: Homo sapiens

<400> SEQUENCE: 47
aatcttattg gctcagccta agtcargtgt ctatccctgg gtcaatcaac c        51

<210> SEQ ID NO 48
<211> LENGTH: 51
<212> TYPE: DNA
<213> ORGANISM: Homo sapiens

<400> SEQUENCE: 48
tgagaatgca tatgtatccc cttggmatgc ccagtttgaa ggccctgaga g        51

<210> SEQ ID NO 49
<211> LENGTH: 51
<212> TYPE: DNA
<213> ORGANISM: Homo sapiens

<400> SEQUENCE: 49
attatacaaa acagtcttgt agcacytcct caactctagc aatgcactct g        51

<210> SEQ ID NO 50
<211> LENGTH: 51
<212> TYPE: DNA
<213> ORGANISM: Homo sapiens

<400> SEQUENCE: 50
atttagaaag gcaagacacg tgctcraagt ctgtttggtt gcttgacaga g        51

<210> SEQ ID NO 51
<211> LENGTH: 51
<212> TYPE: DNA
<213> ORGANISM: Homo sapiens

<400> SEQUENCE: 51
cagcctgggt gacagggtaa gacccygtct caaaaaaaaa aaaagtaaaa a        51

<210> SEQ ID NO 52
<211> LENGTH: 51
<212> TYPE: DNA
<213> ORGANISM: Homo sapiens

<400> SEQUENCE: 52
gttcccctcc ctgtgtccaa gtgatytcat tgttcaattc ccacctatga g        51

<210> SEQ ID NO 53
<211> LENGTH: 51
<212> TYPE: DNA
<213> ORGANISM: Homo sapiens

<400> SEQUENCE: 53
gatttcttct cttttcttgg ttaatmttgt gaatggtcta tccattttat c        51

<210> SEQ ID NO 54
<211> LENGTH: 51
<212> TYPE: DNA
<213> ORGANISM: Homo sapiens

<400> SEQUENCE: 54
gaagaagaaa aaacagatga gtgtgwtgtc ttggcagcca agtaaattca a        51

<210> SEQ ID NO 55
<211> LENGTH: 51

```
<212> TYPE: DNA
<213> ORGANISM: Homo sapiens

<400> SEQUENCE: 55
cgccaccatg cccggctaat tttttrtatt tttaatagag acggggtttc g            51

<210> SEQ ID NO 56
<211> LENGTH: 51
<212> TYPE: DNA
<213> ORGANISM: Homo sapiens

<400> SEQUENCE: 56
ccatctactt ccctgaagat agtgtrgctt catgcaccgg tcctcaacaa c            51

<210> SEQ ID NO 57
<211> LENGTH: 51
<212> TYPE: DNA
<213> ORGANISM: Homo sapiens

<400> SEQUENCE: 57
taaaatacaa gatagttata gaacastaag cagatttaac caaagaggc a            51

<210> SEQ ID NO 58
<211> LENGTH: 51
<212> TYPE: DNA
<213> ORGANISM: Homo sapiens

<400> SEQUENCE: 58
ctcggcccgg ggaccacagc ctggcvtgtc acacgtggga cctcaggagg c            51

<210> SEQ ID NO 59
<211> LENGTH: 51
<212> TYPE: DNA
<213> ORGANISM: Homo sapiens

<400> SEQUENCE: 59
tttgcaaaac tagttttgtt tgattrttct gttttttta gtgcccgtc t              51

<210> SEQ ID NO 60
<211> LENGTH: 51
<212> TYPE: DNA
<213> ORGANISM: Homo sapiens

<400> SEQUENCE: 60
agctgctgtt ggccctatct ggaacraggc agtccagggc aaactttggc a            51

<210> SEQ ID NO 61
<211> LENGTH: 51
<212> TYPE: DNA
<213> ORGANISM: Homo sapiens

<400> SEQUENCE: 61
gcactccagc atgggcgaca ggagcragac tccgtctcaa aaaaaaaaa a             51

<210> SEQ ID NO 62
<211> LENGTH: 51
<212> TYPE: DNA
<213> ORGANISM: Homo sapiens

<400> SEQUENCE: 62
tttttttttt tttttttttt agctcrtctt gcacatttac ccttccagat g            51

<210> SEQ ID NO 63
```

```
<211> LENGTH: 51
<212> TYPE: DNA
<213> ORGANISM: Homo sapiens

<400> SEQUENCE: 63
agttgtattt ttttatcag gactcyttaa tctcatttta atttcctttg a          51

<210> SEQ ID NO 64
<211> LENGTH: 51
<212> TYPE: DNA
<213> ORGANISM: Homo sapiens

<400> SEQUENCE: 64
ggcttccatt ccttctgcat tggaartcaa atgggaacgg atagggtc c           51

<210> SEQ ID NO 65
<211> LENGTH: 51
<212> TYPE: DNA
<213> ORGANISM: Homo sapiens

<400> SEQUENCE: 65
ggcagggcct gtgcctgctc tgagaygtgt cccataagcc tatctctatt t         51

<210> SEQ ID NO 66
<211> LENGTH: 51
<212> TYPE: DNA
<213> ORGANISM: Homo sapiens

<400> SEQUENCE: 66
aggtctagtg caggaggtat agtttrgtgg aaacttttgc ctgaagttct c         51

<210> SEQ ID NO 67
<211> LENGTH: 51
<212> TYPE: DNA
<213> ORGANISM: Homo sapiens

<400> SEQUENCE: 67
gcctccaagg caggattgga gcaatyaaca tacagaacta gagaactcta g         51

<210> SEQ ID NO 68
<211> LENGTH: 51
<212> TYPE: DNA
<213> ORGANISM: Homo sapiens

<400> SEQUENCE: 68
ctgtggtccc agcactttgg gaagcygagg cgggcggatc acttgaggtc g         51

<210> SEQ ID NO 69
<211> LENGTH: 51
<212> TYPE: DNA
<213> ORGANISM: Homo sapiens

<400> SEQUENCE: 69
ctgtggtccc agcactttgg gaagcygagg cgggcggatc acttgaggtc g         51

<210> SEQ ID NO 70
<211> LENGTH: 51
<212> TYPE: DNA
<213> ORGANISM: Homo sapiens

<400> SEQUENCE: 70
tgtgctcact gcagttgact aggatscatg tgaaatgatt tttaaaaggc a         51
```

<210> SEQ ID NO 71
<211> LENGTH: 51
<212> TYPE: DNA
<213> ORGANISM: Homo sapiens

<400> SEQUENCE: 71
agagagatcc tgtgtgtaca aaaaawtttt aaattagctg gcatggtgg t                51

<210> SEQ ID NO 72
<211> LENGTH: 51
<212> TYPE: DNA
<213> ORGANISM: Homo sapiens

<400> SEQUENCE: 72
caccattgtc caccagctgt gccagygggg ttggaaatga ccatttcaaa c               51

<210> SEQ ID NO 73
<211> LENGTH: 51
<212> TYPE: DNA
<213> ORGANISM: Homo sapiens

<400> SEQUENCE: 73
acccacttac ctgttacccc atatawtgcc cacagaaata tgccatgtga a               51

<210> SEQ ID NO 74
<211> LENGTH: 51
<212> TYPE: DNA
<213> ORGANISM: Homo sapiens

<400> SEQUENCE: 74
aaaagacgcc cttgcaatgc agggcycaga gtgtctattt gcaatatatc a               51

<210> SEQ ID NO 75
<211> LENGTH: 51
<212> TYPE: DNA
<213> ORGANISM: Homo sapiens

<400> SEQUENCE: 75
acttgatgat aaaaagatga atacgrctca gtccctgacc tcaagcattc a               51

<210> SEQ ID NO 76
<211> LENGTH: 51
<212> TYPE: DNA
<213> ORGANISM: Homo sapiens

<400> SEQUENCE: 76
ttgccaaagg agccgcccag gggatrtttt tctgaggaat tcccgctcca g               51

<210> SEQ ID NO 77
<211> LENGTH: 51
<212> TYPE: DNA
<213> ORGANISM: Homo sapiens

<400> SEQUENCE: 77
gaaaacttcc tcctaatcta ggtcaktgtc atttatgtct gttctacttc t               51

<210> SEQ ID NO 78
<211> LENGTH: 51
<212> TYPE: DNA
<213> ORGANISM: Homo sapiens

<400> SEQUENCE: 78
aatgtgggtg tgagaagggg aggggraaag gaagagatgg agagaccaac g               51

```
<210> SEQ ID NO 79
<211> LENGTH: 51
<212> TYPE: DNA
<213> ORGANISM: Homo sapiens

<400> SEQUENCE: 79
ggggcgtgtg ggtgggcacg ggatgwtggc actgctgctg gctggtctcc t          51

<210> SEQ ID NO 80
<211> LENGTH: 51
<212> TYPE: DNA
<213> ORGANISM: Homo sapiens

<400> SEQUENCE: 80
tgtaactaca tttttcctta taaaawggag ggtttaagag cgtcggagac c           51

<210> SEQ ID NO 81
<211> LENGTH: 51
<212> TYPE: DNA
<213> ORGANISM: Homo sapiens

<400> SEQUENCE: 81
ggaactggat cagcgggctg gggacsggga ggcacaacac agggacaccg t           51

<210> SEQ ID NO 82
<211> LENGTH: 51
<212> TYPE: DNA
<213> ORGANISM: Homo sapiens

<400> SEQUENCE: 82
tgttgtgggg aggccggggt ggggtsgggg tgtgtgcggg gtggtccttt t           51

<210> SEQ ID NO 83
<211> LENGTH: 51
<212> TYPE: DNA
<213> ORGANISM: Homo sapiens

<400> SEQUENCE: 83
gaggaccaac tgggtgacat ccacaygaaa ccagaatctc agacaggtta c           51

<210> SEQ ID NO 84
<211> LENGTH: 51
<212> TYPE: DNA
<213> ORGANISM: Homo sapiens

<400> SEQUENCE: 84
aagctaaacg tatgattata ttgggwttgt tctagaaggg ggtagtgatg a           51

<210> SEQ ID NO 85
<211> LENGTH: 51
<212> TYPE: DNA
<213> ORGANISM: Homo sapiens

<400> SEQUENCE: 85
ggttgcacag agctgtctgg cacccscttc tttggctttt ctctcctgac a           51

<210> SEQ ID NO 86
<211> LENGTH: 59
<212> TYPE: DNA
<213> ORGANISM: Homo sapiens
<220> FEATURE:
<221> NAME/KEY: misc_difference
<222> LOCATION: (27)..(27)
<223> OTHER INFORMATION: c or ct
```

```
<400> SEQUENCE: 86
tagcacagac tttctctccc tcccttctta tagttccttt tagtttttct atttctatt        59

<210> SEQ ID NO 87
<211> LENGTH: 51
<212> TYPE: DNA
<213> ORGANISM: Homo sapiens

<400> SEQUENCE: 87
ctcaaaaaaa aaaaataaaa taaaawaaat aaaaaaagag gcactgaaga g                51

<210> SEQ ID NO 88
<211> LENGTH: 51
<212> TYPE: DNA
<213> ORGANISM: Homo sapiens

<400> SEQUENCE: 88
caggttgatg caggaggagc gcacgwcctc tcgtgcctgg ggaagaccaa a                51

<210> SEQ ID NO 89
<211> LENGTH: 51
<212> TYPE: DNA
<213> ORGANISM: Homo sapiens

<400> SEQUENCE: 89
ttcacacctt gaatcagtac aataamcccc cctccccaat cacaaaagaa a                51

<210> SEQ ID NO 90
<211> LENGTH: 51
<212> TYPE: DNA
<213> ORGANISM: Homo sapiens

<400> SEQUENCE: 90
ggacatttaa aaatacaaca ggaagktgtg gaacatttaa aaattgggaa t                51

<210> SEQ ID NO 91
<211> LENGTH: 51
<212> TYPE: DNA
<213> ORGANISM: Homo sapiens

<400> SEQUENCE: 91
tgagacctgg cctgccacaa tccctrctgt caatttgcac atgttttcta t                51

<210> SEQ ID NO 92
<211> LENGTH: 51
<212> TYPE: DNA
<213> ORGANISM: Homo sapiens

<400> SEQUENCE: 92
gaggattccc tcttttttcta ttgatkggaa tagtttcaga aggaatggta c                51

<210> SEQ ID NO 93
<211> LENGTH: 51
<212> TYPE: DNA
<213> ORGANISM: Homo sapiens

<400> SEQUENCE: 93
attcaccaaa ttcaagacat ccgccwctcc ccactggcag tccagtactc a                51

<210> SEQ ID NO 94
<211> LENGTH: 51
<212> TYPE: DNA
```

-continued

<213> ORGANISM: Homo sapiens

<400> SEQUENCE: 94
acccaggctg gagtgcagtg tggcaygatc tcagctcact gccacctccg c        51

<210> SEQ ID NO 95
<211> LENGTH: 51
<212> TYPE: DNA
<213> ORGANISM: Homo sapiens

<400> SEQUENCE: 95
aatccaacaa ttgacagcct acaggycaga tccagcttat aattataacc t        51

<210> SEQ ID NO 96
<211> LENGTH: 51
<212> TYPE: DNA
<213> ORGANISM: Homo sapiens

<400> SEQUENCE: 96
aaaagatcct tttatacata aacaaygtgt ctaaactatg aagcaaatta c        51

<210> SEQ ID NO 97
<211> LENGTH: 51
<212> TYPE: DNA
<213> ORGANISM: Homo sapiens

<400> SEQUENCE: 97
atccactatc tttggggtca tcctckgtat gcctgaagga agaaaacagc a        51

<210> SEQ ID NO 98
<211> LENGTH: 51
<212> TYPE: DNA
<213> ORGANISM: Homo sapiens

<400> SEQUENCE: 98
agtacagact aatacaaggg tggagkcaat gacagcgcta aagggcacct t        51

<210> SEQ ID NO 99

<400> SEQUENCE: 99

000

<210> SEQ ID NO 100
<211> LENGTH: 51
<212> TYPE: DNA
<213> ORGANISM: Homo sapiens

<400> SEQUENCE: 100
aatggttact gttttactg tttggyttgg taaaaagcca aacctctttt c        51

<210> SEQ ID NO 101
<211> LENGTH: 51
<212> TYPE: DNA
<213> ORGANISM: Homo sapiens

<400> SEQUENCE: 101
gactttaaac caacaaagat caaakagac aagaaggcc attacataat g         51

<210> SEQ ID NO 102
<211> LENGTH: 51
<212> TYPE: DNA
<213> ORGANISM: Homo sapiens

<400> SEQUENCE: 102
ctctttcttc caggctggag ttcagyggca ggatctcagc tcactgcaac g        51

<210> SEQ ID NO 103
<211> LENGTH: 51
<212> TYPE: DNA
<213> ORGANISM: Homo sapiens

<400> SEQUENCE: 103
tgggactaca ggcgcccgcc accacrtcca gctaatctat tgtattctta g        51

<210> SEQ ID NO 104
<211> LENGTH: 51
<212> TYPE: DNA
<213> ORGANISM: Homo sapiens

<400> SEQUENCE: 104
ttttaaaata caacacattg ggccakgcat gatggctcat gcctatgatc c        51

<210> SEQ ID NO 105
<211> LENGTH: 51
<212> TYPE: DNA
<213> ORGANISM: Homo sapiens

<400> SEQUENCE: 105
aggatggctt gagcccaggg agtagragac cagcctgggc aacattgcaa g        51

<210> SEQ ID NO 106
<211> LENGTH: 51
<212> TYPE: DNA
<213> ORGANISM: Homo sapiens

<400> SEQUENCE: 106
aaattcttag gtcattctga tacacyatca agtttgagaa ttagtggctt c        51

<210> SEQ ID NO 107
<211> LENGTH: 51
<212> TYPE: DNA
<213> ORGANISM: Homo sapiens

<400> SEQUENCE: 107
ctcagcttgg agtggggtca attctyaaag gaaatgacat cacctcatct g        51

<210> SEQ ID NO 108
<211> LENGTH: 51
<212> TYPE: DNA
<213> ORGANISM: Homo sapiens

<400> SEQUENCE: 108
ttgagaaaga ggaagcaact ggggtrtctc tgaggttttg tgccttgtgc c        51

<210> SEQ ID NO 109
<211> LENGTH: 51
<212> TYPE: DNA
<213> ORGANISM: Homo sapiens

<400> SEQUENCE: 109
acacacagtt tgtttagata gataargctg cttttccatt ggataactgt g        51

<210> SEQ ID NO 110
<211> LENGTH: 51
<212> TYPE: DNA
<213> ORGANISM: Homo sapiens -continued

<400> SEQUENCE: 110
gtatatccct ttattactta gatgtytcat ctctgttagc aatattttgt a            51

<210> SEQ ID NO 111
<211> LENGTH: 51
<212> TYPE: DNA
<213> ORGANISM: Homo sapiens

<400> SEQUENCE: 111
tgctaatagc ctcaataacg gctcargaga cttgtgaaag atacaattta g            51

<210> SEQ ID NO 112
<211> LENGTH: 51
<212> TYPE: DNA
<213> ORGANISM: Homo sapiens

<400> SEQUENCE: 112
gtgaaagaag tcgaagtggg aacagyggtg cccttctggt tgggtttctt g            51

<210> SEQ ID NO 113
<211> LENGTH: 51
<212> TYPE: DNA
<213> ORGANISM: Homo sapiens

<400> SEQUENCE: 113
aaaaattaaa gaattactgt tctaayggga aattttcagg tgtaaagtct g            51

<210> SEQ ID NO 114
<211> LENGTH: 51
<212> TYPE: DNA
<213> ORGANISM: Homo sapiens

<400> SEQUENCE: 114
cttatattag gctacctctt cttgcmccac aggtaattaa taggcacttg t            51

<210> SEQ ID NO 115
<211> LENGTH: 51
<212> TYPE: DNA
<213> ORGANISM: Homo sapiens

<400> SEQUENCE: 115
tgtttcaatg ttgtttaagg taagayttga taactttgga tttgtttgaa g            51

<210> SEQ ID NO 116
<211> LENGTH: 51
<212> TYPE: DNA
<213> ORGANISM: Homo sapiens

<400> SEQUENCE: 116
aaaagatcct tttatacata aacaaygtgt ctaaactatg aagcaaatta c            51

<210> SEQ ID NO 117
<211> LENGTH: 51
<212> TYPE: DNA
<213> ORGANISM: Homo sapiens

<400> SEQUENCE: 117
ataatgctaa tttagcttgt cagaaracaa aattacaaca tatttagtta t            51

<210> SEQ ID NO 118
<211> LENGTH: 51
<212> TYPE: DNA

<213> ORGANISM: Homo sapiens

<400> SEQUENCE: 118
aagggcgggg aatgaggaca tgatcyagca ccagaagtca aagtgtatac a    51

<210> SEQ ID NO 119
<211> LENGTH: 51
<212> TYPE: DNA
<213> ORGANISM: Homo sapiens

<400> SEQUENCE: 119
acatctctgg ggtccaagaa ttcacrgctt tcttttctt tagagagcct t    51

<210> SEQ ID NO 120
<211> LENGTH: 51
<212> TYPE: DNA
<213> ORGANISM: Homo sapiens

<400> SEQUENCE: 120 tattttatg tacaattgta agtatmtttg accattagat aatgcctaca t    51

<210> SEQ ID NO 121
<211> LENGTH: 51
<212> TYPE: DNA
<213> ORGANISM: Homo sapiens

<400> SEQUENCE: 121
tgggctatga tcaacaggag acttgytggt ctctctgtat tagacttaaa g    51

<210> SEQ ID NO 122
<211> LENGTH: 51
<212> TYPE: DNA
<213> ORGANISM: Homo sapiens

<400> SEQUENCE: 122
ttcacctcct aacagctata atcctytcaa cagtgaaact ccggggacaa g    51

<210> SEQ ID NO 123
<211> LENGTH: 51
<212> TYPE: DNA
<213> ORGANISM: Homo sapiens

<400> SEQUENCE: 123
agagatccct aggtaggtgg ggtcarctta acatttggag aattccatac g    51

<210> SEQ ID NO 124
<211> LENGTH: 51
<212> TYPE: DNA
<213> ORGANISM: Homo sapiens

<400> SEQUENCE: 124
tgtgaggaca ggctctggag gctgargtgc tccacatgac tggtgtagac a    51

<210> SEQ ID NO 125
<211> LENGTH: 51
<212> TYPE: DNA
<213> ORGANISM: Homo sapiens

<400> SEQUENCE: 125
acctccttca aagcatctga ttctaytttg tttagagtga atattttac a    51

<210> SEQ ID NO 126
<211> LENGTH: 51

<212> TYPE: DNA
<213> ORGANISM: Homo sapiens

<400> SEQUENCE: 126
tctttctttt ccccacagct acacayagag actgaggaca ccctggacaa c         51

<210> SEQ ID NO 127
<211> LENGTH: 51
<212> TYPE: DNA
<213> ORGANISM: Homo sapiens

<400> SEQUENCE: 127
ggaagaagaa tgcatcaact gaaaawctat tcctttgaga ggaccaataa a         51

<210> SEQ ID NO 128
<211> LENGTH: 51
<212> TYPE: DNA
<213> ORGANISM: Homo sapiens

<400> SEQUENCE: 128
atggaggaaa gaaacaatgg acttamaagt caatagaaat tatctgattt g         51

<210> SEQ ID NO 129
<211> LENGTH: 51
<212> TYPE: DNA
<213> ORGANISM: Homo sapiens

<400> SEQUENCE: 129
ccaatctttt ctcatgaaga caccakcatg acctcttatt cttatttata t         51

<210> SEQ ID NO 130
<211> LENGTH: 51
<212> TYPE: DNA
<213> ORGANISM: Homo sapiens

<400> SEQUENCE: 130
tccccacact tgtgaaatca caggcgggca acataatgac aggaagtcag c         51

<210> SEQ ID NO 131
<211> LENGTH: 51
<212> TYPE: DNA
<213> ORGANISM: Homo sapiens

<400> SEQUENCE: 131
cttagcacac ttacagaact tgttgggaac actcaggaaa ctcagctaca g         51

<210> SEQ ID NO 132
<211> LENGTH: 51
<212> TYPE: DNA
<213> ORGANISM: Homo sapiens

<400> SEQUENCE: 132
ttccggggag ctacacatgg aggacycaga caagcctctc ctaagcagcc t         51

<210> SEQ ID NO 133
<211> LENGTH: 51
<212> TYPE: DNA
<213> ORGANISM: Homo sapiens

<400> SEQUENCE: 133
tctttgccca ttctgaaatg acgaayggga agcccagcag ctcactcacc t         51

<210> SEQ ID NO 134

```
<211> LENGTH: 51
<212> TYPE: DNA
<213> ORGANISM: Homo sapiens

<400> SEQUENCE: 134
aggcaaccct ggaaagtcac aaacaygcat ggactcggcc ctgattgatc a          51

<210> SEQ ID NO 135
<211> LENGTH: 51
<212> TYPE: DNA
<213> ORGANISM: Homo sapiens

<400> SEQUENCE: 135
aggaaggaag gaaggaagaa agacagcaac aaaaaaacct tgaatcagga t          51

<210> SEQ ID NO 136
<211> LENGTH: 51
<212> TYPE: DNA
<213> ORGANISM: Homo sapiens

<400> SEQUENCE: 136
gaatcacttg aatctgggaa gtgaasgttg tagtgaagcg agatcatgca a          51

<210> SEQ ID NO 137
<211> LENGTH: 51
<212> TYPE: DNA
<213> ORGANISM: Homo sapiens

<400> SEQUENCE: 137
gcacaggcca catgtggagt ttggtgtcgg gttccactgg cttactgaat a          51

<210> SEQ ID NO 138
<211> LENGTH: 51
<212> TYPE: DNA
<213> ORGANISM: Homo sapiens

<400> SEQUENCE: 138
gctgcacctc agagagatgc agagcygctg ctactgggaa tgttcagcta g          51

<210> SEQ ID NO 139
<211> LENGTH: 51
<212> TYPE: DNA
<213> ORGANISM: Homo sapiens

<400> SEQUENCE: 139
cattggtgat gtatttggtt cctgayagca ttatttaatt ttgctacaca t          51

<210> SEQ ID NO 140
<211> LENGTH: 51
<212> TYPE: DNA
<213> ORGANISM: Homo sapiens

<400> SEQUENCE: 140
ctaagtcaaa ggtgttgaat tatagmgcat ttgcctaaaa ggaggttgac t          51

<210> SEQ ID NO 141
<211> LENGTH: 51
<212> TYPE: DNA
<213> ORGANISM: Homo sapiens

<400> SEQUENCE: 141
aaaatattaa aaattggtga aactaggttg aaggtacatg aacgcttgtt g          51
```

<210> SEQ ID NO 142
<211> LENGTH: 51
<212> TYPE: DNA
<213> ORGANISM: Homo sapiens

<400> SEQUENCE: 142
gcataagtga atggaacatc cactgygtta tatatcagaa gcaggtggga a          51

<210> SEQ ID NO 143
<211> LENGTH: 51
<212> TYPE: DNA
<213> ORGANISM: Homo sapiens

<400> SEQUENCE: 143
gcatctgggg aaccaaattt agcaayaggg aggagatgct tttgtgataa t          51

<210> SEQ ID NO 144
<211> LENGTH: 51
<212> TYPE: DNA
<213> ORGANISM: Homo sapiens

<400> SEQUENCE: 144
gtatgtttca cttagattat tgttgygctt ttctccatgc cctgacatgt a          51

<210> SEQ ID NO 145
<211> LENGTH: 51
<212> TYPE: DNA
<213> ORGANISM: Homo sapiens

<400> SEQUENCE: 145
atcatgtgca cagccctgag acaagkagct agaggagtac tatgattgga a          51

<210> SEQ ID NO 146
<211> LENGTH: 51
<212> TYPE: DNA
<213> ORGANISM: Homo sapiens

<400> SEQUENCE: 146
gtccatctgt cttattaatt tttcaraaac acagcccctg gatacattga t          51

<210> SEQ ID NO 147
<211> LENGTH: 51
<212> TYPE: DNA
<213> ORGANISM: Homo sapiens

<400> SEQUENCE: 147
gacccatgag gaaaccactg cgctgrccca ggtgagagct gaagggctgc c          51

<210> SEQ ID NO 148
<211> LENGTH: 51
<212> TYPE: DNA
<213> ORGANISM: Homo sapiens

<400> SEQUENCE: 148
ctccagctgg taactaaagt ggactrtgaa acaaccccca tctatattct c          51

<210> SEQ ID NO 149
<211> LENGTH: 51
<212> TYPE: DNA
<213> ORGANISM: Homo sapiens

<400> SEQUENCE: 149
taatgctcct gtagctttat atttgrggtc tgtttcttgt taagaataaa c          51

<210> SEQ ID NO 150
<211> LENGTH: 51
<212> TYPE: DNA
<213> ORGANISM: Homo sapiens

<400> SEQUENCE: 150
actgaggaaa cataacattt tgattyatag ttaatggtga ttgggaacgg t    51

<210> SEQ ID NO 151
<211> LENGTH: 51
<212> TYPE: DNA
<213> ORGANISM: Homo sapiens

<400> SEQUENCE: 151
tgggattaat agatgtgagc taccaygccc agcccacagt gtctctggat t    51

<210> SEQ ID NO 152
<211> LENGTH: 51
<212> TYPE: DNA
<213> ORGANISM: Homo sapiens

<400> SEQUENCE: 152
ttctctccag acgctctgcc taatgrtaag aatgggatat tgaaggcacc a    51

<210> SEQ ID NO 153
<211> LENGTH: 51
<212> TYPE: DNA
<213> ORGANISM: Homo sapiens

<400> SEQUENCE: 153
cgtcccaagg ccttggaatg ttggcrtaac aggaaaaagg gtgtggagtg g    51

<210> SEQ ID NO 154
<211> LENGTH: 51
<212> TYPE: DNA
<213> ORGANISM: Homo sapiens

<400> SEQUENCE: 154
ctacaccatt cctctttaga cacccrgaat cacagctctc ttaggaacca g    51

<210> SEQ ID NO 155
<211> LENGTH: 51
<212> TYPE: DNA
<213> ORGANISM: Homo sapiens

<400> SEQUENCE: 155
actttctttg cttgtataca atggayggtg gtcttacctt atggtgaaat c    51

<210> SEQ ID NO 156
<211> LENGTH: 51
<212> TYPE: DNA
<213> ORGANISM: Homo sapiens

<400> SEQUENCE: 156
ctgctgggga agggaaaga gacagkccct gctgtcagtt ctcagctggt t    51

<210> SEQ ID NO 157
<211> LENGTH: 51
<212> TYPE: DNA
<213> ORGANISM: Homo sapiens

<400> SEQUENCE: 157 cacaaccccca gtcacttcca tattaygtga cctttattac aagaaaggaa t    51

```
<210> SEQ ID NO 158
<211> LENGTH: 51
<212> TYPE: DNA
<213> ORGANISM: Homo sapiens

<400> SEQUENCE: 158
ccttagagag gggcctcaag ggatgyccct ggtctagaca gaatgttccc t          51

<210> SEQ ID NO 159
<211> LENGTH: 51
<212> TYPE: DNA
<213> ORGANISM: Homo sapiens

<400> SEQUENCE: 159
tgtggctccc aaggcctgg agaccktgca ggagaggtga gagtgggcgg g           51

<210> SEQ ID NO 160
<211> LENGTH: 51
<212> TYPE: DNA
<213> ORGANISM: Homo sapiens

<400> SEQUENCE: 160
aacagaataa aaagtcctag aaagayacag taaaaagtag tgtctgtctc t          51

<210> SEQ ID NO 161
<211> LENGTH: 51
<212> TYPE: DNA
<213> ORGANISM: Homo sapiens

<400> SEQUENCE: 161
cagtgcttat catcacctga cctacraaat atatggtttg gtttctttac t          51

<210> SEQ ID NO 162
<211> LENGTH: 51
<212> TYPE: DNA
<213> ORGANISM: Homo sapiens

<400> SEQUENCE: 162
ctgagggaaa aaaagaccct ctcagmcccc tttagctgca atatatcttt t          51
```